United States Patent
Xiong et al.

(10) Patent No.: US 11,277,833 B2
(45) Date of Patent: Mar. 15, 2022

(54) METHOD FOR GENERATING PREAMBLE, METHOD FOR CONFIGURING PREAMBLE AND EQUIPMENT THEREOF, RANDOM ACCESS METHOD, DEVICE, USER EQUIPMENT AND BASE STATION

(71) Applicant: Samsung Electronics Co., Ltd., Suwon-si (KR)

(72) Inventors: Qi Xiong, Beijing (CN); Chen Qian, Beijing (CN); Bin Yu, Beijing (CN)

(73) Assignee: Samsung Electronics Co., Ltd., Suwon-si (KR)

(*) Notice: Subject to any disclaimer, the term of this patent is extended or adjusted under 35 U.S.C. 154(b) by 58 days.

(21) Appl. No.: 16/626,658

(22) PCT Filed: Jun. 26, 2018

(86) PCT No.: PCT/KR2018/007218
§ 371 (c)(1),
(2) Date: Dec. 26, 2019

(87) PCT Pub. No.: WO2019/004694
PCT Pub. Date: Jan. 3, 2019

(65) Prior Publication Data
US 2020/0351853 A1    Nov. 5, 2020

(30) Foreign Application Priority Data

Jun. 26, 2017 (CN) .......................... 201710495615.X
Oct. 26, 2017 (CN) .......................... 201711022900.6
(Continued)

(51) Int. Cl.
*H04W 72/04* (2009.01)
*H04W 74/00* (2009.01)
*H04W 74/08* (2009.01)

(52) U.S. Cl.
CPC ....... *H04W 72/044* (2013.01); *H04W 74/004* (2013.01); *H04W 74/0833* (2013.01)

(58) Field of Classification Search
None
See application file for complete search history.

(56) References Cited

U.S. PATENT DOCUMENTS 1,705,893 A * 3/1929 Barnhart .................. B23C 3/20
  409/118
6,626,658 B2 * 9/2003 Ito ...................... B29C 45/1761
  100/258 A (Continued)

FOREIGN PATENT DOCUMENTS

CN    104039015 A    9/2014
CN    104412519 A    3/2015
(Continued)

OTHER PUBLICATIONS

Supplementary European Search Report, EP18822678, dated May 7, 2020. 2 pages (Year: 2020).*

(Continued)

*Primary Examiner* — Ayaz R Sheikh
*Assistant Examiner* — Faiyazkhan Ghafoerkhan

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. The present application discloses a method for generating a preamble, comprising the following steps of: receiving dedicated preamble configuration information and (Continued)

random access preamble configuration information, wherein the dedicated preamble configuration information comprises root sequence configuration information and/or cyclic shift value configuration information; determining dedicated root sequence configuration information, dedicated cyclic shift value configuration information and dedicated preamble index according to the dedicated preamble configuration information and random access preamble configuration information.

20 Claims, 34 Drawing Sheets

(30) Foreign Application Priority Data

Nov. 16, 2017 (CN) .......................... 201711144592.4
Jan. 11, 2018 (CN) .......................... 201810028303.2

(56) References Cited

U.S. PATENT DOCUMENTS

| | | | | |
|---|---|---|---|---|
| 8,238,835 | B2* | 8/2012 | Nagai | H04B 7/0695 455/67.11 |
| 8,451,787 | B2* | 5/2013 | Hooli | H04J 13/14 370/329 |
| 9,210,667 | B2 | 12/2015 | Dinan | |
| 11,178,695 | B2* | 11/2021 | Jeong | H04B 7/0695 |
| 2010/0014463 | A1* | 1/2010 | Nagai | H04W 72/0426 370/328 |
| 2010/0284350 | A1* | 11/2010 | Korhonen | H04J 13/16 370/329 |
| 2011/0261752 | A1* | 10/2011 | Fischer | H04W 74/0866 370/328 |
| 2014/0010178 | A1* | 1/2014 | Yu | H04W 74/004 370/329 |
| 2014/0376466 | A1* | 12/2014 | Jeong | H04B 7/0695 370/329 |
| 2016/0295503 | A1 | 10/2016 | Bucknell et al. | |
| 2017/0026962 | A1* | 1/2017 | Liu | H04B 7/0617 |
| 2017/0055297 | A1* | 2/2017 | Da | H04L 27/2613 |
| 2017/0201974 | A1 | 7/2017 | Sohn et al. | |
| 2017/0280483 | A1 | 9/2017 | Liu et al. | |
| 2018/0138962 | A1* | 5/2018 | Islam | H04L 5/0032 |
| 2019/0132066 | A1* | 5/2019 | Park | H04W 36/00835 |
| 2019/0132777 | A1* | 5/2019 | Park | H04W 76/27 |
| 2019/0132778 | A1* | 5/2019 | Park | H04W 24/10 |
| 2019/0141592 | A1* | 5/2019 | Park | H04W 36/00835 |
| 2020/0068416 | A1* | 2/2020 | Kang | H04L 5/0023 |
| 2020/0100311 | A1* | 3/2020 | Cirik | H04W 72/042 |

FOREIGN PATENT DOCUMENTS

| | | |
|---|---|---|
| CN | 105430750 A | 3/2016 |
| CN | 106416375 A | 2/2017 |
| WO | 2016188156 A1 | 12/2016 |
| WO | 2017/012472 A1 | 1/2017 |

OTHER PUBLICATIONS

European Search Opinion, EP18822678.1, dated May 15, 2020, 5 pages. (Year: 2020).*
ISA/KR, International Search Report and Written Opinion of the International Searching Authority, International Application No. PCT/KR2018/007218, dated Oct. 16, 2018, 16 pages.
MediaTek Inc., "Mechanism for flexible beam failure recovery", 3GPP TSG RAN WG1 AH_NR Meeting, Jun. 27-30, 2017, R1-1710810, 6 pages.
Spreadtrum Communications, "Discussion on UE initiated recovery from beam failure", 3GPP TSG RAN WG1 NR Ad-Hoc#2, Jun. 27-30, 2017, R1-1710364, 5 pages.
LG Electronics, "Discussion on UE-initiated beam recovery", 3GPP TSG RAN WG1 Meeting #88, Feb. 13-17, 2017, R1-1702453, 3 pages.
Supplementary European Search Report dated May 15, 2020 in connection with European Patent Application No. 18 82 2678, 10 pages.
Ericsson, "Beam failure detection and beam recovery actions", 3GPP TSG-RAN WG1 Meeting #88bis, Apr. 3-7, 2017, R1-1705893, 5 pages.
Notification to Grant Patent Right for Invention dated Apr. 15, 2021 in connection with Chinese Patent Application No. 201710495615.X, 7 pages.
The First Office Action dated Jan. 5, 2022, in connection with Chinese Application No. 201711144592.4, 19 pages.
Choi, et al., "Automatic Confoguration of Randon Access Channel Parameters in LTE Systems," 2011 IFIP Wireless Days (WD), IEEE, 2011, 6 pages.
Cnki, Xu Meng, et al., "Research on 3GPP LTE Uplink Random Access," Beijing Jiatong University, 2011, 93 pages.
Ericsson, "NR-RACH preamble format details for capacity enhancement and beam management," R1-1714041, 3GPP TSG RAN WG1 Meeting #90, Prague, Czech Republic, Aug. 21-25, 2017, 7 pages.
Kim, et al., "Adaptive Random Access Preamble Split in LTE, " 2013 9th International Wireless Communication and Mobile Computing Conference (IWCMC), IEEE, 2013 6 pages.
Zte, "4-step random access procedure," R1-1709897, 3GPP TSG RAN WG1 NR Ad-hoc#2, Qingdao, P.R. China, Jun. 27-30, 2017, 15 pages.

* cited by examiner

FIG. 31

| Preamble start index | Number of the preambles |
|---|---|

METHOD FOR GENERATING PREAMBLE, METHOD FOR CONFIGURING PREAMBLE AND EQUIPMENT THEREOF, RANDOM ACCESS METHOD, DEVICE, USER EQUIPMENT AND BASE STATION

CROSS-REFERENCE TO RELATED APPLICATIONS

This application is a 371 National Stage of International Application No. PCT/KR2018/007218, filed Jun. 26, 2018, which claims priority to Chinese Patent Application No. 201710495615.X, filed Jun. 26, 2017, Chinese Patent Application No. 201711022900.6, filed Oct. 26, 2017, Chinese Patent Application No. 201711144592.4, filed Nov. 16, 2017, and Chinese Patent Application No. 201810028303.2, filed Jan. 11, 2018, the disclosures of which are herein incorporated by reference in their entirety.

BACKGROUND

1. Field

The present invention relates to the technical field of wireless communication, and in particular to a method for generating preamble, a method for configuring preamble and equipment thereof, a random access method, device, user equipment and base station.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure" "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart a building, smart city, smart car or connected cars, smart grid, health care, smart appliances and advanced medical services through convergence and combination between existing Information Technology (IT) and various industrial applications.

In line with this, various attempts have been made to apply 5G communication systems to LDT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the EDT technology.

The rapid development of information industry, particularly the increasing demand from the mobile Internet and the Internet of Things (IoT), brings about unprecedented challenges in the future mobile communications technology. According to the ITU-R M. [IMT. BEYOND 2020. TRAFFIC] issued by the International Telecommunication Union (ITU), it can be expected that, by 2020, mobile services traffic will grow nearly 1,000 times as compared with that in 2010 (4G era), and the number of user equipment connections will also be over 17 billion, and with a vast number of IoT equipments gradually expand into the mobile communication network, the number of connected equipments will be even more astonishing. In response to this unprecedented challenge, the communications industry and academia have prepared for 2020s by launching an extensive study of the fifth generation of mobile communications technology (5G). Currently, in ITU-R M. [IMT, VISION] from ITU, the framework and overall objectives of the future 5G have been discussed, where the demands outlook, application scenarios and various important performance indexes of 5G have been described in detail. In terms of new demands in 5G, the ITU-R M. [IMT. FUTURE TECHNOLOGY TRENDS] from ITU provides information related to the 5G technology trends, which is intended to address prominent issues such as significant improvement on system throughput, consistency of the user experience, scalability so as to support IoT, delay, energy efficiency, cost, network flexibility, support for new services and flexible spectrum utilization, etc.

The performance of random access directly influences the user's experience. For a conventional wireless communication system, for example, LTE or LTE-Advanced, a random access process is used in various scenarios such as establishment of an initial link, cell handover, reestablishment of an uplink, Radio Resource Control (RRC) connection reestablishment, and is classified into contention-based random access and contention-free random access, depending upon whether a user exclusively occupies preamble sequence resources. Since, for the contention-based random access, each user selects a preamble sequence from same preamble sequence resources when trying to establish an uplink, there may be a case in which multiple users select and transmit a same preamble sequence to the base station. Therefore, the collision resolution mechanism becomes an important research direction in the random access. How to reduce the collision probability and how to quickly solve a collision that has occurred are key indicators influencing the random access performance.

The contention-based random access process in LTE-A includes four steps, as shown in FIG. 1. In the first step, a user randomly selects one preamble sequence from a preamble sequence resource pool and transmits the preamble sequence to a base station. The base station performs correlation detection on the received signal, so as to identify the preamble sequence transmitted by the user. In the second step, the base station transmits a Random Access Response (RAR) to the user, the RAR containing an identifier of a random access preamble sequence, a timing advance instruction determined according to a time delay between the user and the base station, a Cell-Radio Network Temporary Identifier (C-RNTI), and time-frequency resources allocated for the user to perform uplink transmission next time. In the third step, the user transmits a third message (Msg3), to the base station according to the information in the RAR. The Msg3 contains information such as a user equipment terminal identifier and an RRC link request, wherein the user equipment terminal identifier is an identifier that is unique to the user and used for resolving collision. In the fourth step, the base station transmits a collision resolution identifier to the user, the collision resolution identifier containing a user equipment identifier corresponding to a user who wins in the collision/solution. The user upgrades TC-RNTI to C-RNTI upon detecting its identifier, and transmits an Acknowledgement (ACK) signal to the base station to complete the random access process and waits for the scheduling of the base station. Otherwise, the user will start a new random access process after a certain delay.

For a contention-free random access process, since the base station has known the identifier of the user, it can allocate a preamble sequence to the user. Thus, when transmitting a preamble sequence, the user does not need to randomly select a sequence, and instead, it use the allocated preamble sequence. Upon detecting the allocated preamble sequence, the base station will transmit a corresponding random access response, the random access response including information such as timing advance and uplink resource allocation. Upon receiving the random access response, the user considers that the uplink synchronization has been completed, and waits for the further scheduling of the base station. Therefore, the contention-free random access process contains only two steps: a first step of transmitting a preamble sequence, and a second step of transmitting a random access response.

The random access process in LTE is applicable to the following scenarios:

1. initial access under RRC_IDLE;
2. reestablishment of RRC connection;
3. cell handover;
4. the downlink data arrives and a random access process is requested (when the uplink is nonsynchronous) in an RRC connected state;
5. the uplink data arrives and a random access process is requested (when the uplink is nonsynchronous or no source is allocated for a scheduling request in a PUCCH resource) in an RRC connected state; and
6. positioning.

In the LTE, the six scenarios use the same random access steps. In the 5G standard research, a downlink transmission beam and available random access resources (random access channel resources and/or random access preamble resources) will be bound, so that the base station can acquire an available downlink transmission beam selected by a UE through a detected preamble from the UE and/or time-frequency resources in which the detected preamble is located. In a beamforming system, for the beam failure recovery, there are four aspects: beam failure detection, new candidate beam identification, Beam Failure Recovery Request (BFRQ) transmission, and UE monitors gNB response for beam failure recovery request. Wherein, when the UE needs to transmit a beam failure recovery request, the way similar to random access may be used to inform the base station of its own beam failure request demand and explicitly or implicitly inform the base station of similar available candidate beams. But it is considered that the number of the users in the connected state is large and resources necessary for beam failure recovery may be more, so that traditional method for configuring contention-free random access preambles may not satisfy the demand.

In the existing 5G standard discussion, communication systems adopt a beamforming mode. However, when a UE detects that there is a beam failure, that is, when the quality of a downlink beam has not satisfied a certain condition, the UE needs to recover the beam failure. Meanwhile, the UE needs to inform a base station of new available downlink transmission beams or whether there are new available downlink transmission beams. The system will configure dedicated resources for a beam failure recovery request for the UE, including preamble resources and time-frequency resources. However, if random access preamble resources in the preamble resources are reused, a problem of insufficient capacity may occur, which is not enough to provide the users in the connected state with sufficient preamble resources.

Random access procedure is an important way to establish connection between the terminal device and the base station in the system. In long-term evolution LTE technology, regardless of whether it is a contention-based random access procedure, a random access preamble needs to be transmitted in a Physical Random Access Channel (PRACH). In LTE, the number of preambles that can be used in each cell is fixed at 64. In 5G, the number of terminal devices in the cell will increase as the cells are denser and the types of supported terminal devices are more diverse. Therefore, it is necessary to increase the number of preambles to improve the performance of random access.

In the existing LTE technology, the total number of random access preamble is fixed at 64. For 5G system, a fixed number of preambles is slightly insufficient for some scenarios, while for other scenarios, a fixed number of preambles are somewhat redundant. Therefore, the configuration manner of the number of preambles in the prior art lacks flexibility and is difficult to apply to all application scenarios.

In the LTE, the above-mentioned six scenarios use the same random access steps. In a new communication system, a user equipment performing random access may be able to transmit multiple preambles in one random access attempt in order to increase the probability of accessing the system. However, how to determine beams, preamble sequences and methods for controlling the random access power and a power ramp used by the user equipment in a scenario where multiple preambles may be transmitted needs to be solved, so that the user equipment may normally access the system by a method for multiple preambles based random access.

For a new system, the user equipment may perform multiple preambles based random access, so that the probability of accessing the system by a user in one attempt may be increased. However, unlike the existing random access method based on a single preamble, during the transmission of multiple preambles, the user equipment needs to clearly determine sequence choices and beam choices for transmitting multiple preambles, random access resources corresponding to the determined downlink beams and the method for controlling the random access power and the power ramp. Otherwise, the user equipment cannot perform the random access in a normally controllable manner.

Compared with the existing LTE system, 5G will introduce a system operating in a high frequency band to improve system data transmission efficiency and spectrum utilization. In order to withstand the significant path loss in high frequency band wireless channels, wireless communication systems operating in high frequency bands require multi-beam operation to improve system performance with beam-forming gain due to correct beam pairing. Therefore, for multi-beam systems, the accuracy of beam pairing will significantly affect system performance. When the terminal finds that the system performance is degraded due to inaccurate beam pairing, the beam recovery procedure is triggered. Specifically, the terminal first detects a beam pairing failure; if a beam pairing failure is detected, a candidate beam is determined according to a beam-related reference signal; then a beam failure recovery request is initiated, and a corresponding request is initiated to a base station through a dedicated channel or resource; after the beam failure recovery request is initiated, the terminal detects the corresponding beam failure recovery request response. The above procedure can be described by FIG. 1.

SUMMARY

The terminal may initiate a beam failure recovery request on a physical random access channel, an uplink control channel, or a channel time-frequency resource similar to a physical random access channel. Considering that the beam failure recovery needs to be completed with a short delay, the beam failure recovery request needs to be transmitted in a contention-free manner. That is, the allocation of resources (including time-frequency resources and sequence resources) used for the beam failure recovery request is dedicated to the terminal.

Since the existing beam failure recovery procedure is contention-free, how to allocate distinguishable resources (time-frequency resources and sequence resources) for beam failure recovery procedure to the different terminals with low signaling overhead is a problem that needs to be considered.

An objective of the present invention is to overcome the deficiency in the prior art and to provide a method for configuring information. Dedicated resources for beam failure recovery (including preamble resources and time-frequency resources) are configured for a UE to perform beam failure recovery, wherein the preamble resources include a dedicated cyclic shift indication, root sequence indication, etc. According to the present invention, it is further provided that how the UE acquire preamble resources for beam failure recovery by the acquired configuration information of random access preamble resources (contention-based and contention-free random access preamble resources) and dedicated resource information for beam failure recovery.

In order to achieve the above object, the present invention provides a method for generating a preamble, which includes the following steps:

receiving dedicated preamble configuration information and random access preamble configuration information, wherein the dedicated preamble configuration information comprises root sequence configuration information and/or cyclic shift value configuration information;

determining dedicated root sequence configuration information, dedicated cyclic shift value configuration information and dedicated preamble index according to the dedicated preamble configuration information and random access preamble configuration information;

generating a dedicated preamble according to the determined dedicated root sequence configuration information, dedicated cyclic shift value configuration information and dedicated preamble index; and transmitting the dedicated preambles on dedicated time-frequency resources configured by a base station.

Preferably, the dedicated preamble configuration information comprises a dedicated preamble index.

Preferably, the random access preamble configuration information comprises a root sequence index of random access preamble and cyclic shift value configuration of the random access preamble, and the random access preamble configuration information further comprises at least one of the following: number of preambles for contention-based random access, number of preambles for contention-free random access and the total number of preambles for random access.

Preferably, the step of determining root sequence index of dedicated preambles comprises one of the following steps of:

using the root sequence index of the random access preamble in random access preamble configuration information as the root sequence index of the dedicated preamble;

or, indicating to generate the root sequence index of the dedicated preamble according to the root sequence index of the random access preamble in the random access preamble configuration information and an offset in dedicated preamble resource configuration information;

or, using the root sequence index of the dedicated preamble in the dedicated preamble resource configuration information.

Preferably, the step of determining the cyclic shift value configuration of the dedicated preamble comprises one of the following steps of:

using the cyclic shift value configuration of the random access preamble in random access preamble configuration information as the cyclic shift value configuration of the dedicated preamble;

acquiring the cyclic shift value configuration of the dedicated preamble according to the cyclic shift value of the random access preamble in the random access preamble configuration information and scale factor configuration in dedicated preamble resource configuration information;

acquiring the cyclic shift value configuration of the dedicated preamble according to the cyclic shift values of random access preamble in the random access preamble configuration information and offset configuration in the dedicated preamble resource configuration information; and using the cyclic shift value configuration of the dedicated preamble in the dedicated preamble resource configuration information.

Preferably, the step of determining the dedicated preamble index comprises one of the following steps of:

determining the dedicated preamble index according to a preamble index and offset configuration in dedicated preamble resource configuration information; and using the dedicated preamble index in the dedicated preamble resource configuration information.

Preferably, the step of generating dedicated preamble according to the root sequence index of the dedicated preamble, cyclic shift value configuration of the dedicated preamble and the dedicated preamble index comprises one of the following steps of:

generating the dedicated preamble sequence allocated by a base station according to the cyclic shift value indicated by the determined cyclic shift value configuration of the dedicated preamble and the preamble index indicated by the determined dedicated preamble index, according to the preamble root sequence indicated by the determined dedicated root sequence index and starting from the starting point of the root sequence;

generating the dedicated preamble sequence allocated by the base station according to the determined cyclic shift value of the dedicated preamble and determined dedicated preamble index indication, according to the preamble root sequence indicated by the determined dedicated root sequence index and starting from a cyclic shift of the first contention-free random access preamble; and generating the dedicated preamble sequence allocated by the base station according to the determined cyclic shift value of the dedicated preamble and the determined dedicated preamble index indication, according to the preamble root sequence indicated by the determined dedicated root sequence index and starting from a cyclic shift of a contention-free random access preamble configured by the base station.

In order to achieve the above object, the invention also provides a method for configuring a preamble, which comprises the following steps:

transmitting random access preamble configuration information and dedicated preamble configuration information, wherein the dedicated preamble configuration information comprises root sequence configuration information and/or cyclic shift value configuration information; and detecting a preamble on allocated dedicated time-frequency resources.

Preferably, the random access preamble configuration information comprises a root sequence index indication of a preamble for random access and cyclic shift value configuration for random access, and the random access preamble configuration information further comprises at least one of the following: number of preambles for contention-based random access, number of preambles for contention-free random access and the total number of preambles for random access.

Preferably, the root sequence configuration information comprises a dedicated root sequence index or root sequence offset configuration.

Preferably, the cyclic shift value configuration information comprises dedicated preamble cyclic shift value configuration information or a scale factor configuration or an offset configuration.

Preferably, the dedicated preamble configuration information comprises preamble index configuration information.

Preferably, the preamble index configuration information comprises a dedicated preamble index and/or an offset of a preamble index.

The present invention further provides a User Equipment (UE), comprising the following modules:

a preamble resource configuration information acquisition module, configured to receive random access preamble configuration and dedicated preamble configuration information;

a dedicated preamble determination module, configured to determine root sequence configuration information of a dedicated preamble, dedicated cyclic shift value configuration information and dedicated preamble index;

a dedicated preamble generation module, configured to generate the dedicated preamble according to the determined root sequence configuration information of the dedicated preamble, the determined cyclic shift value configuration information and the determined preamble index; and a dedicated preamble transmitting module, configured to transmit the dedicated preamble on dedicated time-frequency resources configured by a base station.

The present invention further provides a base station equipment, comprising the following modules:

a configuration information transmitting module, configured to transmit random access preamble configuration information and dedicated preamble configuration information; and a preamble detection module, configured to detect the dedicated preamble on the configured dedicated time-frequency resources.

Compared with the prior art, the technical effects of the present invention include, but are not limited to: a gNB configures preamble resource information for a beam failure recovery request UE and inform the UE of the information; after the UE acquires the configuration information, the preamble sequence for a beam failure recovery request of a user is determined finally by preamble configuration information for a beam failure recovery request and random access preamble configuration information which may be used. It is convenient for a terminal to carry out a beam failure recovery request by transmitting a preamble.

The configuration manner of the number of preambles in the existing LTE technology lacks flexibility and is difficult to adapt to more application scenarios and more terminal device numbers in 5G. Therefore, in view of this problem, the present disclosure provides a flexible preambles configuration manner. The number of preambles is configured in an explicit or implicit manner so that the number of preambles allocated to the terminal device may be more flexibly configured according to factors such as application scenarios and the number of loads.

One aspect of the present disclosure provides a random access method comprising: obtaining a maximum number of preambles; generating a random access preamble according to the maximum number of preambles and preamble configuration information; and transmitting the random access preamble on a random access channel.

According to the embodiments of the present disclosure, the obtaining a maximum number of preambles comprises: obtaining the maximum number of preambles according to initial access configuration information or random access configuration information.

According to the embodiments of the present disclosure, the obtaining a maximum number of preambles comprises: obtaining configuration information of the maximum number of preambles, and determining the maximum number of preambles according to the configuration information of the maximum number of preambles.

According to the embodiments of the present disclosure, the method further comprises obtaining the configuration information of the maximum number of preambles from at least one of the following:

random access configuration information; and preamble configuration information.

According to the embodiments of the present disclosure, the obtaining a maximum number of preambles comprises:

determining the maximum number of preambles according to pre-defined system information and an association between the pre-defined system information and the maximum number of preambles.

According to the embodiments of the present disclosure, the pre-defined system information comprises at least one of the following:

preamble format;

sub-carrier spacing of random access channel;

the repetition number of sequences within one preamble;

the maximum value of a plurality of numbers of down-link signals associated to a same random access occasion; and the number of down-link signals associated to a currently selected random access occasion.

According to the embodiments of the present disclosure, the sub-carrier spacing of random access channel is included in the random access configuration information or the preamble format.

According to the embodiments of the present disclosure, the method further comprises: detecting a random access response, and determining the random access preamble according to a preamble identifier in the random access response.

According to the embodiments of the present disclosure, the determining the random access preamble according to the preamble identifier in the random access response comprises:

determining the preamble identifier in the random access response according to a predetermined indication manner of the preamble identifier; and determining the random access preamble according to the preamble identifier.

According to the embodiments of the present disclosure, the indication manner of the preamble identifier comprises any one of the following:

indicating a number of bits of the preamble identifier according to the maximum number of preambles, and indicating the preamble identifier according to the number of bits of the preamble identifier;

indicating the number of bits of the preamble identifier according to a maximum value of a plurality of maximum numbers of preambles, and indicating the preamble identifier according to the number of bits of the preamble identifier; and indicating the preamble identifier according to down-link signal indication bits indicating the down-link signals and pre-defined preamble identifier bits.

According to the embodiments of the present disclosure, the indicating the preamble identifier further comprises:

indicating the transmitted random access preamble in the random access response by the pre-defined preamble identifier bits and the additional down-link signal indication bits; or indicating the transmitted random access preamble by the pre-defined preamble identifier bits in the random access response and the additional down-link signal indication bits for calculating a random access radio network temporary identifier RA-RNTI.

According to the embodiments of the present disclosure, the down-link signal comprises any one of a synchronization signal block and a channel state information reference signal.

Another aspect of the present disclosure is to provide a random access method comprising: transmitting configuration information of a maximum number of preambles; detecting a random access preamble; and transmitting a random access response.

According to the embodiments of the present disclosure, the transmitting the configuration information of the maximum number of preambles comprises: transmitting at least one of the following information including the configuration information of the maximum number of preambles:

random access configuration information; and preamble configuration information.

Another aspect of the present disclosure provides a terminal comprising a processor and a memory storing instructions that, when executed by the processor, cause the processor to perform corresponding methods described in the embodiments of the present disclosure.

Another aspect of the present disclosure provides a base station comprising a processor and a memory storing instructions that, when executed by the processor, cause the processor to perform corresponding methods described in the embodiments of the present disclosure.

Another aspect of the present disclosure provides a machine readable medium storing instructions that, when executed by a processor, cause the processor to perform the corresponding methods described in the embodiments of the present disclosure.

The manner provided in the embodiments of the present disclosure may flexibly configure the maximum number of preambles supported by the system, so that the number of preambles allocated to the terminal device may be more flexibly configured according to factors such as application scenarios and the number of loads.

An objective of the present disclosure is to solve at least one of the above technical defects, particularly the random access problem of multiple preambles.

The present disclosure provides a random access method, including steps of:

determining, by a User Equipment (UE), random access resources; and determining a preamble sequence and an uplink transmitting beam for transmitting multiple preambles to perform multiple preambles based random access, when it is determined according to the random access resources that multiple preambles based random access is performed.

The method further includes the step of:

determining, according to a determined number of down-link transmitting beams and a number of preambles that may be transmitted by each downlink transmitting beam, a preamble power ramping counter and/or a preamble transmission counter; and the step of performing multiple preambles based random access includes:

performing the multiple preambles based random access according to the determined preamble sequence and uplink transmitting beam for transmitting the multiple preambles and at least one of the followings: a counting result of the preamble power ramping counter and a counting result of the preamble transmission counter.

The method for determining the preamble sequence for transmitting multiple preambles includes:

selecting one preamble sequence for each of the determined downlink transmitting beams, and transmitting the preamble corresponding to the downlink transmitting beam by using the selected preamble sequence; or, selecting one preamble sequence, and transmitting all preambles in one random access attempt by using the selected preamble sequence; or, determining a preamble sequence configured in the random access resources as the preamble sequence for transmitting the multiple preambles.

The method for determining the uplink transmitting beam for transmitting the multiple preambles includes: determining the uplink transmitting beam for the multiple preambles corresponding to one downlink transmitting beam, and determining, according to the determined uplink transmitting beams, the uplink transmitting beam for the multiple preambles corresponding to other downlink transmitting beam; or, randomly determining the uplink transmitting beams used by the preambles corresponding to all downlink transmitting beams with equal probability.

The step of determining the preamble power ramping counter includes:

determining one preamble power ramping counter for each of the determined downlink transmitting beams, wherein multiple preambles corresponding to the same downlink transmitting beam share the same preamble power ramping counter; or, determining one preamble power ramping counter for each preamble determined to be transmitted; or, determining one preamble power ramping counter for all preambles determined to be transmitted.

When the UE has N determined downlink transmitting beams and each of the downlink transmitting beams corresponds to M preambles, in a case where the multiple preambles corresponding to each of the downlink transmitting beams share the same preamble power ramping counter, when the UE performs a new random access attempt during a same random access process, the method for determining the counting result of the preamble power ramping counter includes:

for a same downlink transmitting beam, when less than and/or equal to 1, or Y, or Y/x, or X, or X/x, or $\lfloor X/x \rfloor$, or $\lceil X/x \rceil$, or $\lfloor Y/x \rfloor$, or $\lceil Y/x \rceil$ uplink beams among the actually used Y uplink beams are changed compared to the X actually used uplink transmitting beams in the previous random access attempt, the preamble power ramping counter is increased by 1; otherwise, the preamble power ramping counter remains unchanged;

in a case where one preamble power ramping counter is determined for each preamble determined to be transmitted, the method for determining the counting result of the preamble power ramping counter includes:

when the uplink transmitting beam for transmitting the preamble is changed, the preamble power ramping counter remains unchanged; otherwise, the preamble power ramping counter is increased by 1;

in a case where one preamble power ramping counter is determined for all preambles determined to be transmitted, the method for determining the counting result of the preamble power ramping counter includes:

during a new random access attempt, when less than and/or equal to 1, or Y, or Y/x, or X, or X/x, or $\lfloor X/x \rfloor$, or $\lceil X/x \rceil$, or $\lfloor Y/x \rfloor$, or $\lceil Y/x \rceil$ uplink beams among all the actually used Y uplink beams are changed compared to all the X actually used uplink transmitting beams in the previous random access attempt, the preamble power ramping counter is increased by 1; otherwise, the preamble power ramping counter remains unchanged;

where the M, N, X and Y are all positive integers, and the x is a set ratio.

The method further includes the step of:

during the transmission of the multiple preambles corresponding to each of the determined downlink transmitting beams, calculating the transmitting power by using a Path Loss (PL) obtained by a same corresponding downlink transmitting beam; or, calculating the transmitting power based on a unified PL.

The step of calculating the transmitting power based on a unified PL includes:

selecting the PL corresponding to the downlink transmitting beam having the maximum Reference Signal Received Power (RSRP); or, selecting the PL corresponding to the downlink transmitting beam having the minimum RSRP; or, selecting an average of PLs corresponding to all downlink transmitting beams; or, randomly selecting, according to a predefined or configured RSRP threshold, the downlink transmitting beam having a PL not greater than or not less than the threshold with equal probability, and calculating the transmitting power by using the PL of the downlink transmitting beam.

The method for determining the counting result of the preamble transmission counter includes:

whenever the UE performs a new random access attempt, increasing the preamble transmission counter by 1; or, whenever the UE performs a new random access attempt and there are L preambles determined to be transmitted in the new random access attempt, increasing the preamble transmission counter by L, where the L is a positive integer.

The method further includes the step of:

when the preamble transmission counter exceeds a preset preamble maximum preamble_max, reporting a random access problem; or, when the preamble transmission counter exceeds preamble_max*N*M, reporting a random access problem, where N is the number of the determined downlink transmitting beams, M is the number of preambles corresponding to each of the downlink transmitting beams, and both M and N are positive integers.

The method further includes the step of:

starting a random access timer when the UE starts to transmit a first preamble, and reporting a random access problem when the random access timer expires; or, reporting a random access problem when the preamble transmission counter exceeds the preset preamble maximum preamble_max or preamble_max*N*M and when the random access timer does not expire; or, reporting a random access problem when the preamble transmission counter does not exceed the preset preamble maximum preamble_max or preamble_max*N*M and when the random access timer expires;

where N is the number of the determined downlink transmitting beams, M is the number of preambles corresponding to each of the downlink transmitting beams, and both M and N are positive integers; and, the reporting a random access problem is reporting a random access problem to a higher layer.

The step of performing multiple preambles based random access includes:

determining a Random Access Response (RAR);

the method for determining the RAR includes:

detecting a matched RAR; or detecting an RAR, continuously searching within a configured RAR search window, and determining the RAR in the following way if multiple matched RARs are found:

randomly selecting an RAR with equal probability;

selecting, according to an uplink grant, an RAR supporting the earliest subsequent uplink transmission; and determining an RAR according to a Hybrid Automatic Repeat reQuest (HARQ) progress ID indicated in the RAR.

The step of determining an RAR according to an HARQ progress ID indicated in the RAR includes:

if there are multiple different HARQ progress IDs, transmitting corresponding uplink data according to an uplink grant indicated in the corresponding RAR; or, for a same HARQ progress ID, randomly selecting an RAR with equal probability, or selecting, according to an uplink grant, an RAR supporting the earliest subsequent uplink transmission.

The step of determining, by a User Equipment (UE), random access resources includes:

acquiring, by the UE, measurement reference signals configured by a base station, the measurement reference signals including synchronization signal blocks and/or Channel State Information-Reference Signals (CSI-RSs); and measuring, by the UE, the configured measurement reference signals to obtain a measurement result of the measurement reference signals, reporting the measurement result, and acquiring random access resources configured according to the measurement result by the base station.

The step of reporting the measurement result includes any one of the following:

feeding back measurement results of all the configured measurement reference signals to the base station;

feeding back, according to a predefined or configured threshold and to the base station, measurement results of all measurement reference signals greater than or not less than the threshold; and feeding back measurement results of all the configured measurement reference signals to the base station, and feeding back, according to a predefined or configured threshold and to the base station, indexes of all measurement reference signals greater than or not less than the threshold.

The step of determining, by a UE, random access resources includes:

reading, by the UE and from random access configuration information transmitted in a downlink channel by a base station, available random access resources in the present cell; and selecting, according to the measurement result of the measurement reference signals, indexes of the measurement reference signals to obtain corresponding random access resources.

The step of selecting, according to the measurement result of the measurement reference signals, indexes of the measurement reference signals includes:

selecting indexes of multiple measurement reference signals having the optimal measurement result;

selecting, based on a preset or configured threshold, indexes of all measurement reference signals having a measurement result satisfying the threshold; and selecting, based on a preset or configured threshold, indexes of multiple measurement reference signals among all measurement reference signals having a measurement result satisfying the threshold.

The method further includes the step of:

attempting to receive a signal on a channel, on which signals are to be transmitted, within a period of time before the real transmission of signals, indicating that this channel has been occupied if the received signal energy is not less than a preset or configured threshold, and giving up this transmission.

The present disclosure further provides a random access method, including steps of:

configuring, by a base station, random access resources; and transmitting the random access resources, the random access resources being used for performing multiple preambles based random access by a User Equipment (UE).

The present disclosure provides a user equipment, including:

an acquisition unit configured to determine random access resources; and a random access unit configured to, when it is determined according to the random access resources that multiple preambles based random access is performed, determine a preamble sequence and an uplink transmitting beam for transmitting multiple preambles, and perform multiple preambles based random access.

The present disclosure provides a base station, including:

a configuration unit configured to configure random access resources; and a transmission unit configured to transmit the random access resources, the random access resources being used for performing multiple preambles based random access by a User Equipment (UE).

In conclusion, in the present disclosure, a User Equipment (UE) determines random access resources; and, when it is determined according to the random access resources that multiple preambles based random access is performed, the maximum number of preambles that may be transmitted in one random access attempt and the preamble sequences and downlink transmitting beams for the preambles that may be transmitted are determined according to the determined number of downlink transmitting beams and the number of preambles that may be transmitted for each downlink transmitting beam, and the multiple preambles based random access is then performed. In the present disclosure, the a preamble pence and the uplink transmitting beam for transmitting multiple preambles may be determined, so that the present disclosure may realize the random access to multiple preambles.

Additional aspects and advantages of the present disclosure will be partially appreciated and become apparent from the descriptions below, or will be well learned from the practices of the present disclosure.

The purpose of the present invention is that the beam failure recovery procedure in the prior art is based on contention-free but does not solve the problem of allocating contention-free time-frequency resources and sequence resources for different terminals with lower signaling overhead. In addition, both the beam failure recovery procedure and the on demand system information transmitting request procedure are based on the random access procedure, but the procedure optimization is not performed on these two application scenarios. The present invention optimizes the above scenarios in order to reduce the delay of these two scenarios.

In order to achieve the above objectives, the present invention provides a method for beam failure recovery request, comprising the following steps:

acquiring, by a terminal, channel time-frequency resource configuration information and preamble configuration information used for transmitting a beam failure recovery request;

selecting, by the terminal, a candidate downlink transmit beam according to a measurement result;

selecting, by the terminal, a channel time-frequency resource and/or a preamble according to association between a downlink transmit beam and the channel time-frequency resource and/or the preamble, the time-frequency resource configuration information and the preamble allocation information; and transmitting, by the terminal, the preamble on the channel time-frequency resource.

Preferably, the step of acquiring, by a terminal, configuration information such as channel time-frequency resource configuration information and preamble configuration information used for transmitting a beam failure recovery request comprises: acquiring, by the terminal, the configuration information such as the channel time-frequency resource configuration information and the preamble configuration information used for transmitting the beam failure recovery request from a downlink control channel or a high layer signaling configuration.

Preferably, the preamble configuration information comprises a preamble group indication and an index indication within group.

Preferably, the preamble configuration information comprises a preamble start index and a preamble number indication.

Preferably, the preamble group indication is used for indicating the number of preamble groups, and the index indication within group is used for indicating a preamble index within a group, allocated to the terminal, in the preamble group.

Preferably, the preamble group indication is used for indicating an interval between adjacent preambles in a group, and the index indication within group is used for indicating a preamble index within a group, allocated to the terminal, in the preamble group.

Preferably, the channel time-frequency resource configuration information comprises a channel indication index and a downlink beam index.

Preferably, the channel time-frequency resource configuration information further comprises an available subframe index and/or an available radio frame index and a frequency offset indication.

Preferably, the measurement result is a reference signal receiving power of the downlink signal, wherein, the downlink signal comprises: a synchronization signal block, a channel state information reference signal (CSI-RS) and a beam reference signal.

Preferably, the terminal selects a time-frequency resource and a preamble corresponding to the candidate downlink transmit beam, according to the correspondence, the time-frequency resource configuration information and the preamble configuration information.

Preferably, the method falls back to a contention-based random access procedure, if the downlink beam obtained by the terminal according to the downlink measurement result does not exist in the correspondence or the times of beam failure recovery request re-attempt of the terminal exceeds a pre-defined maximum attempt times.

Preferably, a terminal identification and the beam failure recovery request indication are carried in message 3 of the contention-based random access procedure.

Preferably, candidate downlink beam index information is further carried in message 3.

Preferably, the candidate downlink beam index corresponds to one or more downlink transmit beams, and one or more downlink beam index information is transmitted in message 3.

Preferably, a beam failure recovery request response is carried in message 4 of the contention-based random access procedure.

The present invention provides a method for requesting to transmit system information, comprising the following steps of:

selecting, by a terminal, a preamble according to association between on demand system information or system information group and a random access preamble;

transmitting, by the terminal, the preamble in a random access channel; and detecting, by the terminal, a random access response to acquire the time-frequency resource location of the system information or system information group.

Preferably, the correspondence between the system information or the system information group and the random access preamble is configured by a high layer signaling or a predetermined manner.

Preferably, the step of detecting, by the terminal, a random access response to acquire the time-frequency resource location of the system information or system information group comprises: acquiring the time-frequency resource location of the system information or system information group according to the downlink resource allocation information in the random access response, if a downlink control channel is scrambled by an Random Access-Radio Network Temporary Identity (RA-RNTI) corresponding to the random access channel, and the random access response in a downlink shared channel indicated by the downlink control channel includes a preamble identifier matching the transmitted preamble; or acquiring, by the terminal, the time-frequency resource location of the system information/system information group according to the downlink resource allocation information indicated in the downlink control channel, if the downlink control channel is scrambled by an on demand system information RNTI and the system information/system information group indicated by the on demand system information RNTI includes the system information/system information group requested by the terminal.

The present invention provides a method for requesting to transmit system information, comprising the following steps of:

transmitting, by a terminal, a preamble: on a random access channel;

detecting, by the terminal, a random access response;

transmitting, by the terminal, message 3 on an uplink time-frequency resource indicated by an uplink grant in the random access response, wherein, message 3 comprises a system information index; and detecting, by the terminal, message 4 to acquire a time-frequency resource location of system information/system information group.

Preferably, message 3 comprises a transmit beam indication.

Preferably, the transmit beam indication is a previous transmit beam indication which indicates a downlink transmit beam used for previously transmitting downlink data by the terminal; or the transmit beam indication is at least one of a synchronization signal block index, a channel state information reference signal index, a beam reference signal index, a beam index, and a beam direction deviation indication.

Preferably, the step of detecting, by the terminal, message 4 comprises: detecting, by the terminal, downlink control information in a downlink control channel, and allocating, by the terminal, message 4 according to the downlink time-frequency resource allocation information, and acquiring the system information according to the downlink time-frequency resource scheduling information in the message 4, if the downlink control information is scrambled by a C-RNTI of the terminal or a temporary C-RNTI allocated by a base station.

Preferably, the step of detecting, by the terminal, message 4 comprises: detecting, by the terminal, downlink control information in a downlink control channel, and acquiring the system information according to the downlink time-frequency resource allocation information in a control information, if the downlink control information is scrambled by an on demand system information RNTI and the system information and system information group corresponding to the on demand system information RNTI contains the system information and system information group requested by the terminal.

The present invention provides an apparatus for beam failure recovery request, comprising the following modules:

a configuration information acquisition module, configured to acquire channel time-frequency resource configuration information and preamble configuration information for transmitting a beam failure recovery request;

a candidate downlink transmit beam selecting module, configured to select a candidate downlink transmit beam according to a measurement result;

a channel time-frequency resource and preamble selecting module, configured to select a channel time-frequency resource and/or a preamble, according to the correspondence between the downlink transmit beam and the channel time-frequency resource and/or the preamble, and the channel time-frequency resource configuration information and the preamble configuration information; and a preamble transmitting module, configured to transmit the selected preamble on the selected channel time-frequency resource.

The present invention provides an apparatus for requesting to transmit system information, comprising the following modules:

a preamble selecting module, configured to select a preamble according to association between on demand system information or system information group and a random access preamble;

a preamble transmitting module, configured to transmit the preamble on a random access channel; and a random access response detecting module, configured to detect a random access response and acquire a time-frequency resource location of the system information or system information group.

The present invention provides an apparatus for requesting to transmit system information, comprising the following modules:

a preamble transmitting module, configured to transmit a preamble on a random access channel;

a random access response detecting module, configured to detect a random access response;

a message 3 transmitting module, configured to transmit message 3 according to are uplink grant indication in the random access response, wherein message 3 comprises a system information index; and a message 4 detecting module, configured to detect a message 4 and acquire a time-frequency resource location of the system information and system information group.

Compared with the prior art, the technical effects of the present invention include, but are not limited to: the signaling overhead used for configuring the time-frequency resources and the preamble for the contention-free beam failure recovery procedure can be reduced, and the delay of the beam failure recovery can be reduced by optimizing the beam failure recovery request response and falling back to the contention-based random access procedure; by optimizing the random access response, the structure of message 3, and the structure of message 4, the request delay for on demand system information can also be reduced.

BRIEF DESCRIPTION OF THE DRAWINGS

In order to illustrate the technical solution of the embodiment of the present invention more clearly, the accompanying drawings used in the descriptions of embodiments will be introduce briefly. Obviously, the accompanying drawings in the following description are only some embodiments of the present invention, and other drawings can be obtained according to the following drawings on the premise that without any creative labor is paid out for those skilled in the art.

FIG. 31 is an indication manner for preambles;

DETAILED DESCRIPTION

To make those skilled in the art understand the technical solutions of the specific implementation better, the technical solutions in the embodiments of the specific implementation will be clearly and completely described below with reference to the accompanying drawings in the embodiments of the specific implementation.

In some flows described in the specification and the claims of this implementation and in the accompanying drawings, there are multiple operations which occur in a specific order. However, it should be clearly understood that these operations may be performed without the order in which they occur in the article or may not be performed in parallel. The numbers for operations such as 101, 102 are just provided to distinguish different operations and the numbers themselves do not represent any execution order. In addition, these flows may include more or less operations and these operations may be performed in order or performed in parallel. It is to be noted that, the description such as "the first" and "the second" in the article is used to distinguish different messages, devices and modules. It does not represent any order and does not define that "the first" and "the second" are different types.

The technical solutions in the embodiments of the specific implementation will be clearly and completely described below with reference to the accompanying drawings in the embodiments of the specific implementation. Apparently, the embodiments described herein are merely a part but not all of the embodiments of the specific implementation. All other embodiments obtained by those skilled in the art without paying any creative effort on the basis of the embodiments in the specific implementation are within the protection scope of the specific implementation.

Figure 1:
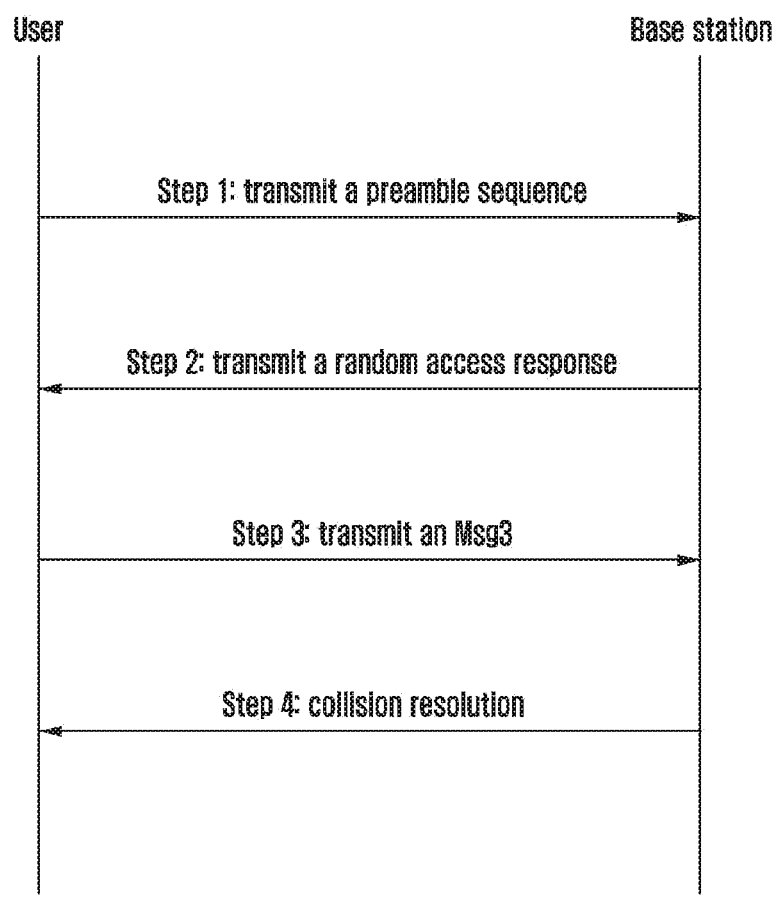
FIG. 1 is a schematic flowchart of a conventional contention-based random access.
Figure 2:
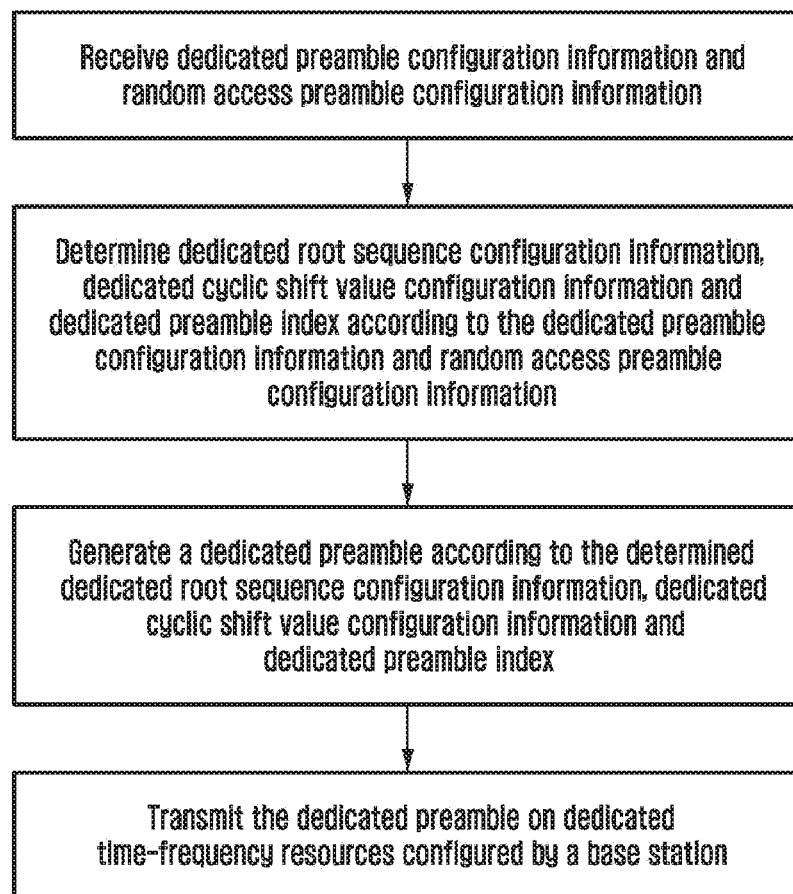
FIG. 2 is a schematic flowchart of a method for generating a preamble according to an embodiment of the present invention.

The present invention provides a method for configuring information, as shown in FIG. 2. Dedicated beam failure recovery resources (including resources such as preamble resources and time-frequency resources) are configured for a UE to perform a beam failure recovery, wherein the preamble resources include a dedicated cyclic shift indication, a root sequence indication, etc. The present invention also provides how the UE acquire the preamble resources for a beam failure recovery by acquired configuration information of random access preamble resources (contention-based and contention-free random access preamble resources) and dedicated beam failure recovery resource information.

From the network device side, a gNB will configure preamble resources for a random access in system information, including root sequence indices, cyclic shifts and number of available random access preambles (wherein the total number of available preambles and/or the number of preambles for a contention-based random access and/or the number of preambles for a contention-free random access can be included).

A base station will also configure preamble resources for a beam failure recovery request used by the UE, including one or more of the following: root sequence index, cyclic shift value and preamble index, wherein:

1. The root sequence index indicates a basic root sequence used for generating UE-dedicated preamble resources; the root sequence index may be a physical root sequence index, or a logic root sequence index. The root sequence index for the beam failure recovery request may be:

a) obtained according to the root sequence index in the random access preamble configuration, for example, the root sequence index indicating the beam failure recovery request may be equal to the root sequence index of random access preamble, or a relative offset may be set;

b) configured separately.

2. The cyclic shift value indicate the size of the shift on the root sequences, by which the UE determines the shift between every two adjacent preambles. The cyclic shift value for the beam failure recovery request may be:

a) confirmed according to the cyclic shift value in the random access preamble configuration, for example, the cyclic shift value indicating the beam failure recovery request may be equal to the cyclic shift value of the random access preamble, or it is scaled down or scaled up, or a relative offset is set;

b) configured separately.

3. The preamble index indicates how many cyclic shifts occurred when the root sequence of the UE is produced. The preamble index for the beam failure recovery request may be:

a) contention-free random access preamble index configuration which is configured according to the random access preamble, for example, it may be informed that the preamble index for the beam failure recovery request is the same as the random access preamble index, or a relative offset is set;

b) configured separately, the details of which will be described below.

i. the preamble index may be determined according to the number of preambles to be supported by the beam failure recovery request, for example, the number of preambles to be supported by the beam failure recovery request is N and the preamble index are directly given a value from 0 to N−1.

ii. the preamble index may be determined according to the number of preambles to be supported by the beam failure recovery request within the cyclic shift value of every contention-free preamble. For example, within one cyclic shift value, the gNB also supports M preambles for the beam failure recovery request. Therefore, the preamble index here is indicated to be given a value from 0 to M−1, and preambles for the beam failure recovery request, which are determined finally, are collectively confirmed according to random access preamble configuration information and preamble configuration information for the beam failure recovery request.

From the UE side, the UE will read the system information to acquire preamble resource configuration information for a random access which is transmitted by a system in the initial access or link state. In addition, the UE will also receive preamble resources for the beam failure recovery request from the gNB, which is acquired by a downlink channel, and determine its own preamble sequence for the beam failure recovery request, wherein:

1. The preamble sequence configured for the UE is found directly according to a root sequence indicated by the root sequence index and the configured cyclic shift value and preamble index.

a) it is to be noted that, if the beam failure recovery request and random access request share time-frequency resources while they are distinguished from preamble resources, that is, CDM, when the gNB is configuring the preamble index, it should avoid collision with preambles for random access, for example, a part of or all of contention-free random access preamble resources in a contention-free random access preamble resource pool are configured for the beam failure recovery request.

2. The UE can find the starting point of contention-free preamble according to the root sequence indicated by the root sequence index, the cyclic shift value configured for the random access, the number of contention-based preambles and the number of preambles supported by corresponding Synchronization Signal blocks (SS blocks) or Random Access Channel occasion (RACH occasion), and find the preamble sequences configured for the UE according to the cyclic shift value and preamble index configured by a BFRQ. Particularly a) the UE is informed of a contention-free preamble index, and by using the contention-free preamble index as the starting point, the UE finds the preamble sequence configured for itself according to the cyclic shift value and the preamble index configured by the BFRQ.

In one embodiment, a method for configuring information according to the present invention will be introduced. A gNB configures preamble resource information for a beam failure recovery request and informs the UE of the information. After the UE acquires the configuration information, the preamble sequence for a beam failure recovery request of a user is determined finally by preamble configuration information for a beam failure recovery request and random access preamble configuration information which may be used.

From the network device side, a gNB will configure preamble resources for random access in system information, including root sequence index, cyclic shift value and number of available random access preambles (wherein the total number of available preambles and/or the number of preambles for contention-based random access and/or the number of preambles for contention-free random access may be included).

A base station will also configure dedicated UE-dedicated preamble resources for a beam failure recovery request, which may include one or more of the following: root sequence index, cyclic shift value and preamble index, wherein:

1. The root sequence index indicate a basic root sequence used for generating UE-dedicated preamble resources; the root sequence index may be a physical root sequence index, or a logic root sequence index. The root sequence index for the beam failure recovery request may be:

a) obtained by the UE according to the root sequence index in the random access preamble configuration, for example:

i. the root sequence index of the beam failure recovery request preset by a network may be equal to the root sequence index of the random access preamble, that is, they are configured as: Root_sequence_BFRQ=Root_sequence_BFRQ_RA;

ii. the root sequence index for the beam failure recovery request configured by the network may set an offset ΔRoot_sequence relative to the root sequence index of random access preamble, i.e. Root_sequence_BFRQ=Root_sequence_BFRQ_RA+ ΔRoot_sequence;

b) configured separately, that is, they are configured as specific values. The values are selected from a root sequence resource pool of the random access preamble, i.e. Root_sequence_BFRQ=N_value. And taking LTE as an example, N_value is a value selected from 0-837.

2. The cyclic shift value indicate the size of the shift on the root sequences, by which the UE determines the shift of every two adjacent preambles. The cyclic shift value for the beam failure recovery request include:

a) acquired by the UE according to the cyclic shift value (which is represented as CS_ra) in the random access preamble configuration, for example, the cyclic shift value (which is represented as CS_bfrq) for the beam failure recovery request may be:

i. equal to the cyclic shift value of the random access preamble which is preset by the network, i.e. CS_bfrq=CS_ra.

ii. changed on the scale by the UE according to the cyclic shift value of the random access preamble, that is, a scale factor β is configured on the network side, i.e. CS_bfrq=CS_ra*β. β may be a decimal between 0 and 1, which indicates that CS_bfrq is scaled down according to a certain scale CS_ra. β may be greater than 1, which indicates that CS_bfrq is scaled up according to a certain scale CS_ra. β may be informed according to direct M bits or the true β value may be read from a pre-defined table according to M bits. As shown in the below table, 2 bits are used to indicate 4 possible β values.

TABLE 1

Exemplary table indicating cyclic shift value scale

| Bit value | β value |
|---|---|
| 00 | 0.25 |
| 01 | 0.5 |
| 10 | 0.75 |
| 11 | 1 | iii. acquired by the UE according to an offset ΔCS relative to the cyclic shift value of the random access preamble, that is, ΔCS is configured on the network side and configured as CS_bfrq=CS_ra+ΔCS. The offset ΔCS may be a negative number, which indicates decrease of the cyclic shift relative to CS_ra; the offset may be a positive number, which indicates increase of the cyclic shift value relative to CS_ra. The offsets ΔCS may be directly informed by M bits, that is, bit values represent specific offsets. And the true offsets may also be read from a pre-defined table by M bits.

TABLE 2

Exemplary table indicating cyclic shift value offset

| Bit value | ΔCS value |
|---|---|
| 00 | −8 |
| 01 | −4 |
| 10 | −2 |

TABLE 2-continued

Exemplary table indicating cyclic shift value offset

| Bit value | ΔCS value |
|---|---|
| 11 | 0 | b) the CS_bfrq is configured separately, that is, it is configured that CS_bfrq=N_cs. The N_cs is selected from cyclic shift values available for the random access.

3. The preamble index indicates how many cyclic shifts occurred when the root sequence of the UE is produced. The preamble index (preamble_index_bfrq) for the beam failure recovery request include:

a) configured by the UE according to a contention-free random access preamble index (preamble_index_ra) configured by the random access preamble, for example, the network may preset that the preamble index for the beam failure recovery request is the same as the preamble index for the random access, i.e. preamble_index_bfrq=preamble_index_ra; or configured by the UE according to a relative offset Δpreamble_index configured by the network, i.e. preamble_index_bfrq=preamble_index_ra+Δpreamble_index; specifically, Δpreamble_index may be directly informed by M bits, or read from a corresponding table in the way similar to table 1 and table 2 which will not be described again;

b) configured separately, the details of which will be described below.

i. the preamble index may be determined according to the number of preambles to be supported by the beam failure recovery request, for example, the number of preambles to be supported by the beam failure recovery request is N and the preamble indices are directly given a value from 0 to N−1.

ii. the preamble index may be determined according to the number of preambles to be supported by the beam failure recovery request within the cyclic shift value of every contention-free preamble. For example, within one cyclic shift value, the gNB also supports M preambles for the beam failure recovery request. Therefore, the preamble index here is indicated to be given a value from 0 to M−1, and the preamble for the beam failure recovery request which is determined finally is collectively confirmed according to random access preamble configuration information and preamble configuration information for the beam failure recovery request.

After generating configuration information, the net device transmits the configuration information to the UE by a downlink channel (broadcast channel, physical downlink control channel or physical downlink shared channel); then, the network device retrieves possible preamble sequences transmitted by the UE on corresponding time-frequency resources according to the configured preamble information.

From the UE side, the UE will read the system information to acquire preamble resource configuration information for a random access which is transmitted by a system in the initial access or link state. In addition, the UE will also receive preamble resources for the beam failure recovery request from the gNB which are acquired through a downlink channel, and determine the preamble sequence for the beam failure recovery request, including:

1. The preamble sequence allocated to the UE are found directly according to root sequence indicated by the root sequence index, and the acquired cyclic shift value and preamble index.

Figure 3:
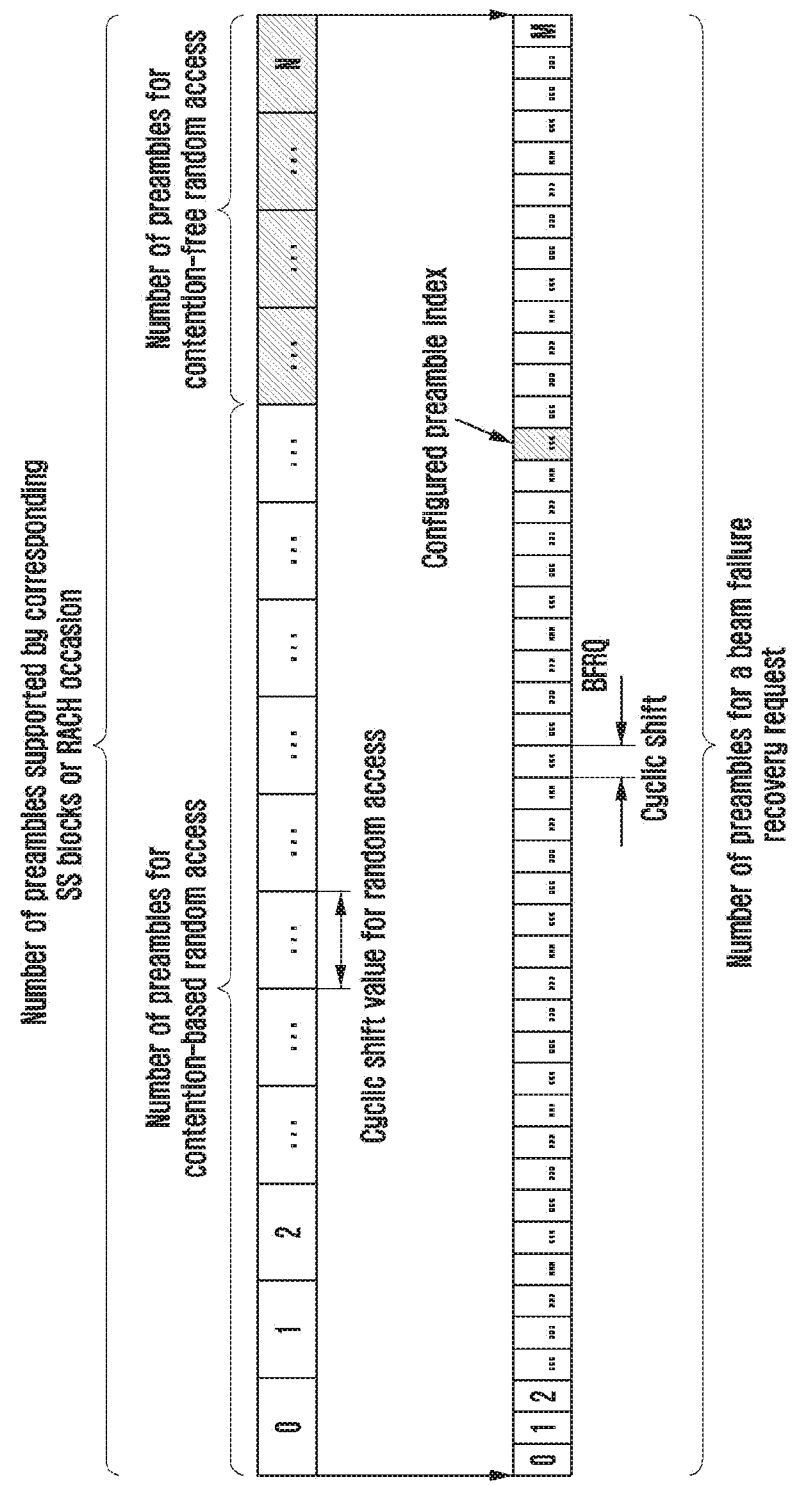
FIG. 3 is an example 1 of configuring a preamble for a beam failure recovery request.

For example, when the beam failure recovery request and random access are distinguished in the frequency domain, the configured preamble sequence is determined completely on the given root sequence according to the cyclic shift value and the preamble index for the beam failure recovery request. As shown in FIG. 3, the UE may determine the preamble sequence configured for itself on the network side from the starting point of the root sequence according to the cyclic shift value and preamble index.

Figure 4:
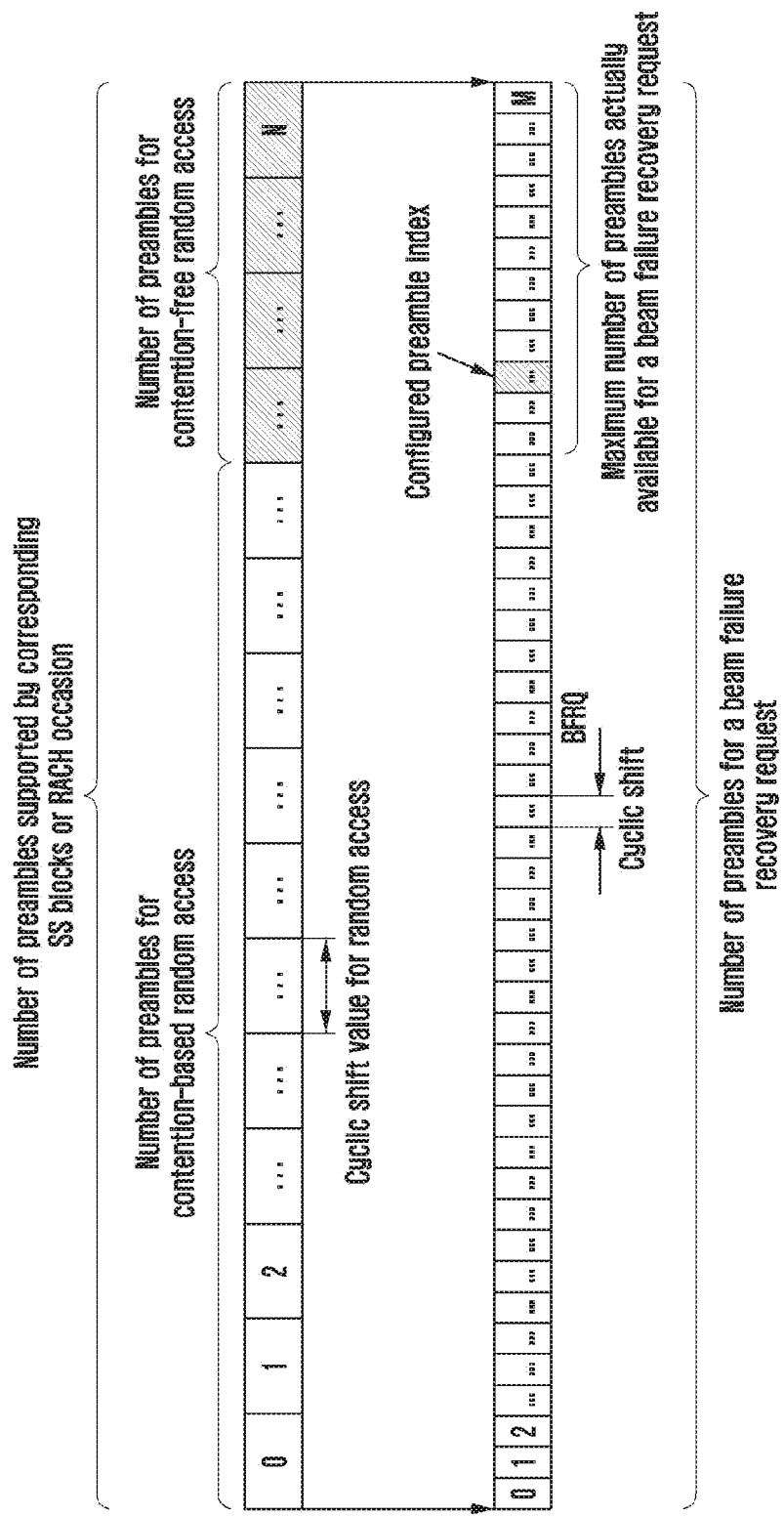
FIG. 4 is an example 2 of configuring a preamble for a beam failure recovery request.
Figure 5:
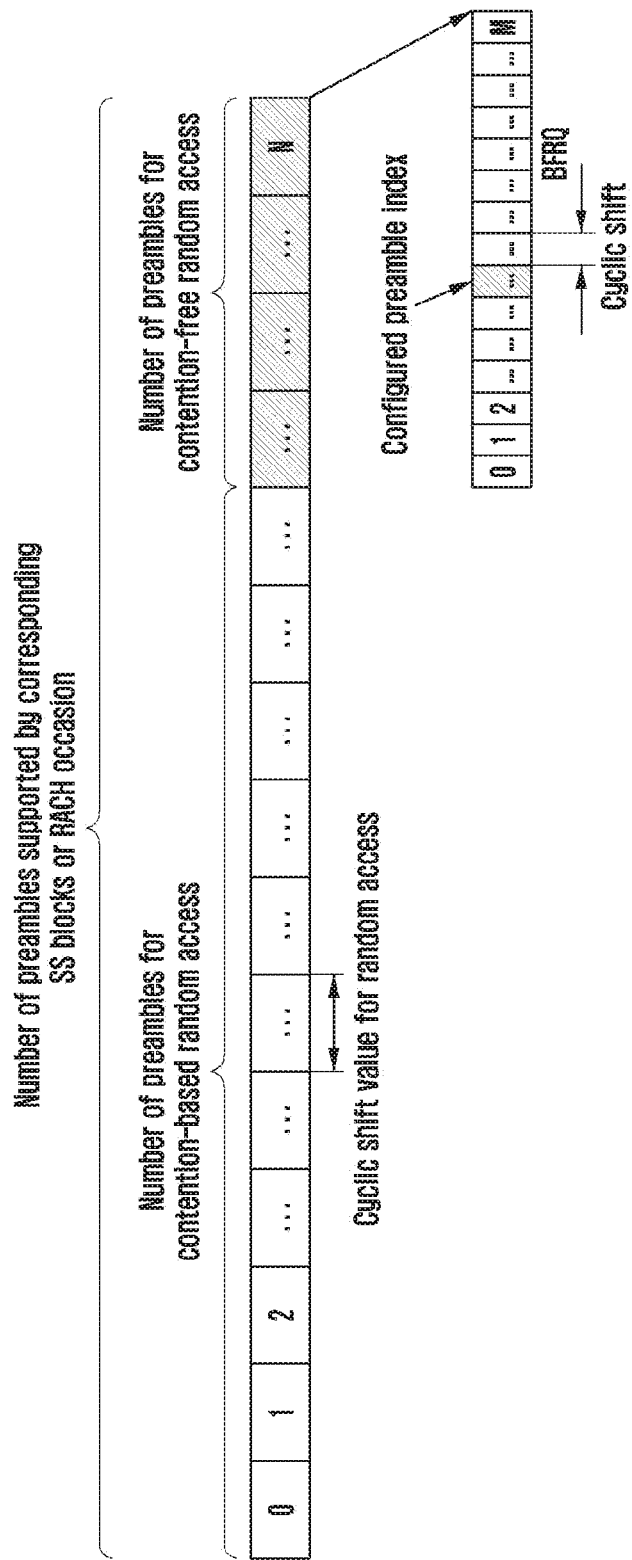
FIG. 5 is an example 3 of configuring a preamble for a beam failure recovery request.

In addition, if the beam failure recovery request and the random access request are share time-frequency resources while they are distinguished from preamble resources, that is, CDM, when the gNB is configuring the preamble index, it should avoid collision with preambles for the random access, for example, a part of or all of contention-free random access preamble resources in a contention-free random access preamble resource pool are configured for the beam failure recovery request. Wherein there are three ways, which are as follows respectively:

a) the first way is shown in FIG. 4. The preamble index still starts from the initial, but the number of preambles which are actually available for being actually read by the UE is configured from contention-free random access preamble resources.

b) the second way is shown in FIG. 5. The preamble index for the beam failure recovery starts directly from the starting position of the contention-free random access preamble index. In this case, the UE first needs to find the starting position of the contention-free random access preamble index (preamble_index_CFRA) by the configuration of random access preambles. Taking LTE as an example, there are 64 preambles in total, where 0-31 preambles are configured as contention-based random access preambles, 32-63 preambles are configured as contention-free random access preambles, then preamble_index_CFRA={32,33, . . . 63}, that is, the starting position is 32. For the UE which needs to perform beam failure recovery scanning, the position of the 32nd preamble is found first according to the cyclic shift value and preamble index configured by the random access preamble. Then it is used as the starting point, and the configured preamble sequence of the UE are determined according to preamble cyclic shift value and preamble index (preamble_index_bfrq) configured by beam failure recovery request.

Figure 6:
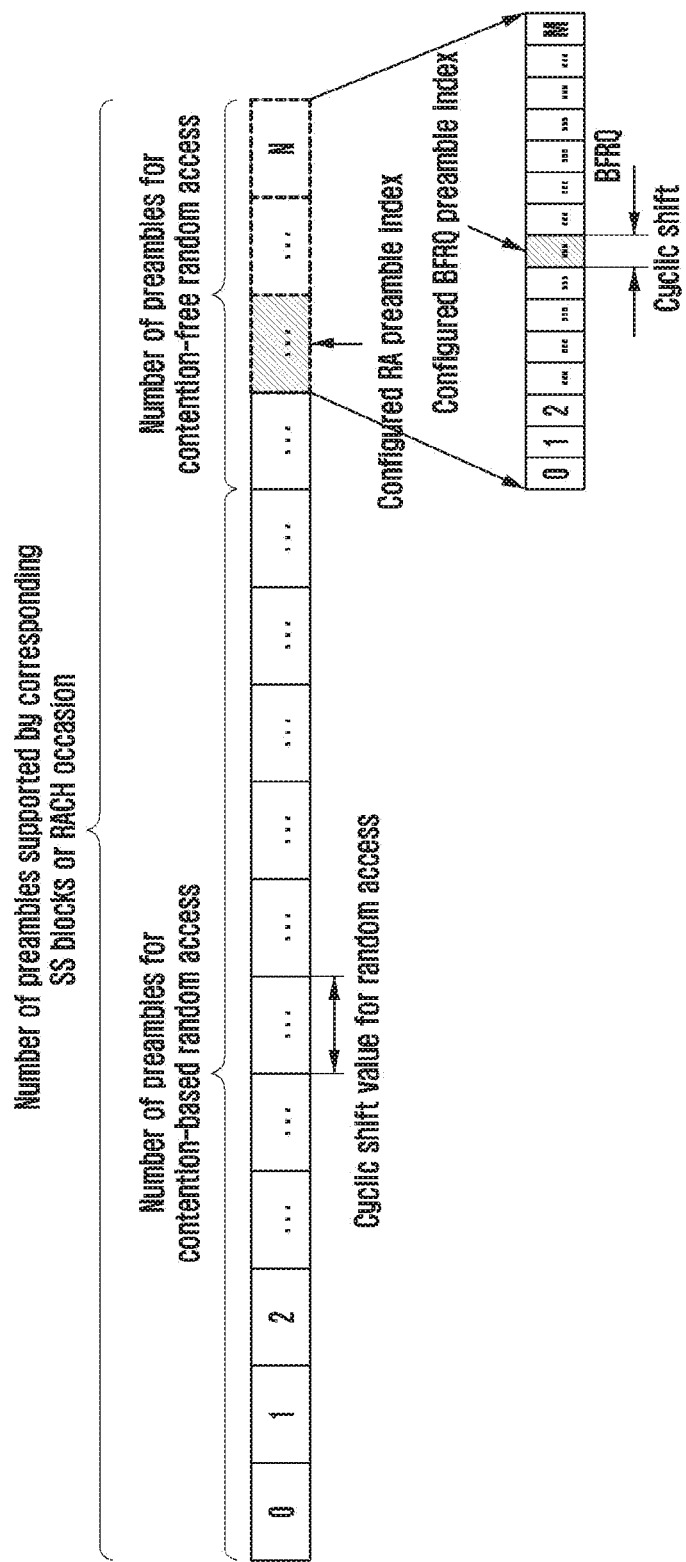
FIG. 6 is an example 4 of configuring a preamble for a beam failure recovery request.

A dedicated contention-free random access preamble index is configured for the UE simultaneously. The UE may determine the starting position of the preamble for the beam failure recovery request by the random access preamble configuration and the dedicated contention-free random access preamble index. Taking LTE as an example, there are 64 preambles in total, where 0-31 preambles are configured as contention-based random access preambles, 32-63 preambles are configured as contention-free random access preambles, then preamble_index_CFRA={32, 33, . . . 63} and an dedicated preamble_index_cfra=40 is configured for the UE, that is, the starting position of the preamble for the beam failure recovery request is the random access preamble index 40. For the UE which needs to perform beam failure recovery scanning, the position of the 40th preamble is found first according to the cyclic shift value and preamble index configured by the random access preambles. Then it is used as the starting point, and the configured preamble sequence of the UE are determined according to preamble cyclic shift value and preamble index (preamble_index_bfrq) configured by the beam failure recovery request, as shown in FIG. 6.

Figure 7:
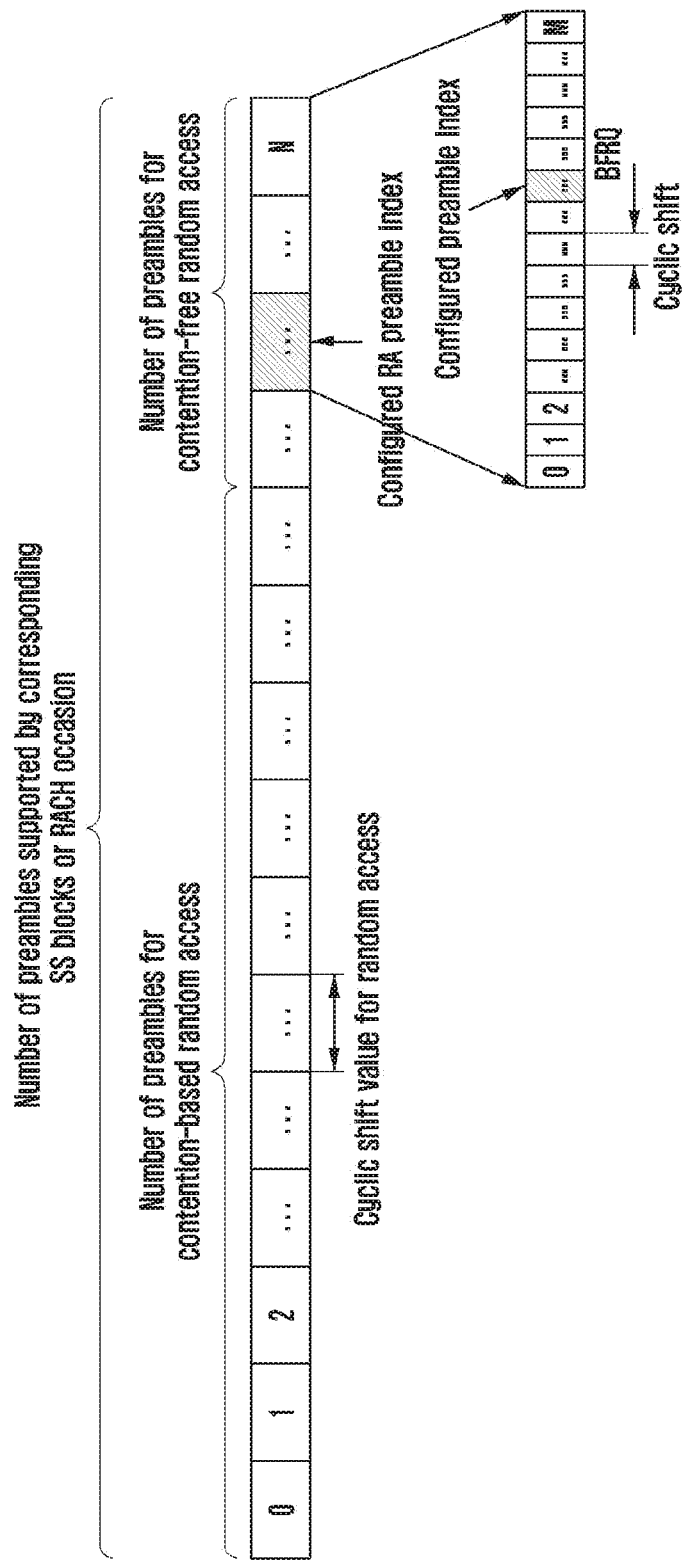
FIG. 7 is an example 5 of configuring a preamble for a beam failure recovery request.
Figure 8:
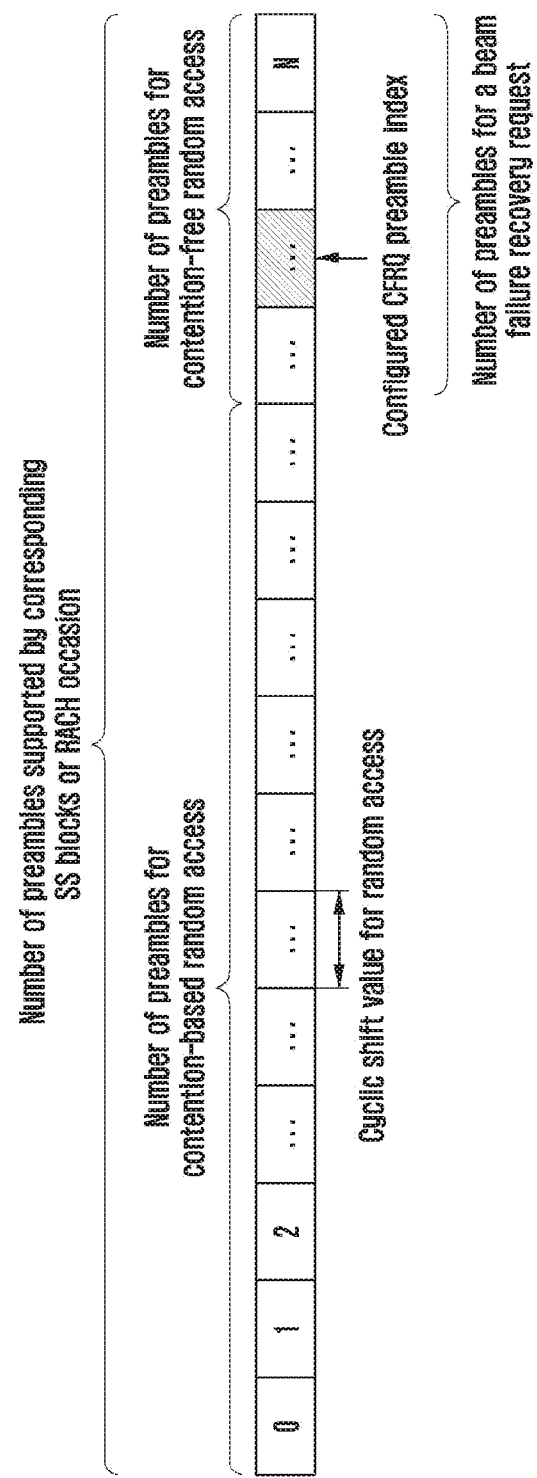
FIG. 8 is an example 6 of configuring a preamble for a beam failure recovery request.

A dedicated contention-free random access preamble index is configured for the UE simultaneously. The UE may determine the starting position of the preamble for the beam failure recovery request by the random access preamble configuration and the dedicated contention-free random access preamble index. Taking LTE as an example, there are 64 preambles in total, where 0-31 preambles are configured as contention-based random access preambles, 32-63 preambles are configured as contention-free random access preambles, then preamble_index_CFRA={32, 33, . . . 63} and an dedicated preamble_index_cfra=40 is configured for the UE, that is, the starting position of the preamble for the beam failure recovery request is the random access preamble index 40. For the UE which needs to perform beam failure recovery scanning, the position of the 40th preamble is found first according to the cyclic shift value and preamble index configured by the random access preambles. Then it is used as the starting point, and the configured preamble sequence of the UE are determined according to preamble cyclic shift value and preamble index (preamble_index_bfrq) configured by the beam failure recovery request. In this case, particularly, only the random access preamble index 40 is used as the starting point of the preamble for the beam failure recovery request and is determined within one random access preamble cyclic shift, that is, the random access preamble index 41 is not used for the beam failure recovery request, as shown in FIG. 7.

c) the third way is that preamble configuration for the beam failure recovery request acquired by the UE is the same as random access preamble configuration, and the UE acquires the dedicated preamble index for the beam failure recovery request to perform the beam failure recovery request, as shown in FIG. 8.

The above ways according to the preset invention will not be limited to a beam failure recovery. For the objectives of on-demand system information transmitting and the scheduling request, similar ways may also be used.

Figure 9:
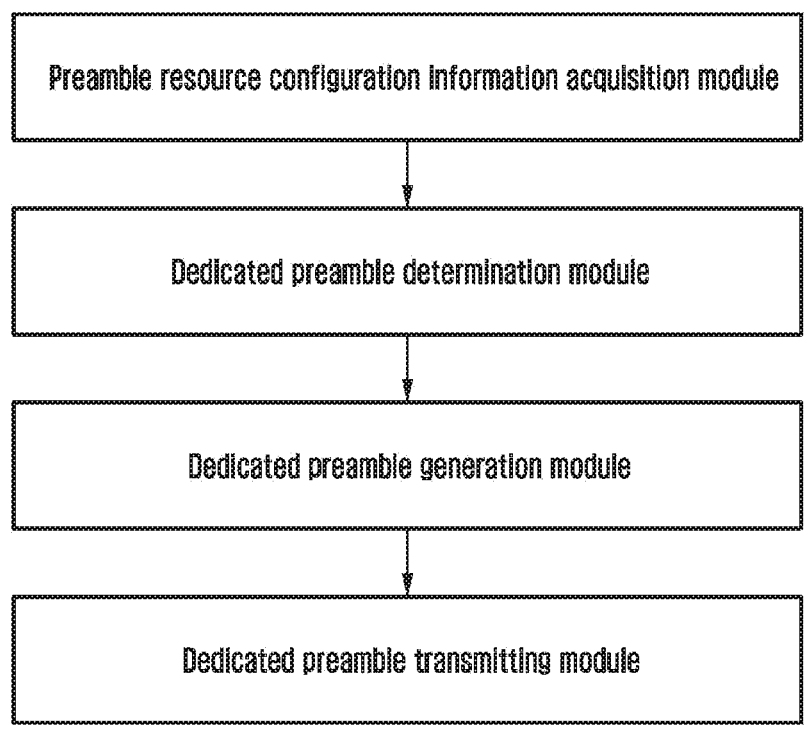
FIG. 9 is a schematic diagram of a User Equipment (UE) according to the present invention.

The present invention further provides a User Equipment (UE), as shown in FIG. 9, comprising the following modules:

a preamble resource configuration information acquisition module, configured to receive random access preamble configuration and dedicated preamble configuration information;

a dedicated preamble determination module, configured to determine root sequence configuration information of a dedicated preamble, dedicated cyclic shift value configuration information and dedicated preamble index;

a dedicated preamble generation module, configured to generate the dedicated preamble according to the determined root sequence configuration information of the dedicated preamble, the determined cyclic shift value configuration information and the determined preamble index; and a dedicated preamble transmitting module, configured to transmit the dedicated preamble on dedicated time-frequency resources configured by a base station.

Figure 10:
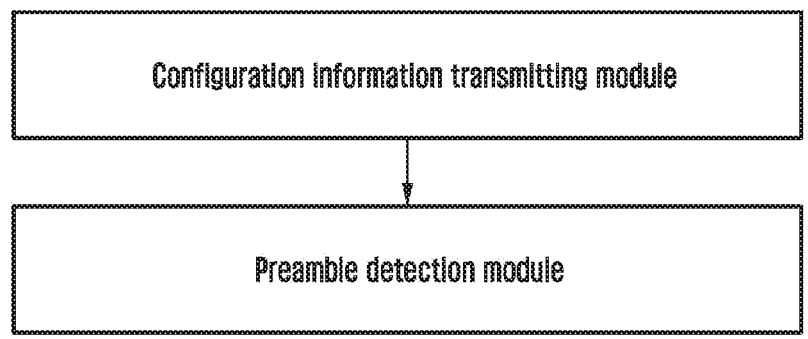
FIG. 10 is a schematic diagram of a base station equipment according to the present invention.

The present invention further provides a base station equipment, as shown in FIG. 10, comprising the following modules:

a configuration information transmitting module, configured to transmit random access preamble configuration information and dedicated preamble configuration information; and a preamble detection module, configured to detect the dedicated preamble on the configured dedicated time-frequency resources.

In several embodiments according to the specific implementation, it should be understood that the disclosed systems, devices and methods may be implemented in other ways. For example, the device embodiment described above is just exemplary. For example, the division of the units is just a division of logic functions, and the actual implementation may have addition division way, for example, multiple units or components may be combined or may be integrated into another system, or some features may be ignored or not be performed. Another point is that coupling with each other or direct coupling or communicative connection as shown or discussed here may be via some interfaces, and indirect coupling or communicative connection between devices or units may be electrical, mechanical or in other forms.

The unit as a separator for illustration can be separated physically or cannot be separated physically, the unit as a display component can be a physical unit or cannot be a physical unit, in other word, the display unit can located in one place, or the physical unit can be distributed to a multiple of network units. Part of units or all the units can be selected according to the actual requirement to realize the purpose of the embodiment.

In addition, each functional unit in each embodiment of the specific implementation can be integrated into a processing unit; or, each unit can exist alone physically; or, two or more units can be integrated into one unit. The integrated unit can be implemented in the form of hardware, or can be implemented in the form of a software functional unit.

All terms (including technical and scientific terms) used herein have the same meaning as that commonly understood by one of ordinary skill in the art unless otherwise defined herein.

It should be noted that the method provided by the embodiments is applicable to a contention-based or contention-free random access method.

Figure 11:
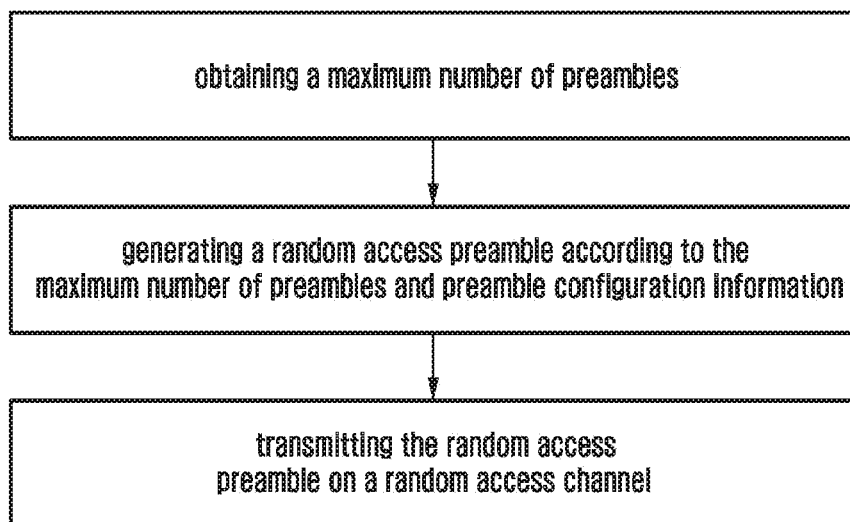
FIG. 11 is a schematic flowchart of a random access method according to an embodiment of the present disclosure.

Taking a 5G network as an example, for the preamble problem in a 5G network, an embodiment of the present disclosure provides a random access method as shown in FIG. 11, and the method is performed by a terminal device having a wireless communication function.

In the method, the terminal device first obtains a maximum number of preambles.

Specifically, the system may obtain the maximum number of preambles according to initial access configuration information or random access configuration information. The random access configuration information may also include preamble configuration information, random access channel configuration information, and the like.

The initial access configuration information may include down-link signal configuration information. The initial access configuration information may also include configuration information used for the initial access procedure. Generally, it includes synchronization signal block configuration information, random access configuration information, and the like. The down-link signal configuration information may be included in the synchronization signal block configuration information. The random access configuration information is used to configure the random access procedure, and includes random access channel configuration information and preamble configuration information, and the like.

Specifically, the maximum number of preambles may be determined according to pre-defined system information and an association between the pre-defined system information and the maximum number of preambles. The pre-defined system information may include but is not limited to any of the following: preamble format; sub-carrier spacing of random access channel; the repetition number of sequences within one preamble; a maximum value of a plurality of numbers of down-link signals associated to a same random access occasion; and a number of down-link signals associated to a currently selected random access occasion.

After obtaining the maximum number of preambles, the terminal device generates a random access preamble according to the maximum number of preambles and preamble configuration information.

The preamble configuration information may include root sequence configuration information, cyclic shift configuration information, and the like. Specifically, the system may generate the random access preamble according to the maximum number of preambles and the root sequence configuration information, the cyclic shift configuration information.

Subsequently, the terminal device transmits the generated random access preamble on a random access channel.

Specifically, in an embodiment of the present disclosure, a random access method will be described in conjunction with a specific system. In the random access method of this embodiment, the number of preambles is indicated and configured in an explicit manner.

In this embodiment, the system indicates the random access configuration information using Remaining Minimum System Information (RMSI). The system herein may include various terminal devices having a wireless communication function.

The system supports a plurality of the maximum numbers of preambles. For example, in addition to the number of preambles 64 supporting LTE, the system also supports more numbers of preambles, such as 128 and 256 and so on. To support a plurality of possible maximum numbers of preambles, new indication or configuration information may be added to RMSI or other system information OSI for supporting a plurality of possible maximum numbers of preambles. Specifically, the maximum number of preambles may be configured by using an index table. A possible index table is shown in Table 3.

TABLE 3

Configuration of maximum number of preambles

| Index | Maximum number of preambles |
|---|---|
| 0 | 64 |
| 1 | 128 |
| 2 | 256 |
| ... | ... |

In the remaining minimum system information RMSI or the other system information OSI, a parameter for characterizing the maximum number of preambles is added, and indication and configuration are performed in an index manner. The parameter may be separately notified. In this case, the random access configuration information in the RMSI or OSI includes: random access preamble configuration information, random access channel configuration information, and the configuration information of the maximum number of preambles. Alternatively, the parameter may also be part of the random access preamble configuration information. In this case, the random access configuration information in the RMSI or OSI includes: random access preamble configuration information (including root sequence configuration information, cyclic shift configuration information and the configuration information of the maximum number of preambles), random access channel configuration information, and the like.

The terminal device reads the random access configuration information in the RMSI or OSI when it is performing the initial access. It determines the number of available preambles based on the configuration information of the maximum number of preambles therein, generates a preamble according to the root sequence configuration information and the cyclic shift configuration information in the random access preamble configuration information, and transmits the preamble on a random access channel.

After transmitting the random access preamble, the terminal device detects the random access response transmitted by the base station, and determines the random access preamble according to the preamble identifier in the random access response.

Specifically, the terminal device determines the preamble identifier in the random access response according to a predetermined indication manner of the preamble identifier; and determines the random access preamble according to the preamble identifier. The indication manner of the preamble identifier will be described in detail in the subsequent sections.

In another embodiment of the present disclosure, another method of providing a preamble will be described in connection with a specific system. In this embodiment, the number of preambles is indicated and configured in an implicit manner.

In this embodiment, the maximum number of preambles is indicated and configured by establishing an association between the preamble format and the maximum number of preambles. Specifically, the maximum number of preambles available to the terminal device is implicitly indicated by defining the maximum number of preambles associated to each preamble format. The connection between the preamble format and the maximum number of preambles may be established by means of pre-defining. For example, a possible implementation is to add a parameter for characterizing the maximum number of preambles in the preamble format table. As an example, a possible preamble format table is shown in Table 4:

TABLE 4

Preamble format table for notifying the maximum number of preambles

| Preamble format index | Preamble configuration information | Configuration of maximum number of preambles |
|---|---|---|
| 0 | Configuration 0 | 64 |
| 1 | Configuration 1 | 64 |
| 2 | Configuration 2 | 128 |
| 3 | Configuration 3 | 128 |
| ... | ... | ... |

In Table 4, two configurations of the maximum number of preambles are used, that is, 64 and 128, respectively. The parameters used to characterize the preamble configuration information in the table include the sequence length, the repetition number of sequences within one preamble, the length of cyclic prefix, and the like. Configuration information such as sub-carrier spacing of preamble may also be included.

In this implementation, the preamble format s configured by means of indexing and notified in the random access configuration information.

When performing initial access, the terminal device reads the random access preamble format from, for example, RMSI or OSI, determines the available maximum number of preambles according to the configuration information of the maximum number of preambles in the preamble format, and generates an associated preamble according to the root sequence configuration information and the cyclic shift configuration information.

In addition to determining the configuration information of the maximum number of preambles according to the preamble format, the configuration information of the maximum number of preambles may also be implicitly notified according to other parameter(s) for determining the preamble. For example, the maximum number of preambles is determined according to the sub-carrier spacing used for the random access channel or the preamble. That is, the association between the sub-carrier spacing of random access channel and the maximum number of preambles is established, and the maximum number of preambles is implicitly notified and configured by configuring the sub-carrier spacing of random access channel.

For example, a possible way is to pre-define the association between the sub-carrier spacing of random access channel and the maximum number of preambles. For example, the association is established by way of an index table. As an example, a possible index table is shown in Table 5.

TABLE 5

Association between sub-carrier spacing and maximum number of preambles

| Sub-carrier spacing (kHz) | Maximum number of preambles |
| --- | --- |
| 15 | 64 |
| 30 | 64 |
| 60 | 128 |
| 120 | 128 |

In Table 5, different maximum numbers of preambles are defined for different sub-carrier spacings. The maximum number of preambles is implicitly notified by the configuration of the sub-carrier spacing of random access channel. Specifically, the sub-carrier spacing configuration parameter may be notified in the preamble format, that is, it may be configured with the preamble format as part of the preamble format. In this case, the terminal device determines the maximum value of the number of preambles according to the sub-carrier spacing in the preamble format. In an alternative manner, the sub-carrier spacing may be separately notified. The terminal device determines the sub-carrier spacing of the random access channel according to the sub-carrier spacing configuration information in the random access configuration information, determines the associated maximum number of preambles at the same time, and generates a preamble according to the root sequence configuration information and the cyclic shift configuration information in the preamble configuration information.

In an alternative implementation, the association between the repetition number of sequences within one preamble and the maximum number of preambles may also be established to implicitly notify the maximum number of preambles. For example, the association between the repetition number of sequences within one preamble and the maximum number of preambles is established by means of pre-defining. As an example, a possible way is shown in Table 6.

TABLE 6

Association between the repetition number of sequences within one preamble and the maximum number of preambles

| Repetition number of sequences within one preamble | Maximum number of preambles |
| --- | --- |
| 1 | 64 |
| 2 | 64 |
| 4 | 64 |
| 6 | 128 |
| 12 | 128 |
| . . . | . . . |

The repetition number of sequences within one preamble may be transmitted in the preamble format, and may also be directly included in the random access configuration information as a parameter. Upon receiving the preamble format or the random access configuration information including the parameter in the RMSI or OSI, the terminal device determines the maximum number of preambles according to the repetition number of sequences within one preamble, and generates an associated preamble according to the root sequence configuration information and the cyclic shift configuration information or the like in the preamble configuration information.

In another embodiment of the present disclosure, another random access method will be described in conjunction with a specific system. In the random access method of this embodiment, the number of preambles is notified and configured in an implicit manner.

In this embodiment, the maximum number of preambles is implicitly notified by establishing the association between the number of down-link signals mapped to the same random access occasion and the maximum number of preambles. The down-link signal may be a synchronous signal block or a channel state information reference signal, etc. The following description is provided by taking the synchronous signal block as an example. For systems operating at high frequency bands, beam-forming techniques are required to traverse severe path losses in high frequency bands wireless communication environments. Therefore, beam pairing at the transmitter and receiver is very important. For the initial access procedure at high frequency bands, in addition to establishing the initial up-link and down-link synchronization, it is also necessary to obtain the initial beam pairing. The existing manner in which the base station acquires the direction of the down-link transmit beam is that: an association is established between the down-link synchronization signal block (or down-link signal) and the random access occasion and the preamble set, and the direction of the down-link beam that transmits the random access response is obtained by the detection of the random access preamble. This procedure may be described in FIG. 12.

Figure 12:
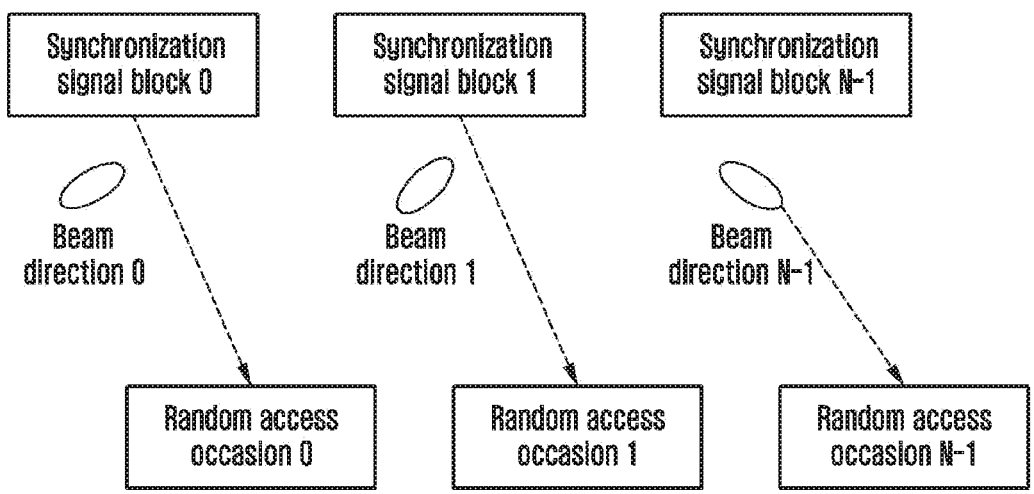
FIG. 12 is an exemplary diagram of an association between synchronization signal blocks and random access occasions according to an embodiment of the present disclosure.

FIG. 12 is a schematic diagram illustrating a one-to-one association between synchronization signal blocks and random access occasions. That is, there is merely one synchronization signal block mapped to each random access occasion, and the base station may determine the synchronization signal block according to the random access occasion at which the transmitted preamble was detected so as to know the beam direction in which the random access response is transmitted.

For some up-link and down-link allocations in time division multiplexing, there are more synchronization signal blocks, and fewer random access occasions are available. In this case, there may be multiple synchronization signal blocks mapped to the same random access occasion, and the base station needs to know the synchronization signal block information by means of grouping the preamble so as to obtain the beam direction in which the random access response is transmitted.

A simple example is as follows. The maximum number of preambles supported by the system is 64, and since the up-link time-frequency resources are more limited, there are fewer random access occasions. At the same time, because there are more beams, more down-link synchronization signal blocks are needed, so two synchronization signal blocks correspond to one random access occasion. In this case, although the number of preambles available at each random access occasion is 64, in order to distinguish the synchronization signal blocks mapped to the same random access occasion, the available preambles need to be divided into two non-overlapping sets. Each set includes 32 preambles and is used to indicating one synchronization signal block associated to the random access occasion, respectively. The above configuration may be briefly described with FIG. 13.

Figure 13:
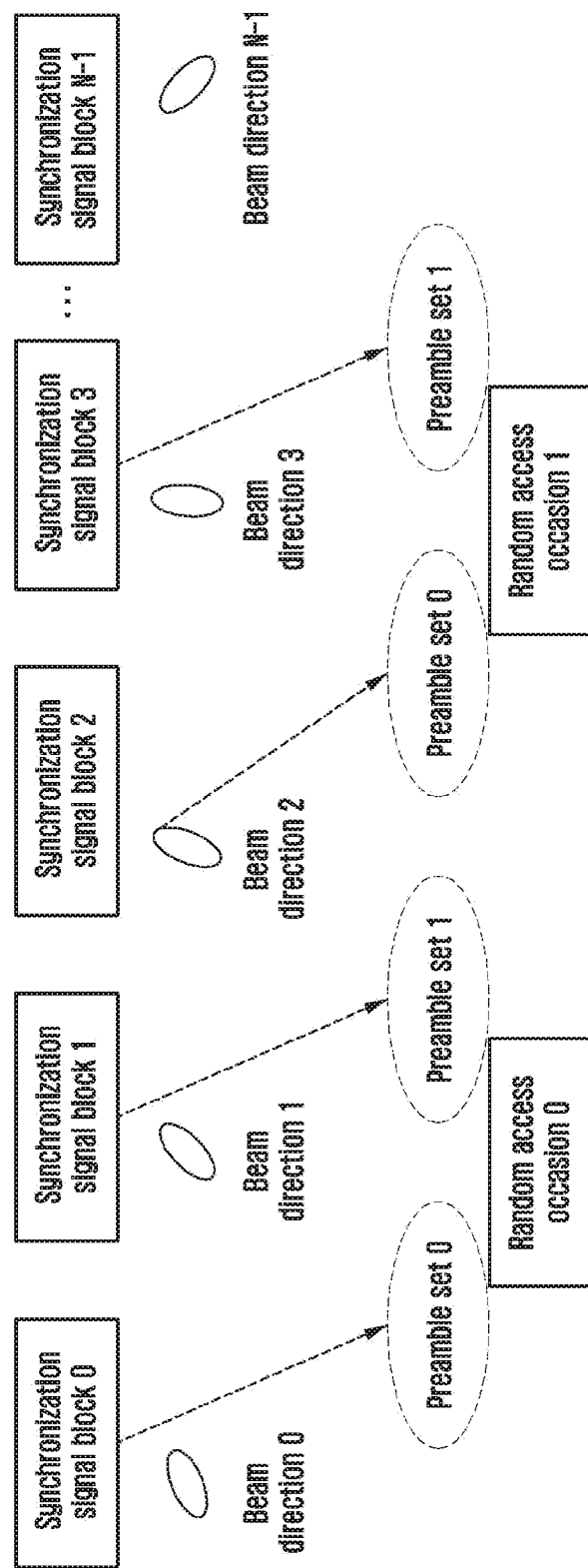
FIG. 13 is an exemplary diagram of an association between synchronization signal blocks and random access occasions according to an embodiment of the present disclosure.

FIG. 13 depicts an example schematic diagram of the association between synchronization signal blocks and random access occasions. As can be seen from FIG. 13, when a plurality of synchronization signal blocks are mapped to the same random access occasion, the preambles available to the terminal device will be reduced, thereby increasing the collision probability and reducing the initial access performance. Therefore, the maximum number of available preambles may be increased when a plurality of synchronization signal blocks are mapped to the same random access occasion, thereby reducing the collision probability and improving the initial access performance. Still taking the foregoing example as an example, if the maximum number of preambles is increased to 128, the number of preambles in the preamble set associated to each synchronization signal block is 64. The collision probability and the access performance are both the same as the case where there is a one-to-one association between the synchronization signal blocks and the random access occasions.

A possible way to determine the maximum number of preambles is to establish an association between the number of down-link synchronization signal blocks associated to the same random access occasion and the maximum number of preambles, and implicitly configure and notify the maximum number of preambles according to the number of down-link synchronization signal blocks associated to the same random access occasion. The association between the number of down-link synchronization signal blocks associated to the same random access occasion and the maximum number of preambles may be established in a predefined manner. A simple example is shown in Table 7.

TABLE 7

Association between the number of down-link synchronization signal blocks associated to the same random access occasion and the maximum number of preambles

| Number of down-link synchronization signal blocks associated to the same random access occasion | Maximum number of preambles |
|---|---|
| 1 | 64 |
| 2 | 64 |
| 4 | 128 |
| 8 | 128 |
| . . . | . . . |

Another possible notification and configuration approach is to set the following criteria. If the number of down-link synchronization signal blocks associated to the same random access occasion is greater than or equal to a pre-defined threshold, the maximum number of preambles 128 is to be used; otherwise the maximum number of preambles 64 is to be used. For the case of configuring more possible maximum numbers of preambles, a plurality of thresholds are defined, and the maximum number of preambles is determined according to the comparison with the thresholds. Specifically, for the K maximum numbers of preambles, K−1 thresholds are defined, and the maximum number of preambles is selected according to the following criteria:

If the number of down-link synchronization signal blocks associated to the same random access occasion<threshold 0, the 0th maximum number of preambles is selected;

If threshold 0≤the number of down-link synchronization signal blocks associated to the same random access occasion<threshold 1, the first maximum number of preambles is selected;

If threshold 1≤the number of down-link synchronization signal blocks associated to the same random access occasion<threshold 2, the second maximum number of preambles is selected;

. . .

If threshold K−1≤the number of down-link synchronization signal blocks associated to the same random access occasion, the K-th maximum number of preambles is selected.

Taking the case of 4 maximum numbers of preambles as an example, the selection and configuration manner of the maximum number of preambles are briefly described. The 4 maximum numbers of preambles are 64, 128, 256, and 512, respectively. First the thresholds 4, 16, 32 are defined, and the maximum number of preambles is selected according to the following criteria:

If the number of down-link synchronization signal blocks associated to the same random access occasion<4, the maximum number of preambles is 64;

If 4≤the number of down-link synchronization signal blocks associated to the same random access occasion<16, the maximum number of preambles is 128;

If 16≤the number of down-link synchronization signal blocks associated to the same random access occasion<32, the maximum number of preambles is 256;

If 32≤the number of down-link synchronization signal blocks associated to the same random access occasion, the maximum number of preambles is 512.

In addition, it should be noted that there may be different numbers of down-link synchronization signal blocks associated to different random access occasions. For this situation, the following methods may be used:

a. Using the maximum number of down-link synchronization signal blocks associated to the same random access occasion, determine the maximum number of preambles in the above possible ways. The maximum number of preambles determined in this manner is the same for each synchronization signal block in the cell.

b. Determine the maximum number of preambles that may be used at a selected random access occasion according to the number of synchronizing signal blocks associated to the selected random access occasion. The maximum number of preambles determined in this manner may not be the same for the synchronization signal blocks in the cell, but it may ensure that the number of preambles available to the terminal devices within the coverage of each synchronization signal block are the same.

When notification and configuration of the maximum number of preambles are performed in the above manner, the terminal device first obtains the number of down-link synchronization signal blocks associated to the same random access occasion according to the random access channel configuration information, and obtains the maximum number of preambles according to a pre-defined association (for example, as shown in Table 7). Moreover, the terminal device obtains the number of down-link synchronization signal blocks associated to the same random access occasion according to the random access channel configuration information, obtains the number and index range of preambles available for the down-link synchronization signal block, and generates a preamble according to the root sequence configuration information and the cyclic shift configuration information in the preamble configuration information.

Specifically, if the foregoing manner a is adopted, the maximum number of preambles is determined according to the maximum number of down-link synchronization signal blocks associated to the same random access occasion obtained in the random access channel configuration. After determining the random access occasion according to the random access channel configuration information, the terminal device determines the number of preambles and the index range of preambles associated to each down-link synchronization signal block according to the number of down-link synchronization signal blocks mapped to the random access occasion.

If the foregoing manner b is adopted, the random access occasion associated to the optimal or appropriate synchronization signal block is first determined, and the number of synchronization signal blocks associated to the random access occasion is determined according to the random access channel configuration in the RMSI or OSI. The maximum number of preambles at the random access occasion and the index range of preambles are determined according to the number of the synchronization signal blocks.

If it is assumed that the maximum number of preambles at a certain random access occasion is N_pre, and the random access occasion corresponds to k synchronization signal blocks, then the number of preambles associated to each synchronization signal block is $\lfloor N_{pre}/k \rfloor$. The Npre preambles are divided into k groups, and the index range of each preamble group is $$\left[0, \ldots, \left\lfloor \frac{N_{pre}}{k} \right\rfloor - 1\right], \left[\lfloor N_{pre}/k \rfloor, \ldots, 2\left\lfloor \frac{N_{pre}}{k} \right\rfloor - 1\right],$$
$$\ldots, \left[(k-1)\left\lfloor \frac{N_{pre}}{k} \right\rfloor, \ldots, k\left\lfloor \frac{N_{pre}}{k} \right\rfloor - 1\right],$$

respectively.

In this grouping manner, when Npre is not an integer multiple of k, there will be some extra preambles that are not included in any group. In order to increase the preamble utilization, these preambles may be used for contention-free random access procedures or as preambles in any one of the groups. The association between the synchronization signal blocks and the preamble groups may be as follows:

a. According to the index ordering of the synchronization signal blocks associated to the same random access occasion, an association is established between the synchronization signal blocks and the preamble groups with the same ordering index. For example, the 0th synchronization signal block corresponds to group 0, the i-th synchronization signal block corresponds to group i, and so on.

b. The following operation is performed on the index of the synchronization signal block associated to the same random access occasion to obtain its index within the associated random access occasion: nss=$\lfloor N_{ss}/k \rfloor$. Nss is the index of the synchronization signal block, k is the number of synchronization signal blocks associated to the random access occasion, and nss is the internal index of the random access occasion. An association is established between the synchronization signal blocks and the preamble groups with the same index, that is, an association is established between the nss-th synchronization signal block and the nss-th preamble group.

Figure 14:
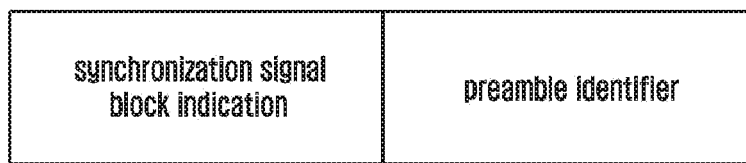
FIG. 14 is an exemplary diagram of a preamble indication manner according to an embodiment of the present disclosure.

In another embodiment of the present disclosure, a random access method is provided as shown in FIG. 14, and the method is completed on a base station side.

In another embodiment of the present disclosure, a calculation method of a preamble identifier will be described in conjunction with a specific system. In this embodiment, the system operates at high frequency bands and beam-forming techniques are used to traverse severe path losses at high frequency bands. In order to notify the base station of the down-link beam for transmitting the random access response, an association is established between the down-link synchronization signal block, the random access occasion, and the preamble resource, and the base station is notified of an appropriate down-link beam by transmission of the preambles.

In this embodiment, the maximum number of preambles is notified in the manner of the foregoing embodiment. When sending a random access response, it is necessary to add a random access preamble identifier in the random access response. When the system supports a plurality of maximum numbers of preambles, the possible indication ways of the preamble identifier are as follows:

a. Indicating the number of bits of the preamble identifier according to the maximum number of preambles, and indicating the preamble identifier according to the number of bits of the preamble identifier. For example, the number of bits of the preamble identifier is configured and set in advance according to Table 8:

TABLE 8

Determination manner of the number of bits of the preamble identifier

| Maximum number of preambles | Number of bits of the preamble identifier |
|---|---|
| 64 | 6 |
| 128 | 7 |
| 256 | 8 |
| ... | ... |

Or the number of bits of preamble identifier is determined according to the following rules:

$N_{pre} = \lceil \log_2 M_{max} \rceil$

Mmax is the maximum number of preambles, and Npre is the number of bits of the preamble identifier.

b. Indicating the number of bits of the preamble identifier according to a maximum value of a plurality of maximum numbers of preambles, and indicating the preamble identifier according to the number of bits of the preamble identifier. For example, if the maximum value of a plurality of maximum numbers of preambles is Mmax, the number of bits of the preamble identifier may be selected as $\lceil \log_2$ $M_{max}$], alternatively, the number of bits of the preamble identifier may be determined according to the maximum value of a plurality of maximum numbers of preambles.

c. Indicating the preamble identifier according to the down-link signal indication bits indicating the down-link signals and the pre-defined preamble identifier bits. Specifically, using a pre-defined number of bits of the preamble identifier, when there are a plurality of synchronization signal blocks associated to one random access occasion, and the configured maximum number of preambles is greater than the number of preambles that can be supported by the number of bits of the preamble identifier, the random access preamble identifier is indicated in the random access response in the manner of a preamble identifier plus synchronization signal block indication.

Specifically, the random access preamble identifier is indicated in the following possible ways:

1. Indication bits for indicating synchronization signal blocks are added in the random access response, and the transmitted preamble is indicated in the random access response by the indication bits and a pre-defined preamble identifier. A simple example is as follows: the random access identifier is pre-defined to 6 bits. If 4 synchronization signal blocks correspond to the same random access occasion, 2 bits are added in the random access response for indicating the associated synchronization signal blocks. The transmitted preamble is indicated by the 2-bit synchronization signal block indication information and the 6-bit pre-defined random access identifier, as shown in FIG. 14.

2. The indication of the synchronization signal blocks is added for calculating the random access radio network temporary identifier RA-RNTI, and the preamble indicated by the random access response is determined by the synchronization signal block indication in the RA-RNTI and the preamble identifier of the pre-defined length in the random access response.

In another embodiment of the present disclosure, a configuration and indication method of a preamble of a contention-free random access procedure will be described in conjunction with a specific system. In this embodiment, the system operates at high frequency bands and beam-forming techniques are used to traverse severe path losses at high frequency bands. In order to notify the base station of the down-link beam for transmitting the random access response, an association is established between the down-link synchronization signal block/down-link reference signal, the random access occasion, and the preamble resource, and the base station is notified of an appropriate down-link beam by the transmission of the preamble.

For the contention-free random access procedure, the used preamble is configured through a down-link control channel or higher-layer signaling. For a system that supports a plurality of maximum numbers of preambles, the configuration of the preamble for a contention-free random access procedure may be implemented as follows:

a. Determining the number of indication bits of the preamble according to the maximum value of a plurality of maximum numbers of preambles. For example, the plurality of maximum numbers of preambles supported by the system are 64, 128, and 256, thus the number of indication bits of the preamble is determined to 8 bits for 256.

b. For the preamble indication bits of a pre-defined length, the preamble configured by the base station is indicated by the indication bits of the down-link signals associated to the random access occasion and the preamble indication bits of the pre-defined length together. A simple example is that one random access occasion corresponds to two down-link signals, and 1-bit information is used for notification and configuration, and the random access indication is pre-defined to 6 bits. Therefore, a 7-bit preamble index is jointly determined by the 1-bit down-link signal indication and the random access indication bits.

The terminal device transmits the preamble at the random access occasion according to the preamble indication.

It should be noted that the down-link signal mentioned herein includes the synchronization signal block, and may also include the channel state information reference signal and the like.

Figure 15:
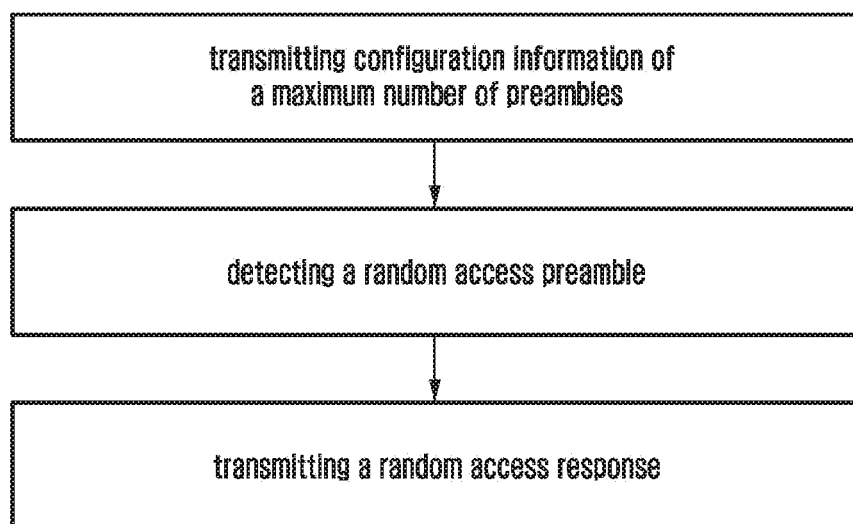
FIG. 15 is a schematic flowchart of a random access method according to an embodiment of the present disclosure.
Figure 16:
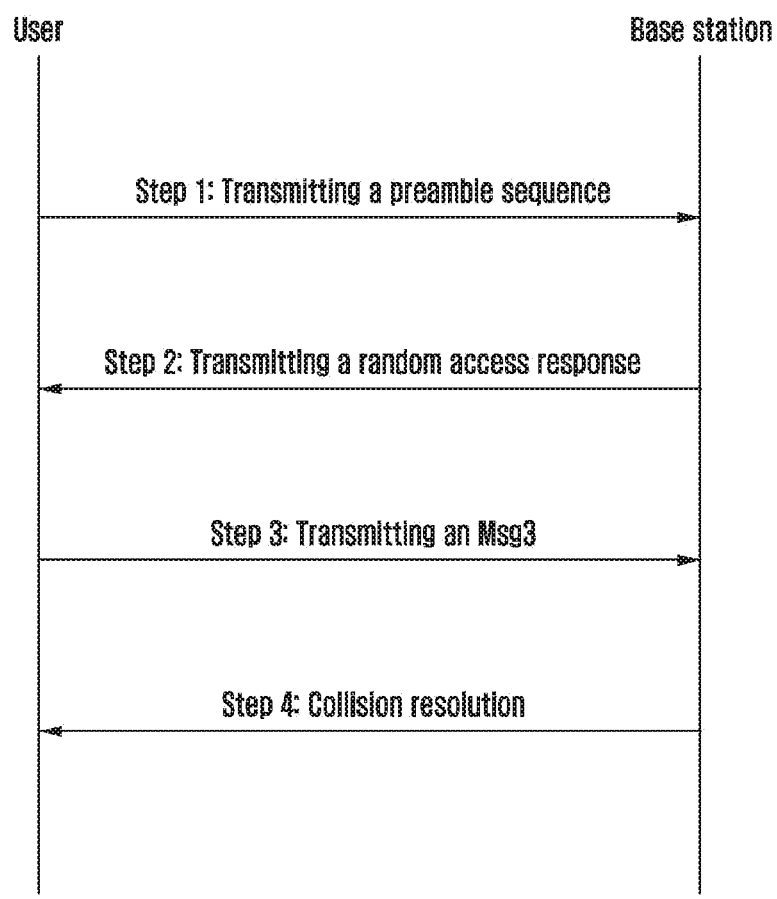
FIG. 16 is a schematic flowchart of a conventional contention-based random access.

FIG. 15 is a schematic flowchart of a random access method according to an embodiment of the present disclosure. In the method shown in FIG. 15, the base station transmits the configuration information of the maximum number of preambles to the terminal. Subsequently, the base station detects the random access preamble. After detecting the random access preamble, the random access response is transmitted.

The configuration information of the maximum number of preambles is included in the random access configuration information and/or the preamble configuration information.

The present disclosure also provides a terminal device including a processor and a memory storing instructions that, when executed by the processor, cause the processor to perform the methods provided by foregoing exemplary embodiments herein.

A "terminal" or "terminal device" herein may refer to any terminal having wireless communication capabilities including but not limited to a mobile phone, a cellular phone, a smart phone or a personal digital assistant (PDA), a portable computer, an image capture device such as a digital camera, gaming equipment, music storage and playback equipment, and any portable unit or terminal with wireless communication capabilities, or Internet facilities that allow wireless Internet access and browsing.

The present disclosure also provides a base station including a processor and a memory storing instructions that, when executed by the processor, cause the processor to perform the methods described by the foregoing exemplary embodiments herein.

The term "base station" (BS) used herein may refer to eNB, eNodeB, NodeB, or base station transceiver (BTS), etc. depending on the technology and terminology used.

The "memory" herein may be any type suitable for the technical environment herein, and may be implemented using any suitable data storage technology, including but not limited to semiconductor-based memory devices, magnetic memory devices and systems, optical memory devices and systems, fixed memory and removable memory.

The processor herein may be of any type suitable for the technical environment herein, including but not limited to one or more of the following: a general purpose computer, a special purpose computer, a microprocessor, a digital signal processor DSP, and a processor based on a multi-core processor architecture.

The present disclosure also provides a machine readable medium storing instructions that, when executed by a processor, cause the processor to perform the methods described in the foregoing exemplary embodiments herein.

A "machine readable medium" as used herein should be taken to include any medium or combination of media capable of storing instructions executed by a machine, a device capable of temporarily or permanently storing instructions and data, and may include, but is not limited to, random access memory (RAM), read only memory (ROM), buffer memory, flash memory, optical media, magnetic media, cache memory, other types of memory (e.g., erasable programmable read-only memory (EEPROM)) and/or any suitable combination thereof. A "machine readable medium" may refer to a single storage apparatus or device and/or a "cloud-based" storage system or storage network that includes a plurality of storage apparatuses or devices.

The embodiments of the present disclosure provide a preamble configuration and indication method and related devices. In an explicit or implicit manner, the method provided in the embodiments of the present disclosure may flexibly configure the maximum number of preambles supported by the system and thus may more flexibly configure the number of preambles allocated to the terminal device according to factors such as application scenarios and the number of loads.

The terminology used herein is for the purpose of describing particular embodiments only and is not intended to be limiting of the disclosure. Furthermore, the terms "include", "comprise", etc. as used herein indicate the presence of stated features, steps, operations, and/or components but do not preclude the presence or addition of one or more other features, steps, operations, or components.

Each block in the flowcharts or block diagrams in the embodiments of the present disclosure may represent a hardware module, a program segment, or a part of code, and the above-mentioned module, program segment, or part of code may include one or more executable instructions for the implementation of the specified logic function. It should also be noted that in some alternative implementations, the functions annotated in the flowcharts and blocks may also occur in a different order than that annotated in the figures. For example, two consecutively represented blocks may actually be executed substantially in parallel, and they may sometimes be executed in the reverse order, depending on the function involved. It is also to be noted that each block in the block diagrams or the flowcharts, and combinations of blocks in the block diagrams and the flowcharts, may be implemented by a dedicated hardware-based system that performs specified functions or operations, or may be implemented by a combination of dedicated hardware and computer instructions.

The embodiments of the present disclosure have been described above. However, these embodiments are for illustrative purposes only and are not intended to limit the scope of the present disclosure. Although the respective embodiments are separately described above, this does not mean that the measures in the respective embodiments cannot be advantageously used in combination. The scope of the disclosure is defined by the appended claims and their equivalents. Numerous alternatives and modifications may be made by those skilled in the art without departing from the scope of the present disclosure, and such alternatives and modifications should all fall within the scope of the present disclosure.

It should be understood by one person of ordinary skill in the art that singular forms "a", "an", "the", and "said" may be intended to include plural forms as well, unless otherwise stated. It should be further understood that terms "include/including" used in this specification specify the presence of the stated features, integers, steps, operations, elements and/or components, but not exclusive of the presence or addition of one or more other features, integers, steps, operations, elements, components, and/or combinations thereof. It should be understood that, when a component is referred to as being "connected to" or "coupled to" another component, it may be directly connected or coupled to other elements or provided with intervening elements therebetween. In addition, "connected to" or "coupled to" as used herein may include wireless connection or coupling. As used herein, the term "and/or" includes all or any of one or more associated listed items or combinations thereof.

It should be understood by one person of ordinary skill in the art that, unless otherwise defined, all terms (including technical and scientific terms) used herein have the same meaning as commonly understood by one person of ordinary skill in the art to which the present disclosure belongs. It should be further understood that terms, such as those defined in commonly used dictionaries, should be interpreted as having a meaning that is consistent with their meanings in the context of the prior art and will not be interpreted in an idealized or overly formal sense unless expressly so defined herein.

For a new system, a User Equipment (UE) may perform multiple preambles based random access, so that the probability of accessing the system by a user in one attempt may be increased. However, unlike the existing random access method based on a single preamble, during the transmission of multiple preambles, the user equipment needs to clearly determine sequence choices and beam choices for transmitting multiple preambles, random access resources corresponding to the determined downlink beams and a method for controlling a random access power and a power ramp. Otherwise, the user equipment cannot perform random access in a normally controllable manner.

The present disclosure provides a method for multiple preambles based random access. During the random access process for a user equipment based on multiple preambles, it is proposed in the present disclosure that the user equipment may determine respective preamble sequences according to the selected multiple downlink beams, and calculate respective preamble transmission counters and preamble power ramping counters according to different downlink beams. Meanwhile, when the user equipment may perform multiple preambles based random access, the new maximum number of preamble transmissions may be determined according to the determined number of preambles that may be transmitted in one attempt.

Specifically, in the present disclosure, scenarios involving the multiple preambles based random access include the followings.

Figure 17:
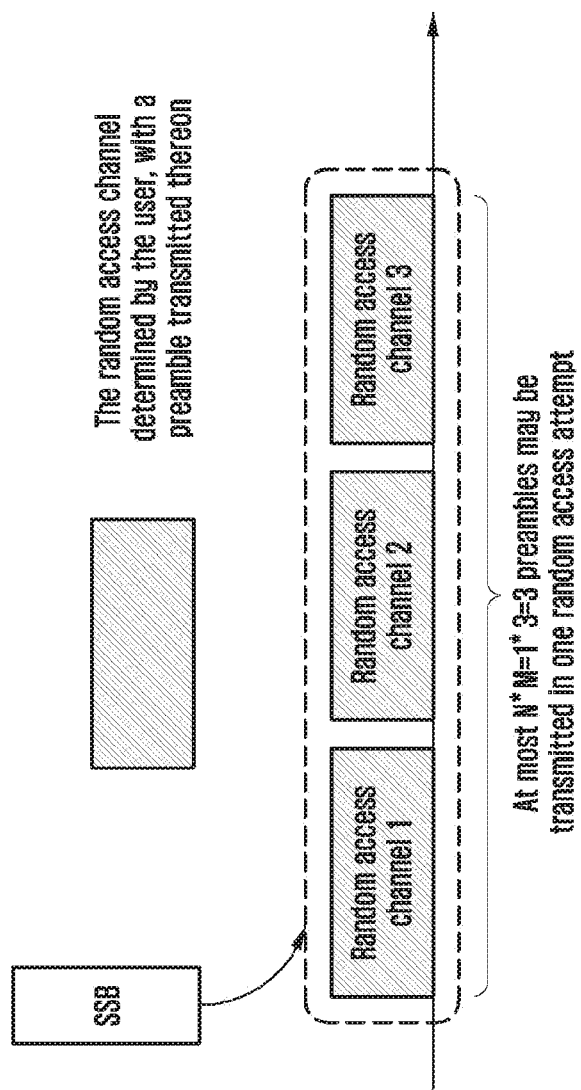
FIG. 17 is a first exemplary diagram of a random access resource configuration based on multiple preambles.

1. The user equipment selects N (N=1) downlink transmitting beam, and the user equipment may correspondingly transmit M (M>1) preambles based on this downlink transmitting beam. That is, the UE transmits M preambles in one random access attempt, and the resources for transmitting the M preambles correspond to the same selected downlink transmitting beam. As shown in FIG. 17, N=1 and M=3 in the example.

Figure 18:
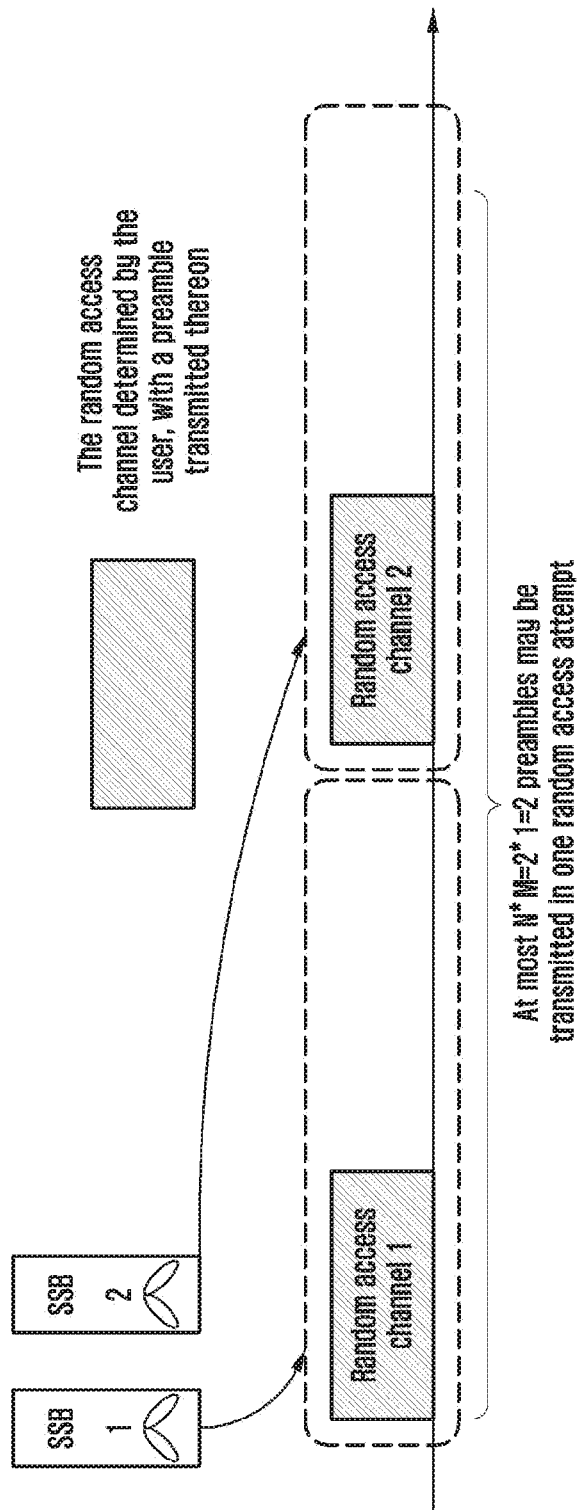
FIG. 18 is a second exemplary diagram of a random access resource configuration based on multiple preambles.

2. The user equipment selects N (N>1) downlink transmitting beams, but the user equipment may correspondingly transmit only M (M=1) preamble based on each downlink transmitting beam. That is, the UE transmits N preambles in one random access attempt, and the resources for transmitting the N preambles one-to-one correspondence to the selected N downlink transmitting beams. As shown in FIG. 18, N=2 and M=1 in the example.

Figure 19:
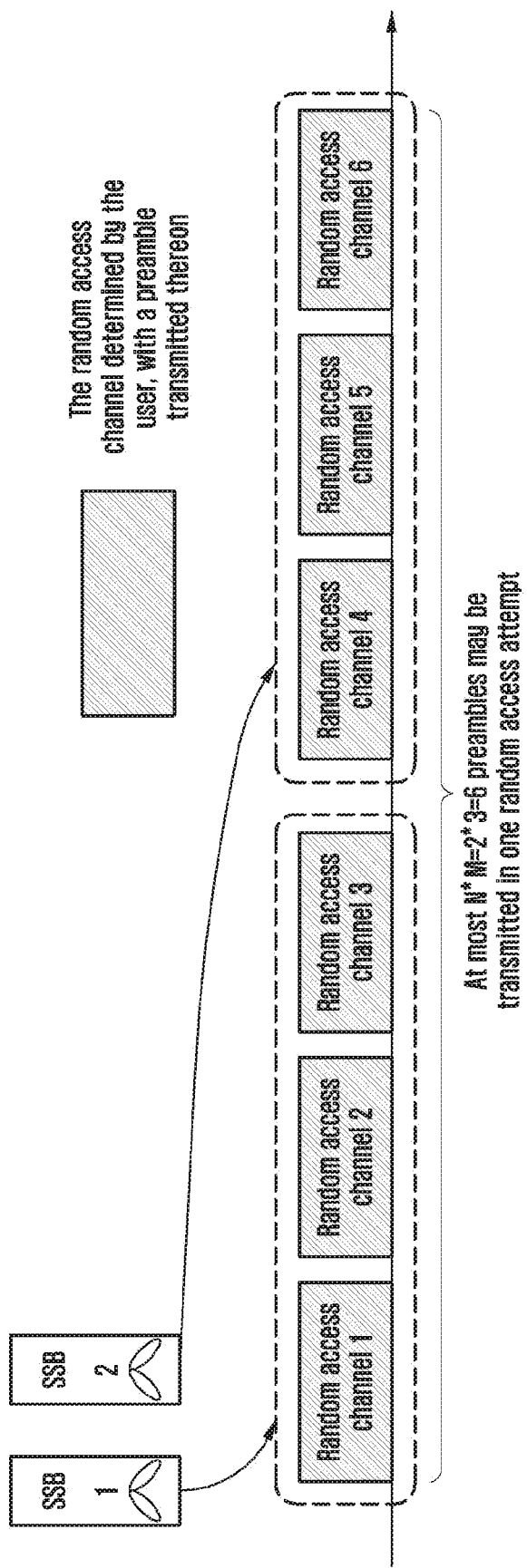
FIG. 19 is a third exemplary diagram of a random access resource configuration based on multiple preambles.

3. The user equipment selects N (N>1) downlink transmitting beams, but the user equipment may correspondingly transmit M (M>1) preambles based on each downlink transmitting beam. That is, the UE transmits N*M preambles in one random access attempt, but the resources for transmitting every M preambles correspond to the same selected downlink transmitting beam. As shown in FIG. 19, N=2 and M=3 in the example.

Figure 20:
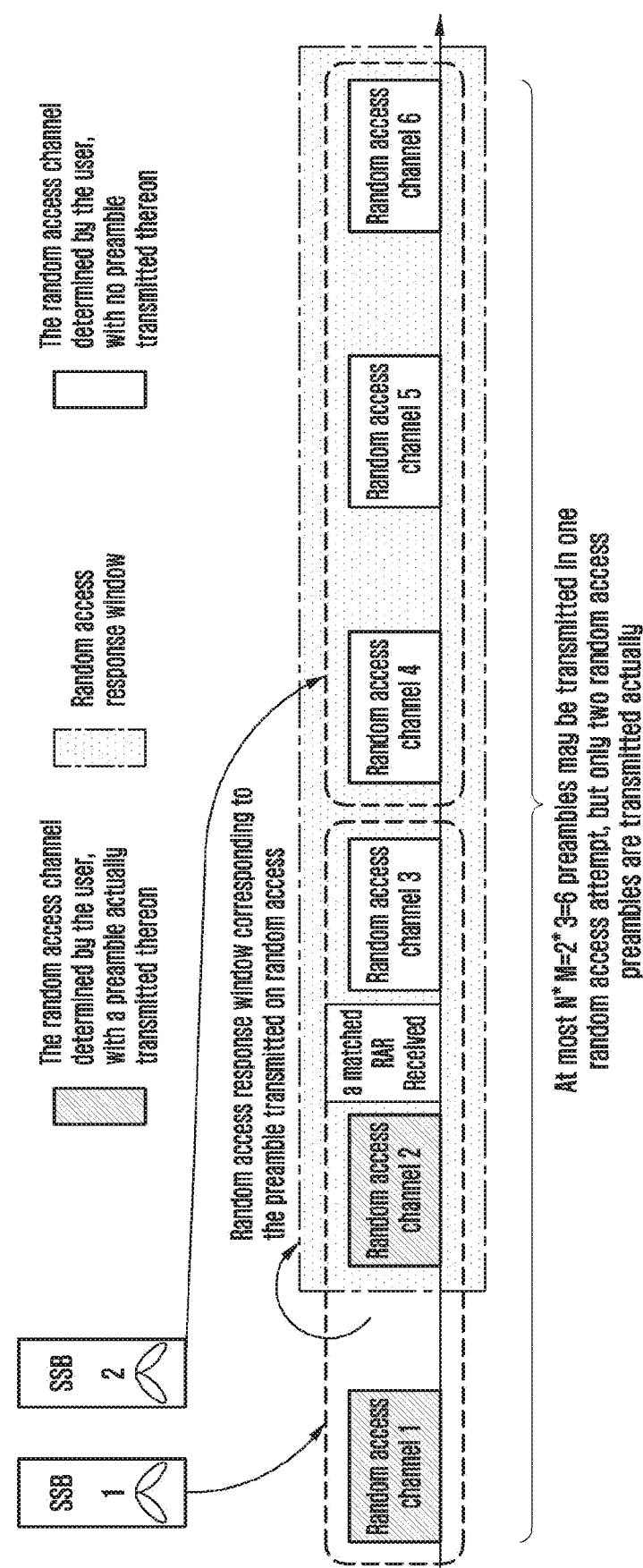
FIG. 20 is an exemplary diagram of the number of actually transmitted preambles.

It is to be noted that, N*M represents the maximum number of preambles that may be transmitted. However, since the UE may have received a matched Random Access Response (RAR) in advance, the UE does not transmit N*M preambles actually. As shown in FIG. 20, the UE may determine from the random access resource configuration that at most 6 preambles will be transmitted. However, since the UE receives a matched RAR after transmitting the second preamble, the user may stop transmitting subsequent possible preambles and then perform subsequent transmission according to the scheduling in the received RAR. Therefore, in this case, the user actually transmits two preambles.

The index of a downlink transmitting beam may be represented by the following information: a synchronization signal block index and/or a Channel State information-Reference Signal (CSI-RS) index. The synchronization signal block may include a primary synchronization signal, a secondary synchronization signal, and a broadcast signal containing a demodulation reference signal.

The UE may acquire a random access resource configuration (including possible random access channel resource configurations, a random access preamble resource configuration and a configuration of a mapping relationship between the downlink beams and the random access resources). The random access resource configuration also contains explicit indication information of the transmission of multiple preambles, and the value of N and/or the value of M are/is also configured. By the random access resource configuration, a base station implicitly informs the UE that it may transmit multiple preambles in one attempt. For example, in the random access resource configuration, M random access preamble resources corresponding to one downlink transmitting beam are explicitly configured for the UE. When the UE obtains random access resources capable of transmitting M preambles, the UE considers that M preambles may be transmitted in one attempt. That is, the UE considers the configuration of multiple random access resources as an indication of permitting the transmission of multiple preambles.

When the user equipment determines that the multiple preambles based random access is performed, the UE may perform the following operations.

1. Determining specific preamble sequences, specifically:
    a. The UE determines the preamble sequences according to the number of selected available downlink transmitting beams. That is, if the UE selects N downlink transmitting beams, the UE may select one preamble sequence for each downlink transmitting beam. That is, M preambles corresponding to this downlink transmitting beam are transmitted by the same preamble sequence.
    b. The UE selects a preamble sequence. That is, all preambles in one random access attempt are transmitted by the same preamble sequence.
    c. The UE determines the preamble sequences according to the explicit resource configuration information. If the resource configuration information explicitly indicates the preamble sequence used by the UE, the UE performs random access according to the indicated preamble sequence.

2. Determining specific uplink transmitting beams for transmitting multiple preambles:
    a. For M preambles corresponding to the same selected downlink transmitting beam, the UE may randomly determine uplink transmitting beams used by the M preambles with equal probability. However, for M preambles corresponding to each of the remaining downlink transmitting beams, uplink transmitting beams for the M preambles corresponding to each of the remaining downlink transmitting beams are determined according to the uplink transmitting beams determined by the M preambles corresponding to the first downlink transmitting beam.
    b. For the transmission of preambles corresponding to all downlink transmitting beams, uplink transmitting beams are randomly determined by the UE with equal probability.

3. Determining a specific power ramping mode:
    a. The UE determines a preamble power ramping counter for each of the selected downlink transmitting beams. That is, if the UE has N selected downlink transmitting beams and each downlink transmitting beam has M preambles, the UE may have at most N preamble power ramping counters, and the M preambles corresponding to each downlink transmitting beam share the same preamble power ramping counter.
        i. In the same random access process, when the UE performs a new random access attempt, no matter whether or not the UE changes the uplink transmitting beam, the preamble power ramping counter is increased by 1;
        ii. In the same random access process, when the UE performs a new random access attempt, for a same downlink transmitting beam, when less than and/or equal to 1, or Y, or Y/x, or X, or X/x, or $\lfloor X/x \rfloor$, or $\lceil X/x \rceil$, or $\lfloor Y/x \rfloor$, or $\lceil Y/x \rceil$ uplink beams among the actually used Y uplink beams are changed compared to the X actually used uplink transmitting beams in the previous random access attempt, the preamble power ramping counter is increased by 1, where the x is a ratio. For example, if x=2, M/x indicates that the preamble power ramping counter remains unchanged when more than half of uplink transmitting beams are changed; otherwise, the preamble power ramping counter is increased by 1. In the present disclosure, $\lfloor A \rfloor$ represents an integer not less than A, and $\lceil A \rceil$ represents an integer not greater than A.
    b. The UE determines one preamble power ramping counter for the transmission of each selected preamble.
        i. For example, in the same random access process, total N*M preambles will be transmitted, and each preamble transmission has its own preamble power ramping counter. When the uplink transmitting beam for transmitting this preamble is changed, the preamble power ramping counter remains unchanged; otherwise, the preamble power ramping counter is increased by 1.
    c. In one random access process, the UE uses only one preamble power ramping counter for the transmission of all preambles.
        i. For example, in the same random access process, total N*M preambles will be transmitted. When the UE performs a new random access attempt, when less than and/or equal to 1, or Y, or Y/x, or X, or X/x, or $\lfloor X/x \rfloor$, or $\lceil X/x \rceil$, or $\lfloor Y/x \rfloor$, or $\lceil Y/x \rceil$ uplink beams among the actually used Y uplink beams are changed compared to the X actually used uplink transmitting beams in the previous random access attempt, the preamble power ramping counter is increased by 1; otherwise, the preamble power ramping counter remains unchanged, where the x is a ratio. For example, if x=2, N*M/x indicates that the preamble power ramping counter remains unchanged if more than half of uplink transmitting beams are changed; otherwise, the preamble power ramping counter is increased by 1.

4. Determining a specific power control mode:
    a. The UE performs power control based on each of the selected downlink transmitting beams. That is, during the transmission of M preambles corresponding to each of the selected downlink transmitting beams, the transmitting power is calculated by using a Path Loss (PL) obtained by a same corresponding downlink transmitting beam.

b. The UE calculates the transmitting power based on a unified PL, specifically:

i. the PL corresponding to the downlink transmitting beam having the maximum Reference Signal Received Power (RSRP) is selected;

ii. the PL corresponding to the downlink transmitting beam having the minimum RSRP is selected;

iii. an average of PLs corresponding to all downlink transmitting beams is selected; and iv. in accordance with a predefined or configured RSRP threshold, the downlink transmitting beam having a PL not greater than or not less than the threshold is randomly selected with equal probability, and the transmitting power is calculated by using the PL of this downlink transmitting beam.

5. The user equipment determining the maximum number of transmissions.

a. If the preamble_max configured by the base station is in the random access based on a transmission of a single preamble, the UE regards the preamble_max as the maximum number of random access attempts, and only one preamble may be transmitted in each attempt; or, the UE directly regards the preamble_max as the maximum number of preambles that may be transmitted by the UE in one random access process.

b. During the random access based on the transmission of multiple preambles, the base station configures the maximum number of preambles as preamble_max. When there are N selected downlink transmitting beams and each downlink transmitting beam may correspondingly transmit M preambles, the preamble_max is regarded as the maximum number of random access attempts, and N*M preambles may be transmitted in each attempt. When the UE performs a new random access attempt, the UE increases the preamble transmission counter by 1. If the value of the preamble transmission counter at this time is equal to preamble_max+1, the UE reports a random access problem to the higher layer. Or, the maximum number of preambles that may be transmitted by the UE in one random access process is calculated based on the preamble_max: preamble_max_new=preamble_max*N*M. When the UE performs a new random access attempt, the UE actually transmits L preambles, and the UE increases the preamble transmission counter by L. If the preamble transmission counter exceeds preamble_max*N*M at this time, the UE reports a random access problem to the higher layer. Or, the UE starts a random access timer when it begins to transmit the first preamble; and when the random access timer expires, the UE reports a random access problem to the higher layer. Or, the UE simultaneously maintains the preamble transmission counter and the random access timer; if the preamble transmission counter exceeds a limit while the timer does not expire, the UE reports a random access problem to the higher layer; and, if the preamble transmission counter does not exceed the limit while the timer expires, the UE also reports the random access problem to the higher layer.

6. The receiving a Random Access Response (RAR) message.

a. When the UE detects a matched RAR, the UE stops searching, then reads an uplink grant in the RAR and begins to prepare for subsequent uplink transmission.

b. When the UE detects an RAR, the UE may continuously search within a configured RAR window. If multiple matched RARs are found, i. the UE randomly selects an RAR with equal probability;

ii. the UE selects, according to the uplink grant, an RAR supporting the earliest subsequent uplink transmission; and iii. the UE determines an RAR according to a Hybrid Automatic Repeat (HARQ) progress ID indicated in the RAR, specifically:

1) if there are multiple different HARQ progress IDs, the UE transmits corresponding uplink data according to the uplink grant indicated in the corresponding RAR; and 2) for a same HARQ progress ID, the UE randomly selects an RAR with equal probability, or the UE selects, according to the uplink grant, an RAR supporting the earliest subsequent uplink transmission.

In one embodiment, in a contention-free random access scenario, how to perform the multiple preambles based random access provided in the present disclosure will be described.

A UE acquires measurement reference signals configured by a base station. The measurement reference signals include a synchronization signal block and/or a Channel State Information-Reference Signal (CSI-RS). The synchronization signal block may include a primary synchronization signal, a secondary synchronization signal, and a broadcast signal containing a demodulation reference signal.

By measuring the configured measurement reference signals, the UE acquires a measurement result of the measurement reference signal, for example, Reference Signal Received Power (RSRP), then:

1. The UE may feed back the measurement results of all the configured measurement reference signals to the base station.

a. Handover scenario: a serving base station determines, according to the feedback of the measurement results, whether the UE needs to perform handover; the serving base station informs a target base station of the feedback result, and the target base station determines indexes of one or more selected measurement reference signals; and, corresponding random access resources are configured for the one or more selected measurement reference signals, and then informed to the serving base station. The serving base station finally transmits the indexes of the one or more selected measurement reference signals and the configured corresponding random access resources to the UE through a downlink channel (a control channel or a shared channel).

b. Present cell scenario: A base station in the present cell determines indexes of one or more selected measurement reference signals, and configures corresponding random access resources for the one or more selected measurement reference signals. The base station in the present cell finally transmits the indexes of the one or more selected measurement reference signals and the configured corresponding random access resources to the UE through the downlink channel (the control channel or the shared channel).

2. The UE may feed back, according to a predefined or configured threshold and to the base station, measurement results of all measurement reference signals greater than or not less than the threshold, then:

a. Handover scenario: a serving base station determines, according to the received feedback of the measurement results, whether the UE needs to perform handover, and informs a target base station of the feedback result.

i. The target base station determines indexes of one or more selected measurement reference signals, configures corresponding random access resources for the one or more selected measurement reference signals, and informs the serving base station of the corresponding random access resources. The serving base station finally transmits the indexes of the one or more selected measurement reference signals and the configured corresponding random access resources to the UE through the downlink channel (the control channel or the shared channel).

ii. The target base station configures, according to the number of fed-back measurement reference signals, corresponding random access resources for all the fed-back measurement reference signals, and informs the serving base station of the corresponding random access resources. The serving base station finally transmits the indexes of all fed-back measurement reference signals and the configured corresponding random access resources to the UE through a downlink channel (a control channel or a shared channel).

b. Present cell scenario: A base station in the present cell determines indexes of one or more selected measurement reference signals, and configures corresponding random access resources for the one or more selected measurement reference signals. The base station in the present cell finally transmits the indexes of the one or more selected measurement reference signals and the configured corresponding random access resources to the UE through the downlink channel (the control channel or the shared channel).

3. The UE may feed back the measurement results of all the configured measurement reference signals to the base station, and feed back, according to a predefined or configured threshold and to the base station, indexes of all measurement reference signals greater than or not less than the threshold.

a. Handover scenario: the serving base station determines, according to the received feedback of the measurement results, whether the UE needs to perform handover, and informs the target base station of the feedback result and the indexes of the measurement reference signals fed back by the UE.

i. The target base station determines, from the indexes of the fed-back measurement reference signals, indexes of one or more selected measurement reference signals, configures corresponding random access resources for the one or more selected measurement reference signals, and informs the serving base station of the corresponding random access resources. The serving base station finally transmits the indexes of the one or more selected measurement reference signals and the configured corresponding random access resources to the UE through the downlink channel (the control channel or the shared channel).

ii. The target base station configures, according to the indexes of the measurement reference signals fed back by the UE, corresponding random access resources for all the fed-back measurement reference signals, and informs the serving base station of the corresponding random access resources. The serving base station finally transmits the indexes of all fed-back measurement reference signals and the configured corresponding random access resources to the UE through the downlink channel (the control channel or the shared channel).

b. Present cell scenario: the base station in the present cell determines, from the indexes of the fed-back measurement reference signals, indexes of one or more selected measurement reference signals, and configures corresponding random access resources for the one or more selected measurement reference signals. The base station in the present cell finally transmits the indexes of the one or more selected measurement reference signals and the configured corresponding random access resources to the UE through the downlink channel (the control channel or the shared channel).

By the above operations, the UE may obtain the random access resources configured by the base station and the indexes of corresponding measurement reference signals, including a mapping relationship between the configured random access resources and the indexes of measurement reference signals. It may be stipulated that the indexes of measurement reference signals and the configured random access resources are in a one-to-one, one-to-N or N-to-one mapping relationship. It is also possible that the index of each measurement reference signal corresponds to a set of random access resource configuration information.

Specifically, in the present disclosure, scenarios involving the multiple preambles based random access include the followings.

1. The user equipment acquires the index of one configured downlink transmitting beam and the corresponding random access resources; and, based on this downlink transmitting beam, the user equipment may correspondingly transmit M (M>1) preambles. That is, the UE transmits M preambles in one random access attempt, and the resources for transmitting the M preambles correspond to the same downlink transmitting beam.

2. The user equipment acquires N (N>1) configured downlink transmitting beams and the corresponding random access resources; and, based on each downlink transmitting beam, the user equipment may correspondingly transmit only one preamble. That is, the UE transmits N preambles in one random access attempt, and the resources for transmitting the N preambles are in one-to-one correspondence to the N configured downlink transmitting beams.

3. The user equipment acquires N (N>1) configured downlink transmitting beams and the corresponding random access resources; and, based on each downlink transmitting beam, the user equipment may correspondingly transmit M (M>1) preambles. That is, the UE transmits N*M preambles in one random access attempt, but the resources for transmitting every M preambles correspond to the same configured downlink transmitting beam.

After the UE acquires the random access resource configuration (including a possible random access channel resource configuration, a random access preamble resource configuration, and a configuration of the mapping relationship between downlink transmitting beams and random access resources):

1. the random access resource configuration also contains explicit indication information of the transmission of multiple preambles, and also configures the value of N and/or the value of M; and 2. by the random access resource configuration, the base station implicitly informs the UE that it may transmit multiple preambles in one random access attempt. For example, in the random access resource configuration, each configured downlink transmitting beam is mapped to M preamble resources and/or M random access channel resources; or, the random access resource configuration corresponding to the index of each configured downlink transmitting beam contains M preamble resources and/or M random access channel resources.

When the user equipment determines that the multiple preambles based random access is performed, the UE may perform the following operations.

1. Determining specific preamble sequences, specifically:

a. The UE determines preamble sequences according to the number of selected available downlink transmitting beams. If the UE configures N downlink transmitting beams, the UE may select one preamble sequence for each downlink transmitting beam. That is, M preambles corresponding to this downlink transmitting beam are transmitted by the same preamble sequence.

b. The UE selects one preamble sequence for all configured downlink transmitting beams.

c. The UE determines preamble sequences according to the explicit resource configuration information. For example, if the resource configuration information explicitly indicates a preamble sequence used by the UE, the UE performs random access according to the indicated preamble sequence.

2. Determining specific uplink transmitting beams for transmitting multiple preambles:

a. For M preambles corresponding to the same configured downlink transmitting beam, the UE may randomly determine uplink transmitting beams used by the M preambles with equal probability. However, for the M preambles corresponding to each of the remaining downlink transmitting beams, uplink transmitting beams for the M preambles corresponding to each of the remaining downlink transmitting beams are determined according to the uplink transmitting beams determined by the M preambles corresponding to the first downlink transmitting beam.

b. For the transmission of preambles corresponding to all downlink transmitting beams, uplink transmitting beams are randomly determined by the UE with equal probability.

3. Determining a specific power ramping mode:

a. The UE determines a preamble power ramping counter for each of the selected downlink transmitting beams. That is, if the UE has N selected downlink transmitting beams and there are M possibly transmitted preambles corresponding to each downlink transmitting beam, the UE may have at most N preamble power ramping counters, and the M possible preambles corresponding to each downlink transmitting beam share a same preamble power ramping counter. Then:

i. In a same random access process, when the UE performs a new random access attempt, no matter whether or not the UE changes the uplink transmitting beam, the preamble power ramping counter is increased by 1.

ii. In the same random access process, when the UE performs a new random access attempt, among M preambles corresponding to a certain downlink transmitting beam, if the UE will actually transmit total X preambles, X uplink transmitting beams will be used; and, when total Y preambles are transmitted by the UE in a new random access attempt, Y uplink transmitting beams will be used.

a) When Y=X, and when less than and/or equal to 1, or X, or X/x, or $\lfloor X/x \rfloor$, or $\lceil x/x \rceil$ uplink beams among the Y uplink beams are changed compared to the X uplink beams, the preamble power ramping counter remains unchanged; otherwise, the preamble power ramping counter is increased by 1, where the x represents a ratio. For example, if x=2, X/x indicates that the preamble power ramping counter remains unchanged when more than half of uplink transmitting beams are changed compared to the actually used uplink transmitting beams in the previous random access attempt; otherwise, the preamble power ramping counter is increased by 1. For example, in the previous random access attempt, for a certain downlink transmitting beam, the UE transmits X (X=3) preambles and uses 3 uplink transmitting beams, for example, two beam 1 and one beam 2; however, in the current random access attempt, for the same downlink transmitting beam, the UE also transmits Y (Y=3) preambles and also uses 3 uplink transmitting beams. If there are one beam 1, one beam 2 and one beam 3 at this time, it is indicated that only one beam is changed. In this case, if the rule is that the preamble power ramping counter remains unchanged when the number of changed beams exceeds $\lfloor X/2 \rfloor$=2, since 1<2, the UE needs to increase the preamble power ramping counter by 1.

b) When Y<X, and when less than and/or equal to 1, or Y, or Y/x, or X, or X/x, or $\lfloor X/x \rfloor$, or $\lceil X/x \rceil$, or $\lfloor Y/x \rfloor$, or $\lceil Y/x \rceil$ uplink beams among the Y uplink beams are changed compared to the X uplink beams, the preamble power ramping counter remains unchanged; otherwise, the preamble power ramping counter is increased by 1, where the x represents a ratio. For example, if x=2, X/x indicates that the preamble power ramping counter remains unchanged when more than half of uplink transmitting beams are changed compared to the actually used uplink transmitting beams in the previous random access attempt; otherwise, the preamble power ramping counter is increased by 1. For example, in the previous random access attempt, for a certain downlink transmitting beam, the UE transmits X (X=3) preambles and uses 3 uplink transmitting beams, for example, two beam 1 and one beam 2; however, in the current random access attempt, for the same downlink transmitting beam, the UE transmits Y (Y=2) preambles and uses 2 uplink transmitting beams. If there are one beam 1 and one beam 2 at this time, it is indicated that zero beam is changed. In this case, if the rule is that the preamble power ramping counter remains unchanged when the number of changed beams exceeds $\lfloor Y/2 \rfloor$=1, since 0<1, the UE needs to increase the preamble power ramping counter by 1. If there are one beam 3 and one beam 4 at this time, it is indicated that two beams are changed. In this case, if the rule is that the preamble power ramping counter remains unchanged when the number of changed beams exceeds $\lfloor Y/2 \rfloor$=1, since 2>1, the UE needs to remain the preamble power ramping counter unchanged.

c) When Y>X, and when less than and/or equal to 1, or Y, or Y/x, or X, or X/x, or $\lfloor X/x \rfloor$, or $\lceil X/x \rceil$, or $\lfloor Y/x \rfloor$, or $\lceil Y/x \rceil$ uplink beams among the Y uplink beams are changed compared to the X uplink beams, the preamble power ramping counter remains unchanged; otherwise, the preamble power ramping counter is increased by 1, where the x represents a ratio. For example, if x=2, X/x indicates that the preamble power ramping counter remains unchanged when more than half of uplink transmitting beams are changed compared to the actually used uplink transmitting beams in the previous random access attempt; otherwise, the preamble power ramping counter is increased by 1. For example, in the previous random access attempt, for a certain downlink transmitting beam, the UE transmits X (X=3) preambles and uses 3 uplink transmitting beams, for example, two beam 1 and one beam 2; however, in the current random access attempt, for the same downlink transmitting beam, the UE transmits Y (Y=4) preambles and uses 4 uplink transmitting beams. If there are one beam 1, one beam 2, one beam 3 and one beam 4 at this time, it is indicated that two beams are changed. In this case, if the rule is that the preamble power ramping counter remains unchanged when the number of changed beams exceeds $\lfloor Y/2 \rfloor$=2, since 2=2, the UE needs to increase the preamble power ramping counter by 1.

b. The UE determines independent preamble power ramping counters for the transmission of all transmitted preambles.

i. For example, in the same random access process, if at most N*M preambles may be transmitted in one random access attempt, each preamble transmission has its own preamble power ramping counter.

a) When no RAR has been received before the transmission of this preamble and when the uplink transmitting beam for transmitting this preamble is changed, the preamble power ramping counter remains unchanged; otherwise:

a. when no RAR has been received before the transmission of this preamble and when the uplink transmitting beam for transmitting this preamble remains unchanged, the preamble power ramping counter is increased by 1; or, b. when an RAR has been received before the transmission of this preamble, the preamble power ramping counter is increased by 1.

c. In one random access process, the UE uses only one preamble power ramping counter for the transmission of all preambles.

i. For example, in the same random access process, in one random access attempt, total X preambles are actually transmitted, and X uplink transmitting beams are used. When the UE performs a new random access attempt, total Y preambles are transmitted, and Y uplink transmitting beams are used.

a) When Y=X, and when less than and/or equal to 1, or X, or X/x, or $\lfloor X/x \rfloor$, or $\lceil X/x \rceil$ uplink beams among the Y uplink beams are changed compared to the X uplink beams, the preamble power ramping counter remains unchanged; otherwise, the preamble power ramping counter is increased by 1, where the x represents a ratio. For example, if x=2, X/x indicates that the preamble power ramping counter remains unchanged when more than half of the uplink transmitting beams are changed; otherwise, the preamble power ramping counter is increased by 1. For example, in the previous random access attempt, the UE transmits X (X=3) preambles and uses 3 uplink transmitting beams, for example, two beam 1 and one beam 2; however, in the current random access attempt, the UE also transmits Y (Y=3) preambles and also uses 3 uplink transmitting beams. If there are one beam 1, one beam 2 and one beam 3 at this time, it is indicated that only one beam is changed. In this case, if the rule is that the preamble power ramping counter remains unchanged if the number of changed beams exceeds $\lfloor X/2 \rfloor$=2, since 1<2, the UE needs to increase the preamble power ramping counter by 1.

b) When Y<X, and when less than and/or equal to 1, or Y, or Y/x, or X, or X/x, or $\lfloor X/x \rfloor$, or $\lceil X/x \rceil$, or $\lfloor Y/x \rfloor$, or $\lceil Y/x \rceil$ uplink beams among the Y uplink beams are changed compared to the X uplink beams, the preamble power ramping counter remains unchanged; otherwise, the preamble power ramping counter is increased by 1, where the x represents a ratio. For example, if x=2, X/x indicates that the preamble power ramping counter remains unchanged when more than half of uplink transmitting beams are changed compared to the actually used uplink transmitting beams in the previous random access attempt; otherwise, the preamble power ramping counter is increased by 1. For example, in the previous random access attempt, the UE transmits X (X=3) preambles and uses 3 uplink transmitting beams, for example, two beam 1 and one beam 2; however, in the current random access attempt, the UE transmits Y (Y=2) preambles and uses 2 uplink transmitting beams. If there are one beam 1 and one beam 2 at this time, it is indicated that zero beam is changed. In this case, if the rule is that the preamble power ramping counter remains unchanged when the number of changed beams exceeds $\lfloor Y/2 \rfloor$=1, since 0<1, the UE needs to increase the preamble power ramping counter by 1. If there are one beam 3 and one beam 4 at this time, it is indicated that two beams are changed. In this case, if the rule is that the preamble power ramping counter remains unchanged when the number of changed beams exceeds $\lfloor Y/2 \rfloor$=1, since 2>1, the UE needs to remain the preamble power ramping counter unchanged.

c) When Y>X, and when less than and/or equal to 1, or Y, or Y/x, or X, or X/x, or $\lfloor X/x \rfloor$, or $\lceil X/x \rceil$, or $\lfloor Y/x \rfloor$, or $\rceil Y/x \rceil$ uplink beams among the Y uplink beams are changed compared to the X uplink beams, the preamble power ramping counter remains unchanged; otherwise, the preamble power ramping counter is increased by 1, where the x represents a ratio. For example, if x=2, X/x indicates that the preamble power ramping counter remains unchanged when more than half of uplink transmitting beams are changed compared to the actually used uplink transmitting beams in the previous random access attempt; otherwise, the preamble power ramping counter is increased by 1. For example, in the previous random access attempt, the UE transmits X (X=3) preambles and uses 3 uplink transmitting beams, for example, two beam 1 and one beam 2; however, in the current random access attempt, the UE transmits Y (Y=4) preambles and uses 4 uplink transmitting beams. If there are one beam 1, one beam 2, one beam 3 and one beam 4 at this time, it is indicated that two beams are changed. In this case, if the rule is that the preamble power ramping counter remains unchanged if the number of changed beams exceeds $\lfloor Y/2 \rfloor$=2, since 2=2, the UE needs to increase the preamble power ramping counter by 1.

4. Determining a specific power control mode:

a. The UE performs power control based on each of the configured downlink transmitting beams. That is, during the transmission of M preambles corresponding to each of the selected downlink transmitting beams, the transmitting power is calculated by using a Path Loss (PL) obtained by a same corresponding downlink transmitting beam.

b. The UE calculates the transmitting power based on a unified PL, specifically:

i. the PL corresponding to the downlink transmitting beam having the maximum Reference Signal Received Power (RSRP) is selected;

ii. the PL corresponding to the downlink transmitting beam having the minimum RSRP is selected;

iii. an average of PLs corresponding to all downlink transmitting beams is selected; and iv. in accordance with a predefined or configured RSRP threshold, the downlink transmitting beam having a PL not greater than or not less than the threshold is randomly selected with equal probability, and the transmitting power is calculated by using the PL of this downlink transmitting beam.

5. The user equipment determining the maximum number of transmissions.

a. In the random access based on the transmission of a single preamble, the UE regards the preamble_max configured by the base station as the maximum number of random access attempts, and only one preamble may be transmitted in each attempt; or, the UE directly regards the preamble_max as the maximum number of preambles that may be transmitted by the UE in one random access process.

b. During the random access based on the transmission of multiple preambles, the UE regards preamble_max configured by the base station as the maximum number of random access attempts, and at most N*M preambles may be transmitted in each attempt. When the UE prepares for a new random access attempt, the UE will increase the preamble transmission counter by 1. When the preamble transmission counter exceeds preamble_max or is equal to preamble_max+1, the UE reports a random access problem to the higher layer. Or, the UE obtains, according to the preamble_max configured by the base station, the maximum number preamble_max_new of preambles that may be transmitted by the UE in one random access process. In this case, preamble_max_new=preamble_max*N*M. When the number of preambles transmitted by the UE exceeds the preamble_max_new, the UE reports a random access problem to the higher layer. In addition, the UE may start a random access timer when it begins to transmit the first preamble. When the random access timer expires, the UE reports a random access problem to the higher layer. Or, the UE simultaneously maintains the random access preamble transmission counter and the random access timer, if the preamble transmission counter exceeds a limit while the timer does not expire, the UE reports a random access problem to the higher layer; and, if the preamble transmission counter does not exceed the limit while the timer expires, the UE also reports a random access problem to the higher layer.

6. The UE receiving a Random Access Response (RAR) message.

a. The UE stops searching when detecting a matched RAR, then reads an uplink grant in the RAR and begins to prepare for subsequent uplink transmission.

b. When the UE detects an RAR, the UE may continuously search within a configured RAR window. If multiple matched RARs are found, i. the UE randomly selects an RAR with equal probability;

ii. the UE selects, according to the uplink grant, an RAR supporting the earliest subsequent uplink transmission; and iii. the UE determines an RAR according to an HARQ progress ID indicated in the RAR, specifically:

1) if there are multiple different HARQ progress IDs, the user transmits corresponding uplink data according to the uplink grant indicated in the corresponding RAR; and 2) for a same HARQ progress ID, the UE randomly selects an RAR with equal probability, or the UE selects, according to the uplink grant, an RAR supporting the earliest subsequent uplink transmission.

In another embodiment, in a contention-based random access scenario, how to perform the multiple preambles based random access provided in the present disclosure will be described.

A UE reads, from the random access configuration information transmitted in a downlink channel (a broadcast channel or a shared channel or a control channel), available random access resources including random access channel resources, random access preamble resources, and a possible mapping relationship between measurement reference signals and random access resources) in the present cell. By using the measurement results of the measurement reference signals (for example, an RSRP, a Signal-to-Noise Ratio (SNR), a Block Error Ratio (BLER), etc.,), the UE may perform the following operations.

1. Selecting indexes of N measurement reference signals having the optimal measurement result (for example, maximum RSRP, maximum SNR, minimum BLER, etc.,); and 2. based on a preset configured threshold, selecting indexes of all measurement reference signals having a measurement result satisfying the threshold (for example, an RARP greater than the threshold, an SNR greater than the threshold, a BLER less than the threshold, etc.,); and 3. based on a preset or configured threshold, selecting indexes of N measurement reference signals having a measurement result satisfying the threshold (for example, an RARP greater than the threshold, an SNR greater than the threshold, a BLER less than the threshold, etc.,).

When the UE determines the indexes of one or more selected measurement reference signals (i.e., indexes of downlink transmitting bearers), a corresponding random resource configuration may be determined. After the UE acquires the random access resource configuration (including a possible random access channel resource configuration, a random access preamble resource configuration, and a configuration of the mapping relationship between downlink beam indexes and random access resources):

1. the random access resource configuration also contains explicit indication information of the transmission of multiple preambles, and the value of N and/or the value of M; and 2. by the random access resource configuration, a base station implicitly informs the UE that it may transmit multiple preambles in one attempt. For example, in the random access resource configuration, M random access preamble resources corresponding to one downlink transmitted beam are explicitly configured for the UE. When the UE obtains random access resources capable of transmitting M preambles, the UE considers that M preambles may be transmitted in one attempt. That is, the UE considers the configuration of multiple random access resources as an indication of permitting the transmission of multiple preambles.

Specifically, in the present disclosure, scenarios involving the multiple preambles based random access include the followings.

1. The user equipment selects one downlink transmitting beam, and the user equipment may correspondingly transmit M (M>1) preambles based on this downlink transmitting beam. That is, the UE transmits M preambles in one random access attempt, and the resources for transmitting the M preambles correspond to the same selected downlink transmitting beam.

2. The user equipment selects N (N>1) downlink transmitting beams, but the user equipment may correspondingly transmit only 1 preamble based on each downlink transmitting beam. That is, the UE transmits N preambles in one random access attempt, and the resources for transmitting the N preambles are in one-to-one correspondence to the selected N downlink transmitting beams.

3. The user equipment selects N (N>1) downlink transmitting beams, but the user equipment may correspondingly transmit M (M>1) preambles based on each downlink transmitting beam. That is, the UE transmits N*M preambles in one random access attempt, but the resources for transmitting every M preambles correspond to the same selected downlink transmitting beam.

When the user equipment determines that the multiple preambles based random access is performed, the UE may perform the following operations.

1. Determining specific preamble sequences, specifically:

a. The UE determines preamble sequences according to the number of selected available downlink transmitting beams. If the UE selects N downlink transmitting beams, the UE may select one preamble sequence for each downlink transmitting beam. That is, M preambles corresponding to this downlink transmitting beam are transmitted by the same preamble sequence.

b. The UE selects a preamble sequence. That is, all preambles in one random access attempt are transmitted by the same preamble sequence.

c. The UE determines preamble sequences according to the explicit resource configuration information. If the resource configuration information explicitly indicates a preamble sequence used by the UE for the index of the downlink transmitting index, the UE performs random access according to the indicated preamble sequence. If multiple available preamble sequences are indicated, the UE randomly selects a preamble sequence with equal probability.

2. Determining specific uplink transmitting beams for transmitting multiple preambles:

a. For M preambles corresponding to the same selected downlink transmitting beam, the UE may randomly determine uplink transmitting beams used by the M preambles with equal probability. However, for M preambles corresponding to each of the remaining downlink transmitting beams, uplink transmitting beams for the M preambles corresponding to each of the remaining downlink transmitting beams are determined according to the uplink transmitting beams determined by the M preambles corresponding to the first downlink transmitting beam.

b. For the transmission of preambles corresponding to all downlink transmitting beams, uplink transmitting beams are randomly determined by the UE with equal probability.

3. Determining a specific power ramping mode:

a. The UE determines a preamble power ramping counter for each of the selected downlink transmitting beams. That is, if the UE has N selected downlink transmitting beams and there are M possibly transmitted preambles corresponding to each downlink transmitting beam, the UE may have at most N preamble power ramping counters, and the M possible preambles corresponding to each downlink transmitting beam share a same preamble power ramping counter. Then:

ii. in the same random access process, when the UE performs a new random access attempt, no matter whether or not the UE changes the uplink transmitting beam, the preamble power ramping counter is increased by 1;

iii. In the same random access process, when the UE performs a new random access attempt, among M preambles corresponding to a certain downlink transmitting beam, if the UE will actually transmit total X preambles, X uplink transmitting beams will be used; and, when total Y preambles are transmitted by the UE in a new random access attempt, Y uplink transmitting beams will be used.

a) When Y=X, and when less than and/or equal to 1, or X, or X/x, or $\lfloor X/x \rfloor$, or $\lceil X/x \rceil$ uplink beams among the Y uplink beams are changed compared to the X uplink beams, the preamble power ramping counter remains unchanged; otherwise, the preamble power ramping counter is increased by 1, where the x represents a ratio. For example, if x=2, X/x indicates that the preamble power ramping counter remains unchanged when more than half of uplink transmitting beams are changed compared to the actually used uplink transmitting beams in the previous random access attempt; otherwise, the preamble power ramping counter is increased by 1. For example, in the previous random access attempt, for a certain downlink transmitting beam, the UE transmits X (X=3) preambles and uses 3 uplink transmitting beams, for example, two beam 1 and one beam 2; however, in the current random access attempt, for the same downlink transmitting beam, the UE also transmits Y (Y=3) preambles and also uses 3 uplink transmitting beams. If there are one beam 1, one beam 2 and one beam 3 at this time, it is indicated that only one beam is changed. In this case, if the rule is that the preamble power ramping counter remains unchanged when the number of changed beams exceeds $\lfloor X/2 \rfloor$=2, since 1<2, the UE needs to increase the preamble power ramping counter by 1.

b) When Y<X, and when less than and/or equal to 1, or Y, or Y/x, or X, or X/x, or $\lfloor X/x \rfloor$, or $\lceil X/x \rceil$, or $\lfloor Y/x \rfloor$, or $\lceil Y/x \rceil$ uplink beams among the Y uplink beams are changed compared to the X uplink beams, the preamble power ramping counter remains unchanged; otherwise, the preamble power ramping counter is increased by 1, where the x represents a ratio. For example, if x=2, X/x indicates that the preamble power ramping counter remains unchanged when more than half of uplink transmitting beams are changed compared to the actually used uplink transmitting beams in the previous random access attempt; otherwise, the preamble power ramping counter is increased by 1. For example, in the previous random access attempt, for a certain downlink transmitting beam, the UE transmits X (X=3) preambles and uses 3 uplink transmitting beams, for example, two beam 1 and one beam 2; however, in the current random access attempt, for the same downlink transmitting beam, the UE transmits Y (Y=2) preambles and uses 2 uplink transmitting beams. If there are one beam 1 and one beam 2 at this time, it is indicated that zero beam is changed. In this case, if the rule is that the preamble power ramping counter remains unchanged when the number of changed beams exceeds $\lfloor Y/2 \rfloor$=1, since 0<1, the UE needs to increase the preamble power ramping counter by 1. If there are one beam 3 and one beam 4 at this time, it is indicated that two beams are changed. In this case, if the rule is that the preamble power ramping counter remains unchanged when the number of changed beams exceeds $\lfloor Y/2 \rfloor$=1, since 2>1, the UE needs to remain the preamble power ramping counter unchanged.

c) When Y>X, and when less than and/or equal to 1, or Y, or Y/x, or X, or X/x, or $\lfloor X/x \rfloor$, or $\lceil X/x \rceil$, or $\lfloor Y/x \rfloor$, or $\lceil Y/x \rceil$ uplink beams among the Y uplink beams are changed compared to the X uplink beams, the preamble power ramping counter remains unchanged; otherwise, the preamble power ramping counter is increased by 1, where the x represents a ratio. For example, if x=2, X/x indicates that the preamble power ramping counter ins unchanged when more than half of uplink transmitting beams are changed compared to the actually used uplink transmitting beams in the previous random access attempt; otherwise, the preamble power ramping counter is increased by 1. For example, in the previous random access attempt, for a certain downlink transmitting beam, the UE transmits X (X=3) preambles and uses 3 uplink transmitting beams, for example, two beam 1 and one beam 2; however, in the current random access attempt, for the same downlink transmitting beam, the UE transmits Y (Y=4) preambles and uses 4 uplink transmitting beams. If there are one beam 1, one beam 2, one beam 3 and one beam 4 at this time, it is indicated that two beams are changed. In this case, if the rule is that the preamble power ramping counter remains unchanged when the number of changed beams exceeds $\lfloor Y/2 \rfloor$=2, since 2=2, the UE needs to increase the preamble power ramping counter by 1.

b. The UE determines independent preamble power ramping counters for the transmission of all transmitted preambles.

iv. For example, in the same random access process, if at most N*M preambles may be transmitted in one random access attempt, each preamble transmission has its own preamble power ramping counter.

a) When no RAR has been received before the transmission of this preamble and when the uplink transmitting beam for transmitting this preamble is changed, the preamble power ramping counter remains unchanged; otherwise:

a. when no RAR has been received before the transmission of this preamble and when the uplink transmitting beam for transmitting this preamble remains unchanged, the preamble power ramping counter is increased by 1; or, b. when an RAR has been received before the transmission of this preamble, the preamble power ramping counter is increased by 1.

c. In one random access process, the UE uses only one preamble power counter for the transmission of all preambles.

v. For example, in the same random access process, in one random access attempt, total X preambles are actually transmitted, and X uplink transmitting beams are used. When the UE performs a new random access attempt, total Y preambles are transmitted, and Y uplink transmitting beams are used.

a) When Y=X, and when less than and/or equal to 1, or X, or X/x, or $\lfloor X/x \rfloor$, or $\lceil X/x \rceil$ uplink beams among the Y uplink beams are changed compared to the X uplink beams, the preamble power ramping counter remains unchanged; otherwise, the preamble power ramping counter is increased by 1, where the x represents a ratio. For example, if x=2, X/x indicates that the preamble power ramping counter remains unchanged when more than half of the uplink transmitting beams are changed; otherwise, the preamble power ramping counter is increased by 1. For example, in the previous random access attempt, the UE transmits X (X=3) preambles and uses 3 uplink transmitting beams, for example, two beam 1 and one beam 2; however, in the current random access attempt, the UE also transmits Y (Y=3) preambles and also uses 3 uplink transmitting beams, If there are one beam 1, one beam 2 and one beam3 at this time, it is indicated that only one beam is changed. In this case, if the rule is that the preamble power ramping counter remains unchanged if the number of changed beams exceeds $\lfloor X/2 \rfloor = 2$, since 1<2, the UE needs to increase the preamble power ramping counter by 1.

b) When Y<X, and when less than and/or equal to 1, or Y, or Y/x, or X, or X/x, or $\lfloor X/x \rfloor$, or $\lceil X/x \rceil$, or $\lfloor Y/x \rfloor$, or $\lceil Y/x \rceil$ uplink beams among the Y uplink beams are changed compared to the X uplink beams, the preamble power ramping counter remains unchanged; otherwise, the preamble power ramping counter is increased by 1, where the x represents a ratio. For example, if x=2, X/x indicates that the preamble power ramping counter remains unchanged when more than half of uplink transmitting beams are changed compared to the actually used uplink transmitting beams in the previous random access attempt; otherwise, the preamble power ramping counter is increased by 1. For example, in the previous random access attempt, the UE transmits X (X=3) preambles and uses 3 uplink transmitting beams, for example, two beam 1 and one beam 2; however, in the current random access attempt, the LE transmits Y (Y=2) preambles and uses 2 uplink transmitting beams. If there are one beam 1 and one beam 2 at this time, it is indicated that zero beam is changed. In this case, if the rule is that the preamble power ramping counter remains unchanged when the number of changed beams exceeds $\lfloor Y/2 \rfloor = 1$, since 0<1, the UE needs to increase the preamble power ramping counter by 1. If there are one beam 3 and one beam 4 at this time, it is indicated that two beams are changed. In this case, if the rule is that the preamble power ramping counter remains unchanged when the number of changed beams exceeds $\lfloor Y/2 \rfloor = 1$, since 2>1, the UE needs to remain the preamble power ramping counter unchanged.

c) When Y>X, and when less than and/or equal to 1, or Y, or Y/x, or X, or X/x, or $\lfloor X/x \rfloor$, or $\lceil X/x \rceil$, or $\lfloor Y/x \rfloor$, or $\lceil Y/x \rceil$ uplink beams among the Y uplink beams are changed compared to the X uplink beams, the preamble power ramping counter remains unchanged; otherwise, the preamble power ramping counter is increased by 1, where the x represents a ratio. For example, if x=2, X/x indicates that the preamble power ramping counter remains unchanged when more than half of uplink transmitting beams are changed compared to the actually used uplink transmitting beams in the previous random access attempt; otherwise, the preamble power ramping counter is increased by 1. For example, in the previous random access attempt, the UE transmits X (X=3) preambles and uses 3 uplink transmitting beams, for example, two beam 1 and one beam 2; however, in the current random access attempt, the UE transmits Y (Y=4) preambles and uses 4 uplink transmitting beams. If there are one beam 1, one beam 2, one beam 3 and one beam 4 at this time, it is indicated that two beams are changed. In this case, if the rule is that the preamble power ramping counter remains unchanged if the number of changed beams exceeds $\lfloor Y/2 \rfloor = 2$, since 2=2, the UE needs to increase the preamble power ramping counter by 1.

4. Determining a specific power control mode:

a. The UE performs power control based on each of the selected downlink transmitting beams. That is, during the transmission of M preambles corresponding to each of the selected downlink transmitting beams, the transmitting power is calculated by using a Path Loss (PL) obtained by a same corresponding downlink transmitting beam.

b. The UE calculates the transmitting power based on a unified PL, specifically:

i. the PL corresponding to the downlink transmitting beam having the maximum Reference Signal Received Power (RSRP) is selected;

ii. the PL corresponding to the downlink transmitting beam having the minimum RSRP is selected;

iii. an average of PLs corresponding to all downlink transmitting beams is selected; and iv. in accordance with a predefined or configured RSRP threshold, the downlink transmitting beam having a PL not greater than or not less than the threshold is randomly selected with equal probability, and the transmitting power is calculated by using the PL of this downlink transmitting beam.

5. The user equipment determining the maximum number of transmissions.

a. In the random access based on the transmission of a single preamble, the UE regards the preamble_max configured by the base station as the maximum number of random access attempts, and only one preamble may be transmitted in each attempt; or, the UE directly regards the preamble_max as the maximum number of preambles that may be transmitted by the UE in one random access process.

b. During the random access based on the transmission of multiple preambles, the UE regards the preamble_max configured by the base station as the maximum number of random access attempts, and at most N*M preambles may be transmitted in each attempt. Or, the UE obtains, according to the preamble_max configured by the base station, the maximum number preamble_max_new of preambles that may be transmitted by the UE in one random access process. In this case, preamble_max_new=preamble_max*N*M. When the number of preambles transmitted by the UE exceeds the preamble_max_new, the UE reports a random access problem to the higher layer. Or, the UE starts a random access timer when it begins to transmit the first preamble. When the random access timer expires, the UE reports a random access problem to the higher layer. Or, the UE simultaneously maintains the random access preamble transmission counter and the random access timer, if the preamble transmission counter exceeds a limit while the timer does not expire, the UE reports a random access problem to the higher layer; and, if the preamble transmission counter does not exceed the limit while the timer expires, the UE also reports a random access problem to the higher layer.

6. The UE receiving a Random Access Response (RAR) message.

a. The UE stops searching when detecting a matched RAR, then reads an uplink grant in the RAR and begins to prepare for subsequent uplink transmission.

b. When the UE detects an RAR, the UE may continuously search within a configured RAR window. If multiple matched RARs are found, i. the UE randomly selects an RAR with equal probability;

ii. the UE selects, according to the uplink grant, an RAR supporting the earliest subsequent uplink transmission; and iii. the UE determines an RAR according to an progress ID indicated in the RAR, specifically:

1) if there are multiple different HARQ progress IDs, the user transmits corresponding uplink data according to the uplink grant indicated in the corresponding RAR; and 2) for a same HARQ progress ID, the UE randomly selects an RAR with equal probability, or the UE selects, according to the uplink grant, an RAR supporting the earliest subsequent uplink transmission.

In another embodiment, two cases of acquiring the random access resource configuration by the UE have been described in the above two embodiments. In one case, the UE reports the measurement result, and the base station configures corresponding random access resources; and in the other case, the UE reads the configuration of the base station to acquire all possible d m access resource configurations, then selects indexes of measurement reference signals (i.e., downlink transmitting beams) according to its own measurement result, and eventually obtains the random access resources selected by itself. However, for the random access in an unlicensed spectrum, the UE needs to perform LBT (Listen Before Talk) on possible random access channels. That is, the UE attempts to receive signals on a channel, on which signals are to be transmitted, within a period of time before the real transmission of signals. If the received signal energy is not less than a preset or configured threshold, the UE considers that this channel has been occupied, the LBT is failed, and the UE may give up this transmission. In this embodiment, the case where LBT is performed in the unlicensed spectrum will be taken into consideration.

Specifically, in the present disclosure, scenarios involving the multiple preambles based random access include the followings.

Figure 21:
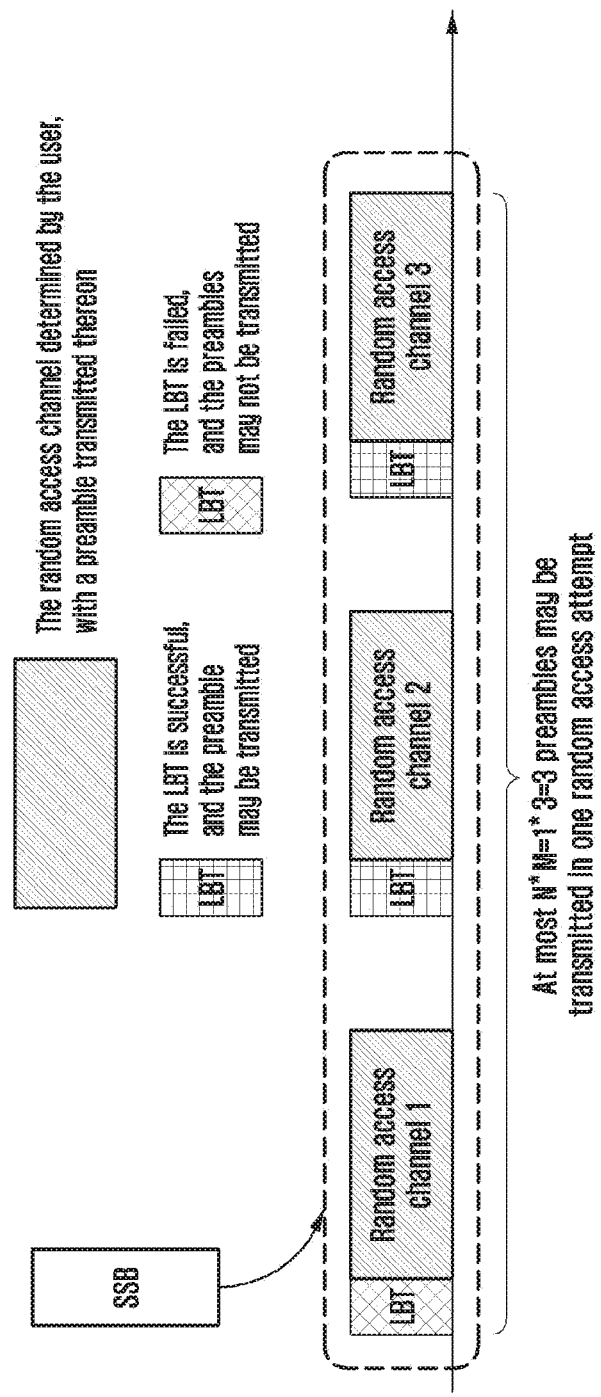
FIG. 21 is a first exemplary diagram of a transmission of multiple preambles based on unlicensed spectra.

1. The user equipment selects one downlink transmitting beam, and the user equipment may correspondingly transmit at most M (M>1) preambles based on this downlink transmitting beam. That is, the UE transmits at most M preambles in one random access attempt, and the resources for transmitting the M preambles correspond to the same selected downlink transmitting beam. As shown in FIG. 21, the UE selects one downlink transmitting beam from the random access configuration, and it may be determined that three random access channels are transmitted by the corresponding random resources. However, since the LBT on the channel 1 is failed and the LBT on the channels 2 and 3 is successful, the UE actually transmits only two preambles.

Figure 22:
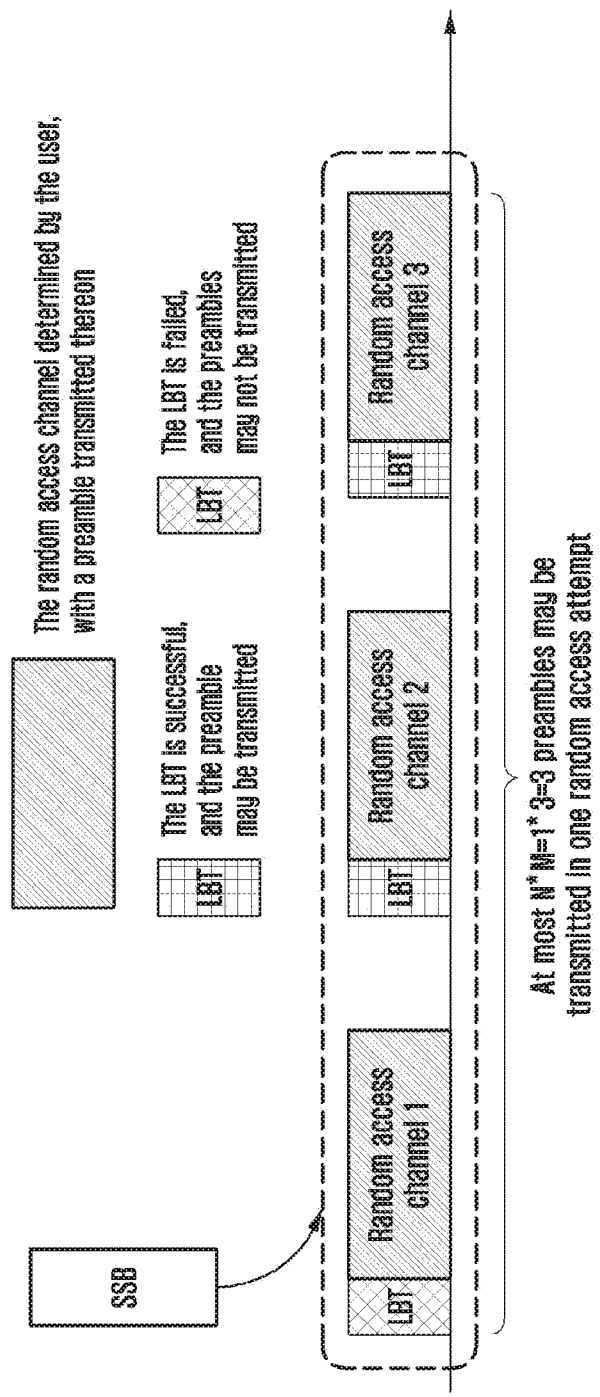
FIG. 22 is a second exemplary diagram of a transmission of multiple preambles based on unlicensed spectra.

2. The user equipment selects N (N>1) downlink transmitting beams, but the user equipment may correspondingly transmit at most one preambles based on each downlink transmitting beam. That is, the UE transmits at most N preambles in one random access attempt, and the resources for transmitting the N preambles are in one-to-one corresponding to the N selected downlink transmitting beams. As shown in FIG. 22, the UE selects two downlink transmitting beams from the random access configuration, and it may be determined that one random access channel is transmitted by the random resources corresponding to each downlink transmitting beam. However, since the LBT on the channel 1 is failed and the LBT on the channel 2 is successful, the UE actually transmits only one preamble.

Figure 23:
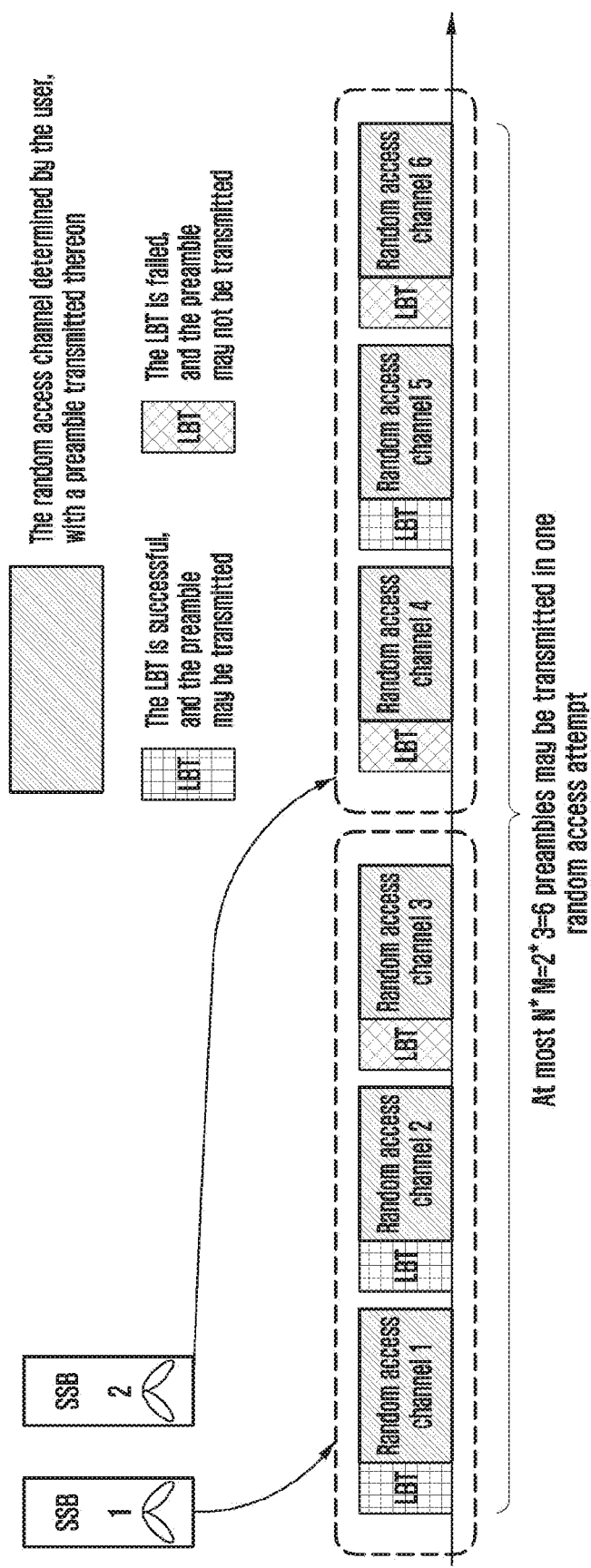
FIG. 23 is a third exemplary diagram of a transmission of multiple preambles based on unlicensed spectra.

3. The user equipment selects N (N>1) downlink transmitting beams, but the user equipment may correspondingly transmit at most M (M>1) preambles based on each downlink transmitting beam. That is, the UE transmits at most N*M preambles in one random access attempt, but the resources for transmitting every M preambles correspond to the same selected downlink transmitting beam. As shown in FIG. 23, from the perspective of the resource configuration, in the case where the UE selects SSB1, at most three preambles may be transmitted. However, since the LBT on the random access channel 3 is failed, the UE transmits only two preambles in three random access channels corresponding to the SSB1. Similarly, the UE transmits only one preamble in three random access channels corresponding to SSB2. Therefore, the UE actually transmits three preambles in one random access attempt.

After the UE acquires the random access resource configuration (including a possible random access channel resource configuration, a random access preamble resource configuration, and a configuration of the mapping relationship between downlink beams and random access resources):

1. the random access resource configuration also contains explicit indication information of the transmission of multiple preambles, and the value of N and/or the value of M; and 2. by the random access resource configuration, the base station implicitly informs the UE that it may transmit multiple preambles in one attempt. For example, in the random access resource configuration, M random access preamble resources corresponding to one downlink transmitting beam are explicitly configured for the UE. When the UE obtains random access resources capable of transmitting M preambles, the UE considers that M preambles may be transmitted in one attempt. That is, the UE considers the configuration of multiple random access resources as an indication of permitting the transmission of multiple preambles.

When the user equipment determines that the multiple preambles based random access is performed, the UE may perform the following operations.

1. Determining specific preamble sequences, specifically:

a. The UE determines preamble sequences according to the number of selected available downlink transmitting beams. If the UE selects N downlink transmitting beams, the UE may select one preamble sequence for each downlink transmitting beam. That is, M preambles corresponding to this downlink transmitting beam are transmitted by the same preamble sequence.

b. The UE selects a preamble sequence. That is, all preambles in one random access attempt are transmitted by the same preamble sequence.

c. The UE determines preamble sequences according to the explicit resource configuration information. If the resource configuration information explicitly indicates a preamble sequence used by the UE, the UE performs random access according to the indicated preamble sequence.

2. Determining specific uplink transmitting beams for transmitting multiple preambles:

a. For M possible preambles corresponding to the same selected downlink transmitting beam, the UE may randomly determine uplink transmitting beams used by the M preambles with equal probability. However, for M preambles corresponding to each of the remaining downlink transmitting beams, uplink transmitting beams for the M preambles corresponding to each of the remaining downlink transmitting beams are determined according to the uplink transmitting beams determined by the M preambles corresponding to the first downlink transmitting beam.

b. For the transmission of preambles corresponding to all downlink transmitting beams, uplink transmitting beams are randomly determined by the UE with equal probability.

3. Determining a specific power ramping mode:

a. The UE determines a preamble power ramping counter for each of the selected downlink transmitting beams. That is, if the UE has N selected downlink transmitting beams and there are M possibly transmitted preambles corresponding to each downlink transmitting beam, the UE may have at most N preamble power ramping counters, and the M possible preambles corresponding to each downlink transmitting beam share a same preamble power ramping counter. Then:

vi. In the same random access process, when the UE performs a new random access attempt, no matter whether or not the UE changes the uplink transmitting beam, the preamble power ramping counter is increased by 1.

vii. In the same random access process, when the UE performs a new random access attempt, among M preambles corresponding to a certain downlink transmitting beam, if the UE will actually transmit total X preambles, X uplink transmitting beams will be used; and, when total Y preambles are transmitted by the UE in a new random access attempt, Y uplink transmitting beams will be used.

a) When Y=X, and when less than and/or equal to 1, or X, or X/x, or $\lfloor X/x \rfloor$, or $\lceil X/x \rceil$ uplink beams among the Y uplink beams are changed compared to the X uplink beams, the preamble power ramping counter remains unchanged; otherwise, the preamble power ramping counter is increased by 1, where the x represents a ratio. For example, if x=2, X/x indicates that the preamble power ramping counter remains unchanged when more than half of uplink transmitting beams are changed compared to the actually used uplink transmitting beams in the previous random access attempt; otherwise, the preamble power ramping counter is increased by 1. For example, in the previous random access attempt, for a certain downlink transmitting beam, the UE transmits X (X=3) preambles and uses 3 uplink transmitting beams, for example, two beam 1 and one beam 2; however, in the current a random access attempt, for the same downlink transmitting beam, the UE also transmits Y (Y=3) preambles and also uses 3 uplink transmitting beams. If there are one beam 1, one beam 2 and one beam 3 at this time, it is indicated that only one beam is changed. In this case, if the rule is that the preamble power ramping counter remains unchanged when the number of changed beams exceeds $\lfloor X/2 \rfloor$=2, since 1<2, the UE needs to increase the preamble power ramping counter by 1.

b) When Y<X, and when less than and/or equal to 1, or Y, or Y/x, or X or X/x, or $\lfloor X/x \rfloor$, or $\lceil X/x \rceil$, or $\lfloor Y/x \rfloor$, or $\lceil Y/x \rceil$ uplink beams among the Y uplink beams are changed compared to the X uplink beams, the preamble power ramping counter remains unchanged; otherwise, the preamble power ramping counter is increased by 1, where the x represents a ratio. For example, if x=2, X/x indicates that the preamble power ramping counter remains unchanged when more than half of uplink transmitting beams are changed compared to the actually used uplink transmitting beams in the previous random access attempt; otherwise, the preamble power ramping counter is increased by 1. For example, in the previous random access attempt, for a certain downlink transmitting beam, the UE transmits X (X=3) preambles and uses 3 uplink transmitting beams, for example, two beam 1 and one beam 2; however, in the current random access attempt, for the same downlink transmitting beam, the UE transmits Y (Y=2) preambles and uses 2 uplink transmitting beams. If there are one beam 1 and one beam 2 at this time, it is indicated that zero beam is changed. In this case, if the rule is that the preamble power ramping counter remains unchanged when the number of changed beams exceeds $\lfloor Y/2 \rfloor$=1, since 0<1, the UE needs to increase the preamble power ramping counter by 1. If there are one beam 3 and one beam 4 at this time, it is indicated that two beams are changed. In this case, if the rule is that the preamble power ramping counter remains unchanged when the number of changed beams exceeds $\lfloor Y/2 \rfloor$=2, since 2>1, the UE needs to remain the preamble power ramping counter unchanged.

c) When Y>X, and when less than and/or equal to 1, or Y, or Y/x, or X, or X/x, or $\lfloor X/x \rfloor$, or $\lceil X/x \rceil$, or $\lfloor Y/x \rfloor$, or $\lceil Y/x \rceil$ uplink beams among the Y uplink beams are changed compared to the X uplink beams, the preamble power ramping counter remains unchanged; otherwise, the preamble power ramping counter is increased by 1, where the x represents a ratio. For example, if x=2, X/x indicates that the preamble power ramping counter remains unchanged when more than half of uplink transmitting beams are changed compared to the actually used uplink transmitting beams in the previous random access attempt; otherwise, the preamble power ramping counter is increased by 1. For example, in the previous random access attempt, for a certain downlink transmitting beam, the UE transmits X (X=3) preambles and uses 3 uplink transmitting beams, for example, two beam 1 and one beam 2; however, in the current random access attempt, for the same downlink transmitting beam, the UE transmits Y (Y=4) preambles and uses 4 uplink transmitting beams. If there are one beam 1, one beam 2, one beam 3 and one beam 4 at this time, it is indicated that two beams are changed. In this case, if the rule is that the preamble power ramping counter remains unchanged when the number of changed beams exceeds $\lfloor Y/2 \rfloor$=2, since 2=2, the UE needs to increase the preamble power ramping counter by 1.

b. The UE determines independent preamble power ramping counters for the transmission of all transmitted preambles.

i. For example, in the same random access process, if at most N*M preambles may be transmitted in one random access attempt, each preamble transmission has its own preamble power ramping counter.

1. When the random access channel used by this preamble has passed LBT, that is, the LBT is successful, and when the uplink transmitting beam for transmitting this preamble is changed, the preamble power ramping counter remains unchanged; otherwise a) when the is successful, and when the uplink transmitting beam for transmitting this preamble remains unchanged, the preamble power ramping counter is increased by 1; or, b) when the LBT is failed, the preamble power ramping counter is increased by 1.

2. When no RAR has been received before the transmission of this preamble and when the uplink transmitting beam for transmitting this preamble is changed, the preamble power ramping counter remains unchanged; otherwise a) when no RAR has been received before the transmission of this preamble and when the uplink transmitting beam for transmitting this preamble remains unchanged, the preamble power ramping counter is increased by 1; or, b) when an RAR has been received before the transmission of this preamble, the preamble power ramping counter is increased by 1.

c). In one random access process, the UE uses only one preamble power ramping counter for the transmission of all preambles.

i. For example, in the same random access process, in one random access attempt, total X preambles are actually transmitted, and X uplink transmitting beams are used. When the UE performs a new random access attempt, total Y preambles will be transmitted, and Y uplink transmitting beams will be used.

1. When Y=X, and when less than and/or equal to 1, or Y, or Y/x, or X, or X/x, or $\lfloor X/x \rfloor$, or $\lceil X/x \rceil$, or $\lfloor Y/x \rfloor$, or $\lceil Y/x \rceil$ uplink beams among the Y uplink beams are changed compared to the X uplink beams, the preamble power ramping counter remains unchanged; otherwise, the preamble power ramping counter is increased by 1, where the x represents a ratio. For example, if x=2, X/x indicates that the preamble power ramping counter remains unchanged when more than half of the uplink transmitting beams are changed; otherwise, the preamble power ramping counter is increased by 1. For example, in the previous random access attempt, the UE transmits X (X=3) preambles and uses 3 uplink transmitting beams, for example, two beam 1 and one beam 2; however, in the current random access attempt, the UE also transmits Y (Y=3) preambles and also uses 3 uplink transmitting beams. If there are one beam 1, one beam 2 and one beam3 at this time, it is indicated that only one beam is changed. In this case, if the rule is that the preamble power ramping counter remains unchanged if the number of changed beams exceeds $\lfloor X/2 \rfloor$=2, since 1<2, the UE needs to increase the preamble power ramping counter by 1.

2. When Y<X, and when less than and/or equal to 1, or Y, or Y/x, or X, or X/x, or $\lfloor X/x \rfloor$, or $\lceil X/x \rceil$, or $\lfloor Y/x \rfloor$, or $\lceil Y/x \rceil$ uplink beams among the Y uplink beams are changed compared to the X uplink beams, the preamble power ramping counter remains unchanged; otherwise, the preamble power ramping counter is increased by 1, where the x represents a ratio. For example, if x=2, X/x indicates that the preamble power ramping counter remains unchanged when more than half of uplink transmitting beams are changed compared to the actually used uplink transmitting beams in the previous random access attempt; otherwise, the preamble power ramping counter is increased by 1. For example, in the previous random access attempt, the UE transmits X (X=3) preambles and uses 3 uplink transmitting beams, for example, two beam 1 and one beam 2; however, in the current random access attempt, the UE transmits Y (Y=2) preambles and uses 2 uplink transmitting beams. If there are one beam 1 and one beam 2 at this time, it is indicated that zero beam is changed. In this case, if the rule is that the preamble power ramping counter remains unchanged when the number of changed beams exceeds $\lfloor Y/2 \rfloor$=1, since 0<1, the UE needs to increase the preamble power ramping counter by 1. If there are one beam 3 and one beam 4 at this time, it is indicated that two beams are changed. In this case, if the rule is that the preamble power ramping counter remains unchanged when the number of changed beams exceeds $\lfloor Y/2 \rfloor$=1, since 2>1, the UE needs to remain the preamble power ramping counter unchanged.

3. When Y>X, and when less than and/or equal to 1, or Y, or Y/x, or X, or X/x, or $\lfloor X/x \rfloor$, or $\lceil X/x \rceil$, or $\lfloor Y/x \rfloor$, or $\lceil Y/x \rceil$ uplink beams among the Y uplink beams are changed compared to the X uplink beams, the preamble power ramping counter remains unchanged; otherwise, the preamble power ramping counter is increased by 1, where the x represents a ratio. For example, if x=2, X/x indicates that the preamble power ramping counter remains unchanged when more than half of uplink transmitting beams are changed compared to the actually used uplink transmitting beams in the previous random access attempt; otherwise, the preamble power ramping counter is increased by 1. For example, in the previous random access attempt, the UE transmits X (X=3) preambles and uses 3 uplink transmitting beams, for example, two beam 1 and one beam 2; however, in the current random access attempt, the UE transmits Y (Y=4) preambles and uses 4 uplink transmitting beams. if there are one beam 1, one beam 2, one beam 3 and one beam 4 at this time, it is indicated that two beams are changed. In this case, if the rule is that the preamble power ramping counter remains unchanged if the number of changed beams exceeds since $\lfloor Y/2 \rfloor$=2, since 2=2, the UE needs to increase the preamble power ramping counter by 1.

4. Determining a specific power control mode:

a. The UE performs power control based on each of the selected downlink transmitting beams. That is, during the transmission of M possible preambles corresponding to each of the selected downlink transmitting beams, the transmitting power is calculated by using a Path Loss (PL) obtained by a same corresponding downlink transmitting beam.

b. The UE calculates the transmitting power based on a unified PL, specifically:

i. the PL corresponding to the downlink transmitting beam having the maximum Reference Signal Received Power (RSRP) is selected;

ii. the PL corresponding to the downlink transmitting beam having the minimum RSRP is selected;

iii. an average of PLs corresponding to all downlink transmitting beams is selected; and iv. in accordance with a predefined or configured RSRP threshold, the downlink transmitting beam having a PL not greater than or not less than the threshold is randomly selected with equal probability, and the transmitting power is calculated by using the PL of this downlink transmitting beam.

5. The user equipment determining the maximum number of transmissions.

a. If the preamble_max configured by the base station is in the random access based on the transmission of a single preamble, the UE regards the preamble_max as the maximum number of random access attempts, and only one preamble may be transmitted in each attempt; or, the UE directly regards the preamble_max as the maximum number of preambles that may be transmitted by the UE in one random access process.

b. If the preamble_max configured by the base station is in the random access based on the transmission of multiple preambles, the UE regards the preamble_max as the maximum number of random access attempts, and at most N*M preambles may be transmitted in each attempt; or, the UE directly regards the preamble_max as the maximum number of preambles that may be transmitted by the UE in one random access process. In this case, the UE uses preamble_max_new=preamble_max*N*M. After one failed random access attempt, the UE increases the preamble transmission counter by X, where the X represents the number of preambles actually transmitted by the UE in this failed random access attempt. When the preamble transmission counter exceeds the preamble_max_new, the UE reports a random access problem to the higher layer. Or, the UE starts a random access timer when it begins to transmit the first preamble. When the random access timer expires, the UE reports a random access problem to the higher layer.

Or, the UE simultaneously maintains the preamble transmission counter and the random access timer. If the counter exceeds a limit while the timer does not expire, the UE reports a random access problem to the higher layer; and, if the counter does not exceed the limit while the timer expires, the UE also reports a random access problem to the higher layer 6. The UE receiving a Random Access Response (RAR) message.

a. The UE stops searching when detecting a matched RAR, then reads an uplink grant in the RAR and begins to prepare for subsequent uplink transmission.

b. When the UE detects an RAR, the UE may continuously search within a configured RAR window. If multiple matched RARs are found, i. the UE randomly selects an RAR with equal probability;

ii. the UE selects, according to the uplink grant, an RAR supporting the earliest subsequent uplink transmission; and iii. the UE determines an RAR according to an HARQ progress ID indicated in the RAR, specifically:

1) if there are multiple different HARQ progress IDs, the user transmits corresponding uplink data according to the uplink grant indicated in the corresponding RAR; and 2) for a same HARQ progress ID, the UE randomly selects an RAR with equal probability, or the UE selects, according to the uplink grant, an RAR supporting the earliest subsequent uplink transmission.

Another embodiment of the random access method according to the present disclosure will be described below. The random access method provided in this embodiment includes the following steps:

step 1: determining, by a User Equipment (UE), random access resources;

step 2: when it is determined according to the random access resources that multiple preambles based random access is performed, determining, according to a determined number of downlink transmitting beams and a number of preambles that may be transmitted by each downlink transmitting beam, the maximum number of preambles that may be transmitted in one random access attempt;

step 3: determining, according to one or more determined downlink transmitting beams, a preamble power ramping counter and a preamble transmission counter; and step 4: performing, according to the maximum number of preambles that may be transmitted, the counting result of the preamble power ramping counter and the counting result of the preamble transmitting counter, the multiple preambles based random access.

It may be known from the above that, in this embodiment, the user equipment may determine the downlink beams and the maximum number of preambles that may be transmitted in one random access attempt, and perform random access power control, so that the multiple preambles based random access may be realized.

In applications, the method further includes the step of:

selecting one preamble sequence for each of the determined downlink transmitting beams, and transmitting preambles corresponding to the downlink transmitting beam by this preamble sequence; or, selecting one preamble sequence, and transmitting all preambles in one random access attempt by this preamble sequence; or, selecting preamble sequences configured in the random access resources.

In applications, the method further includes the step of:

determining uplink transmitting beams for multiple preambles corresponding to the first downlink transmitting beam, and determining, according to uplink transmitting beams, the uplink transmitting beam for the multiple preambles corresponding to other downlink transmitting beam; or, randomly determining the uplink transmitting beams used by the preambles corresponding to all downlink transmitting beams with equal probability.

In applications, the step of determining the preamble power ramping counter includes:

determining one preamble power ramping counter for each of the selected downlink transmitting beams, wherein multiple preambles corresponding to the same downlink transmitting beam share the same preamble power ramping counter; or, determining one preamble power ramping counter for each of the selected preambles; or, using only one preamble power counter by the transmission of all preambles in one random access process.

In applications, when the UE has N determined downlink transmitting beams and each of the downlink transmitting beams corresponds to M preambles, in a case where the multiple preambles corresponding to each of the downlink transmitting beams share a same preamble power ramping counter, when the UE performs a new random access attempt during a same random access process, the method for determining the counting result of the preamble power ramping counter includes:

for a same downlink transmitting beam, when less than and/or equal to 1, or Y, or Y/x, or X, or X/x, or $\lfloor X/x \rfloor$, or $\lceil X/x \rceil$, or $\lfloor Y/x \rfloor$, or $\lceil Y/x \rceil$ uplink beams among the actually used Y uplink beams are changed compared to the X actually used uplink transmitting beams in the previous random access attempt, the preamble power ramping counter is increased by 1; otherwise, the preamble power ramping counter remains unchanged;

in a case where one preamble power ramping counter is determined for each of the selected preambles, the method for determining the counting result of the preamble power ramping counter includes:

when the uplink transmitting beam for transmitting the preamble is changed, the preamble power ramping counter remains unchanged; otherwise, the preamble power ramping counter is increased by 1;

in a case where only one preamble power ramping counter is used by the transmission of all preambles, the method for determining the counting result of the preamble power ramping counter includes:

during a new random access attempt, when less than and/or equal to 1, or Y, or Y/x, or X, or X/x, or $\lfloor X/x \rfloor$, or $\lceil X/x \rceil$, or $\lfloor Y/x \rfloor$, or $\lceil Y/x \rceil$ uplink beams among all the actually used Y uplink beams are changed compared to all the X actually used uplink transmitting beams in the previous random access attempt, the preamble power ramping counter is increased by 1; otherwise, the preamble power ramping counter remains unchanged;

where the M, N, X and Y are all positive integers, and the x is a ratio.

In applications, the method further includes the step of:

during the transmission of the multiple preambles corresponding to each of the selected downlink transmitting beams, calculating the transmitting power by using a Path Loss (PL) obtained by a same corresponding downlink transmitting beam; or, calculating the transmitting power based on a unified PL.

In applications, the step of calculating the transmitting power based on a unified PL includes:

selecting the PL corresponding to the downlink transmitting beam having the maximum Reference Signal Received Power (RSRP); or, selecting the PL corresponding to the downlink transmitting beam having the minimum RSRP; or, selecting an average of PLs corresponding to all downlink transmitting beams; or, randomly selecting, according to a predefined or configured RSRP threshold, the downlink transmitting beam having a PL not greater than or not less than the threshold with equal probability, and calculating the transmitting power by using the PL of the downlink transmitting beam.

In applications, the method for determining the counting result of the preamble transmission counter includes:

when the preamble_max in the random access resources is determined as the maximum number of random access attempts, whenever the UE performs a random access attempt, increasing the preamble transmission counter by 1; or, determining, according to the preamble_max in the random access resources, the maximum number of preamble_max_new of preambles that may be transmitted by the UE, and increasing the preamble transmission counter by L if there are L preambles to be transmitted by the UE in one random access attempt.

Figure 24:
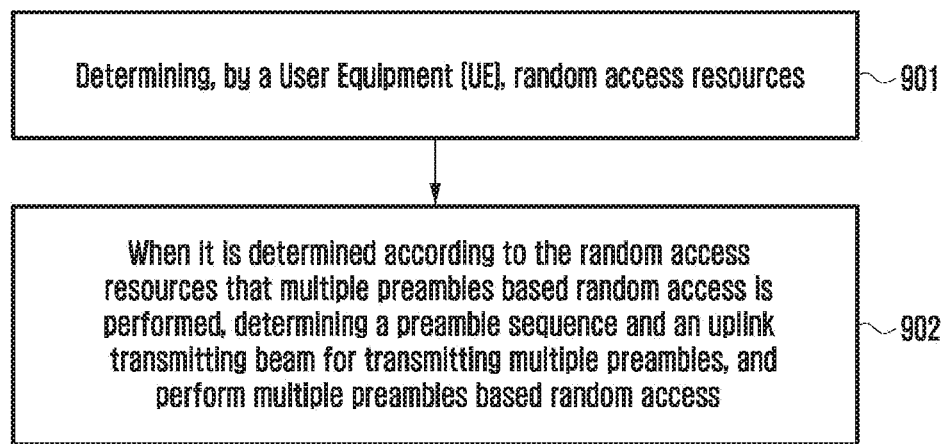
FIG. 24 is a schematic flowchart of an embodiment of a random access method according to the present disclosure.

Still another embodiment of the random access method according to the present disclosure will be described below with reference to FIG. 24. As shown in FIG. 24, the random access method provided in this embodiment includes the following steps:

step 901: determining, by a User Equipment (UE), random access resources; and step 902: determining a preamble sequence and an uplink transmitting beam for transmitting multiple preambles to perform multiple preambles based random access, when it is determined according to the random access resources that multiple preambles based random access is performed.

It may be known from the above that, in the present disclosure, the a preamble sequence and an uplink transmitting beam for transmitting multiple preambles may be determined, so that the random access to multiple preambles may be realized.

In applications, the method further includes the step of:

determining, according to a determined number of downlink transmitting beams and a number of preambles that may be transmitted by each downlink transmitting beam, a preamble power ramping counter and/or a preamble transmission counter; and the step of performing multiple preambles based random access includes:

performing the multiple preambles based random access according to the determined preamble sequence and uplink transmitting beam for transmitting the multiple preambles and at least one of the followings: a counting result of the preamble power ramping counter and a counting result of the preamble transmission counter.

In applications,

The method for determining preamble sequence for transmitting multiple preambles includes:

selecting one preamble sequence for each of the determined downlink transmitting beams, and transmitting the preamble corresponding to the downlink transmitting beam by using the selected preamble sequence; or, selecting one preamble sequence, and transmitting all preambles in one random access attempt by using the selected preamble sequence; or, determining a preamble sequence configured in the random access resources as the preamble sequence for transmitting the multiple preambles.

In applications, the method for determining the uplink transmitting beam for transmitting the multiple preambles includes:

determining the uplink transmitting beam for the multiple preambles corresponding to one downlink transmitting beam, and determining, according to the determined uplink transmitting beams, the uplink transmitting beam for the multiple preambles corresponding to other downlink transmitting beam; or, randomly determining the uplink transmitting beams used by the preambles corresponding to all downlink transmitting beams with equal probability.

In applications, the step of determining the preamble power ramping counter includes:

determining one preamble power ramping counter for each of the determined downlink transmitting beams, wherein multiple preambles corresponding to the same downlink transmitting beam share the same preamble power ramping counter; or, determining one preamble power ramping counter for each preamble determined to be transmitted; or, determining one preamble power ramping counter for all preambles determined to be transmitted.

In applications, when the UE has N determined downlink transmitting beams and each of the downlink transmitting beams corresponds to M preambles, in a case where the multiple preambles corresponding to each of the downlink transmitting beams share a same preamble power ramping counter, when the UE performs a new random access attempt during a same random access process, the method for determining the counting result of the preamble power ramping counter includes:

for a same downlink transmitting beam, when less than and/or equal to 1, or Y, or Y/x, or X, or X/x, or $\lfloor X/x \rfloor$, or $\lceil X/x \rceil$, or $\lfloor Y/x \rfloor$, or $\lceil Y/x \rceil$ uplink beams among the actually used Y uplink beams are changed compared to the X actually used uplink transmitting beams in the previous random access attempt, the preamble power ramping counter is increased by 1; otherwise, the preamble power ramping counter remains unchanged;

in a case where one preamble power ramping counter is determined for each preamble determined to be transmitted, the method for determining the counting result of the preamble power ramping counter includes:

when the uplink transmitting beam for transmitting the preamble is changed, the preamble power ramping counter remains unchanged; otherwise, the preamble power ramping counter is increased by 1;

in a case where one preamble power ramping counter is determined for all preambles determined to be transmitted, the method for determining the counting result of the preamble power ramping counter includes:

during a new random access attempt, when less than and/or equal to 1, or Y, or Y/x, or X, or X/x, or $\lfloor X/x \rfloor$, or $\lceil X/x \rceil$, or $\lfloor Y/x \rfloor$, or $\lceil Y/x \rceil$ uplink beams among all the actually used Y uplink beams are changed compared to all the X actually used uplink transmitting beams in the previous random access attempt, the preamble power ramping counter is increased by 1; otherwise, the preamble power ramping counter remains unchanged;

where the M, N, X and Y are all positive integers, and the x is a set ratio.

In applications, the method further includes the step of:

during the transmission of the multiple preambles corresponding to each of the determined downlink transmitting beams, calculating the transmitting power by using a Path Loss (PL) obtained by a same corresponding downlink transmitting beam; or, calculating the transmitting power based on a unified PL.

In applications, the step of calculating the transmitting power based on a unified PL includes:

selecting the PL corresponding to the downlink transmitting beam having the maximum Reference Signal Received Power (RSRP); or, selecting the PL corresponding to the downlink transmitting beam having the minimum RSRP; or, selecting an average of PLs corresponding to all downlink transmitting beams; or, randomly cling, according to a predefined or configured RSRP threshold, the downlink transmitting beam having a PL not greater than or not less than the threshold with equal probability, and calculating the transmitting power by using the PL of the downlink transmitting beam.

In applications, the method for determining the counting result of the preamble transmission counter includes:

whenever the UE performs a new random access attempt, increasing the preamble transmission counter by 1; or, whenever the UE performs a new random access attempt and there are L preambles determined to be transmitted in the new random access attempt, increasing the preamble transmission counter by L, where the L is a positive integer.

In applications, the method further includes the step of:

when the preamble transmission counter exceeds a preset preamble maximum preamble_max, reporting a random access problem; or, when the preamble transmission counter exceeds preamble_max*N*M, reporting a random access problem, where N is the number of the determined downlink transmitting beams, M is the number of preambles corresponding to each of the downlink transmitting beams, and both M and N are positive integers. The reporting a random access problem is reporting a random access problem to the higher layer.

In applications, the method further includes the step of:

starting a random access timer when the UE starts to transmit a first preamble, and reporting a random access problem when the random access timer expires; or, reporting a random access problem when the preamble transmission counter exceeds the preset preamble maximum preamble_max or preamble_max*N*M and when the random access timer does not expire; or, reporting a random access problem when the preamble transmission counter does not exceed the preset preamble maximum preamble_max or preamble_max*N*M and when the random access timer expires;

where N is the number of the determined downlink transmitting beams, M is the number of preambles corresponding to ch of the downlink transmitting beams, and both M and N are positive integers. The reporting a random access problem reporting a random access problem to the higher layer.

In applications, the step of performing multiple preambles based random access includes:

determining a Random Access Response (RAR);
the method for determining the RAR includes:
detecting a matched RAR; or
detecting an RAR, continuously searching within a configured RAR search window, and determining the RAR in the following way if multiple matched RARs are found:
randomly selecting an RAR with equal probability;

selecting, according to an uplink grant, an RAR supporting the earliest subsequent uplink transmission; and determining an RAR according to a Hybrid Automatic Repeat reQuest (HARQ) progress ID indicated in the RAR.

In applications, the step of determining an RAR according to an HARQ progress ID indicated in the RAR includes:

if there are multiple different HARQ progress IDs, transmitting corresponding uplink data according to an uplink grant indicated in the corresponding RAR; or, for a same HARQ progress ID, randomly selecting an RAR with equal probability, or selecting, according to an uplink grant, an RAR supporting the earliest subsequent uplink transmission.

In applications, the step of determining, by a User Equipment (UE), random access resources includes:

acquiring, by the UE, measurement reference signals configured by a base station, the measurement reference signals including a synchronization signal block and/or a Channel State Information-Reference Signal (CSI-RS);

measuring, by the UE, the configured measurement reference signals to obtain a measurement result of the measurement reference signals, reporting the measurement result, and acquiring random access resources configured according to the measurement result by the base station.

In applications, the step of reporting the measurement result includes any one of the following:

feeding back measurement results of all the configured measurement reference signals to the base station;

feeding back, according to a predefined or configured threshold and to the base station, measurement results of all measurement reference signals greater than or not less than the threshold; and feeding back measurement results of all the configured measurement reference signals to the base station, and feeding back, according to predefined or configured threshold and to the base station, indexes of all measurement reference signals greater than or not less than the threshold.

In applications, the step of determining, by a UE, random access resources includes:

reading, by the UE and from random access configuration information transmitted in a downlink channel by a base station, available random access resources in the local cell; and selecting, according to the measurement result of the measurement reference signals, indexes of the measurement reference signals to obtain corresponding random access resources.

In applications, the step of selecting, according to the measurement result of the measurement reference signals, indexes of the measurement reference signals includes:

selecting indexes of multiple measurement reference signals having the optimal measurement result;

selecting, based on a preset or configured threshold, indexes of all measurement reference signals having a measurement result satisfying the threshold;

selecting, based on a preset or configured threshold, indexes of multiple measurement reference signals from the indexes of all measurement reference signals having a measurement result satisfying the threshold.

In applications, the method further includes the step of:

attempting to receive a signal on a channel, on which signals are to be transmitted, within a period of time before the real transmission of signals, indicating that this channel has been occupied if the received signal energy is not less than a preset or configured threshold, and giving up this transmission.

Figure 25:
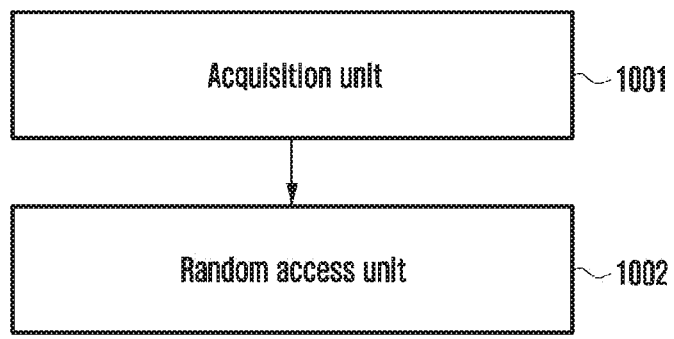
FIG. 25 is a schematic structure diagram of an embodiment of a user equipment according to the present disclosure.
Figure 26:
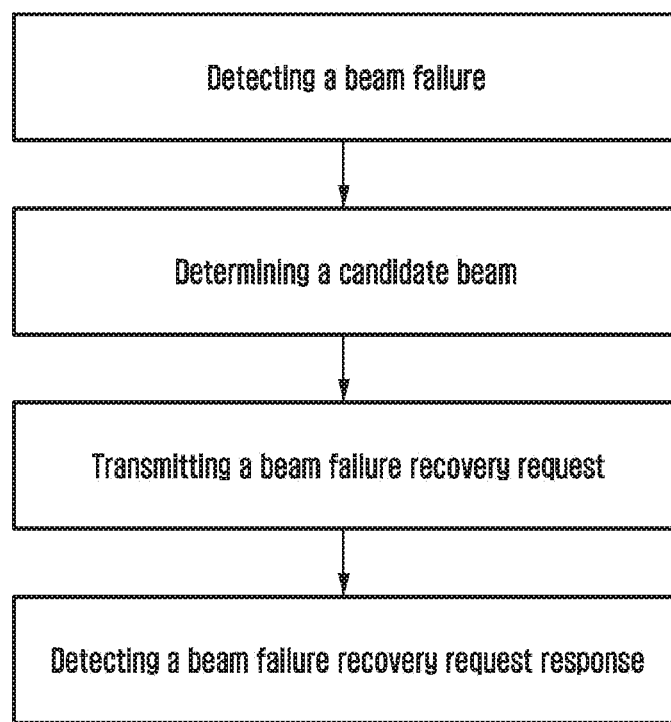
FIG. 26 is a flowchart of a beam failure recovery.

An embodiment of a user equipment according to the present disclosure will be described below with reference to FIG. 25.

An acquisition unit 1001 is configured to determine random access resources.

A random access unit 1002 is configured to, when it is determined according to the random access resources that multiple preambles based random access is performed, determine a preamble sequence and an uplink transmitting beam for transmitting multiple preambles and perform multiple preambles based random access.

In one aspect, the present disclosure further provides a random access method, including steps of:

configuring, by a base station, random access resources; and transmitting the random access resources, the random access resources being used for performing multiple preambles based random access by a User Equipment (UE).

In another aspect, the present disclosure further provides a base station, including:

a configuration unit configured to configure random access resources; and a transmission unit configured to transmit the random access resources, the random access resources being used for performing multiple preambles based random access by a User Equipment (UE).

In conclusion, in the present disclosure, a User Equipment (UE) determines random access resources; and, when it is determined according to the random access resources that multiple preambles based random access is performed, the maximum number of preambles that may be transmitted in one random access attempt and the preamble sequences and downlink transmitting beams for the preambles that may be transmitted are determined according to the determined number of downlink transmitting beams and the number of preambles that may be transmitted each downlink transmitting beam, and the multiple preambles based random access is then performed. In the present disclosure, the UE may determine the a preamble sequence and an uplink transmitting beam for transmitting multiple preambles, so that the present disclosure may realize the random access to multiple preambles.

In addition, the functional units in the embodiments of the present disclosure may be integrated into one processing module; or, each unit may exist alone physically; or, two or the like units may be integrated into one module. The integrated module may be implemented in the form of hardware, or may be implemented in the form of a software functional module. If the integrated module is implemented in the form of a software functional module and sold or used as an independent product, the integrated module may also be stored in a computer-readable storage medium.

The storage medium mentioned above may be a read-only memory, a magnetic disk, an optical disk, etc.

The procedure described in the specification, claims and the above accompanying drawing of the present invention contains a multiple of operations presented in a specific order. However, it shall clearly understand that, these operations can be executed or executed in parallel in a different order compared with the order presented in the present invention. The operation numbers such as 101, 102 or others are merely used for distinguishing each different operation. The operation numbers themselves does not represent any execution order. In addition, these procedures can include more or less operations, which can be executed or executed in parallel in an order. It is to be noted that, the descriptions "the first", "the second" and or others descriptions in the present invention are used for distinguishing the different information, devices, modules or others, which do not represent any sequential order, and do not limit "the first" and "the second" are different types.

The technical scheme in the embodiments of the present invention will be further described clearly and completely in combination with the accompanying drawings in the embodiments of the present invention below. Apparently, the described embodiments are merely parts of the embodiments of the present invention, not all the embodiments. Based on the embodiments of the present disclosure, all the other embodiments acquired by those skilled in the art without paying out any inventive work belong to the protection scope of the present invention.

Figure 27:
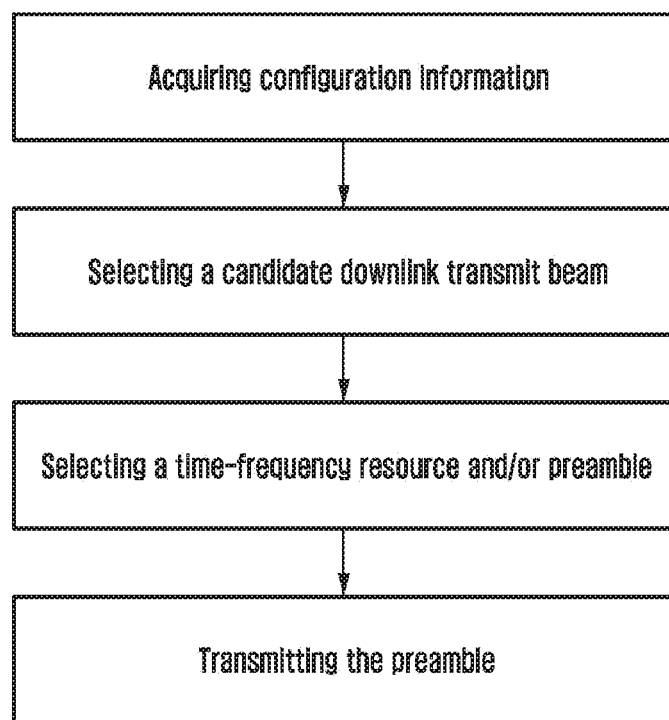
FIG. 27 is a flowchart of a beam failure recovery request according to the present invention.

The procedure of transmitting beam failure recovery request according to the disclosure is as illustrated in FIG. 27, specifically, comprising the following steps of:

acquiring, by a terminal, channel time-frequency resource configuration information and preamble configuration information used for transmitting a beam failure recovery request;

selecting, by the terminal, a candidate downlink transmit beam according to a measurement result;

selecting, by the terminal, a channel time-frequency resource and/or a preamble according to association between a downlink transmit beam and the channel time-frequency resource and/or the preamble, the time-frequency resource configuration information and the preamble allocation information; and transmitting, by the terminal, the preamble on the channel time-frequency resource.

In another embodiment, a resource allocation manner for a beam failure recovery request will be introduced in combination with a specific system. Assuming that the base station operates in a high frequency band and multi-beam operation is used to compensate for large path loss. The beam failure recovery request uses a dedicated time-frequency resource and a sequence resource. The time-frequency resource is similar to a random access channel time-frequency resource, and can be distinguished from the random access channel time-frequency resource by using a frequency division multiplexing manner or a time division multiplexing manner, and the like.

Figure 28:
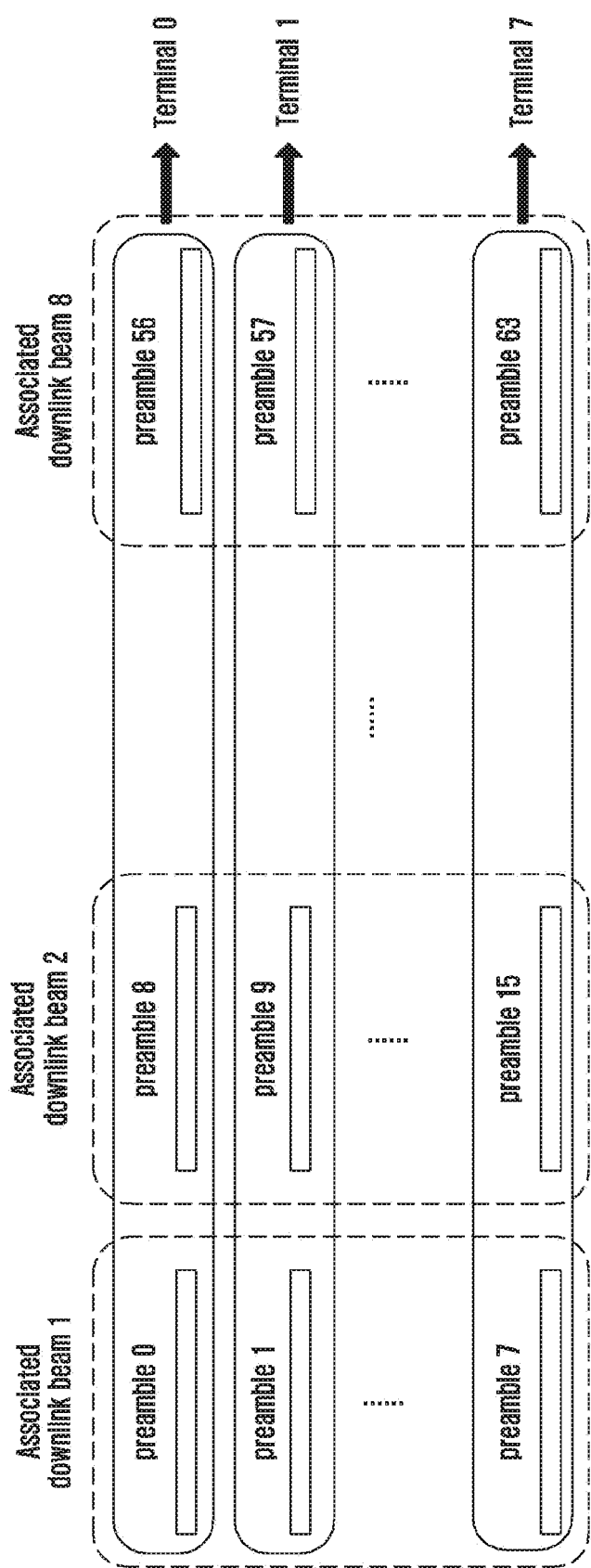
FIG. 28 is an allocation manner for preambles.

The base station uses a high layer signaling or downlink control information to configure resources for the beam failure recovery request. The resources include a time-frequency resource and a sequence resource. First, the sequence resource allocation manner provided in this embodiment will be described. A beam failure recovery request may use a same sequence resource pool as a random access procedure. For example, the preamble resource pool used by a random access procedure contains Npre preambles, and the beam failure recovery request uses the same preamble resource pool. Assuming that the dedicated time-frequency resource used for each beam failure recovery request has association with M downlink transmit beams. In this case, the number of terminals capable of transmitting the beam failure recovery request at the same time can be supported on the dedicated time-frequency resource is $\lfloor N_{pre}/M \rfloor$. In order to configure a preamble resource for a beam failure recovery request to a terminal in a serving cell, the possible allocations are as follows:

a. $\lceil \log_2 M \rceil$ bits are used to configure the number of the preamble groups on a same time-frequency resource, which decides the number of beams corresponding to the same time-frequency resource. $\lceil \log_2(\lfloor N_{pre}/M \rfloor) \rceil$ bits are used to inform the terminal of which preamble in a group being used to perform the beam failure recovery request. The specific grouping manners are specifically described as below:

a.1. Consecutive $\lfloor N_{pre}/M \rfloor$ preambles are divided into one group which corresponds to one beam on the dedicated time-frequency resource. Wherein, $\lfloor N_{pre}/M \rfloor$ preambles included in each group are allocated to different terminals for use. Take N_pre=64, M=8 as an example, that is, assuming that the maximum number of beams corresponds to a same time-frequency resource is 8. The preambles on a same time-frequency resource is divided into eight groups, and consecutive eight preambles are divided into one group, so as to correspond to one downlink transmit beam. Eight preambles in each group can be allocated to different terminals, that is, it can be supported that eight terminals transmit the beam failure recovery request on a same time-frequency resource. The allocation manner is as shown in FIG. 28.

That is, each group includes the same number of preambles and indexes the preambles in each group, and preambles with the same index in different groups are allocated to the same terminal. After the preambles are grouped, a one-to-one correspondence between the groups based on grouping number and the groups based on beam indexes (for example, a CSI-RS index or a beam RS index) for different groups is established. This correspondence is pre-notified or pre-determined as a pre-defined rule. It needs to configure the following parameters:

three bits for indicating the actual number of groups;

three bits for indicating the allocation situation of preambles in each group.

Figure 29:
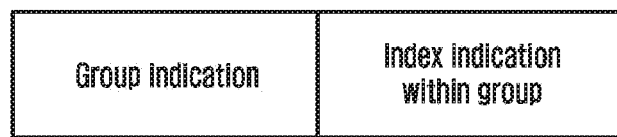
FIG. 29 is a possible preamble configuration format.

Specifically, in the above-described embodiment, three bits are used to notify the actual number of groups to the terminal and another three bits are used to notify the indexes in groups, and the notification format as shown in FIG. 29.

For the example shown in FIG. 28, a group indication is (111)2, indicating that the preamble sets are divided into eight groups, and eight preambles are contained in each group. The preamble corresponding to each beam is determined by an index indication within group. For the configuration information that the index indication within group is n, the preamble indexes corresponding to different beams used by the terminal are: n, n+M, . . . , $$n + \left( \left\lfloor \frac{N_{pre}}{M} \right\rfloor - 1 \right) M.$$

For example, for the example shown in FIG. 28, if the index indication within group is n=1, according to the above manner, the preamble indexes corresponding to different beams respectively are 1, 9, . . . , 57.

a.2. Adjacent $\lfloor N_{pre}/M \rfloor$ preambles are divided into one group which corresponds to one downlink beam. Consecutive $\lfloor N_{pre}/M \rfloor$ preambles are allocated to one terminal for a transmit beam failure recovery request. FIG. 5 shows a simple example of this method.

Figure 30:
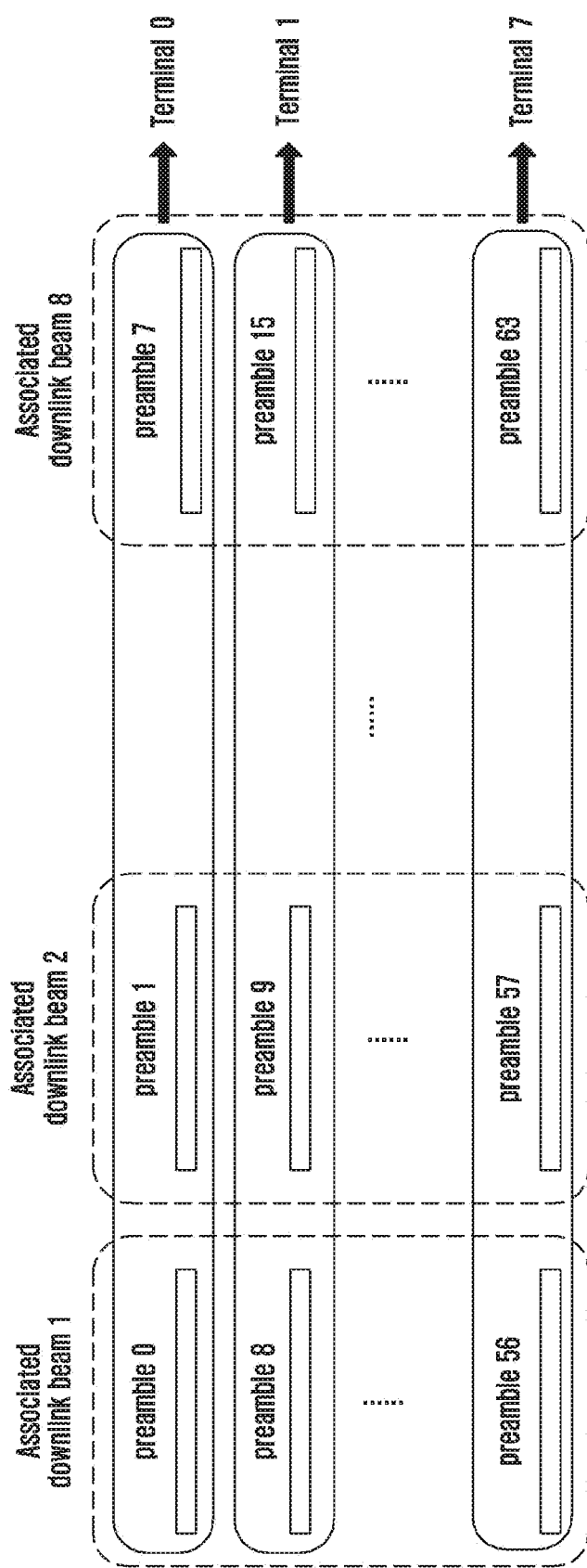
FIG. 30 is another configuration manner for preambles.

In the example shown in FIG. 30, assuming that N_pre=64, M=8, for this manner, the above-described preamble configuration indication manner can still be used, that is, the preamble configuration indication includes a group indication and an in-group index indication. Different from the above-described manner, the group indication in this manner is used to indicate an interval between two adjacent preamble indexes in the group, and the index in the group is used to indicate the preamble index allocated to the terminal in the group. Specifically, if the group indication is m and the index within a group is n, then the preamble indexes allocated to the terminal in sequence are: mn, mn+1, . . . , mn+M−1. Still taking the example shown in FIG. 29 as an example, the group indication is (111)2, that is, the interval between two adjacent preamble indexes in the preamble group corresponding to the same downlink transmit beam is by 7+1=8. If the index in the group is 1, the preamble indexes for the terminal are: 8, 9, . . . , 15.

The correspondence between the preamble and the downlink transmit beam is fixed in this manner, and a certain of flexibility is damaged while the signaling overhead is small.

b. When configuring preambles, the first preamble index and the number of the preambles allocated to the terminal are notified. While, the correspondence between the preambles and the downlink transmit beams can be determined in a predetermined manner. For example, the number of preambles included in the notification represents the number of downlink transmit beams corresponding to the time-frequency resource, and the terminal sorts the downlink transmit beams corresponding to the time-frequency resource based on beam index (or a CSI-RS index, a beam RS index, or a beam ID index or the like) and establishes one-to-one correspondence between the downlink transmit beams and the index-sorted preambles.

Another manner is to show a notification and indicate the downlink beam corresponding to the preamble. Wherein, the downlink beam can be indicated by a beam ID, a CSI-RS index, a downlink synchronization block index and a beam RS index. A beam index vector with the same length as that of the available preambles is notified, while a preamble index is notified, for establishing beam indexes which correspond to the preambles one by one.

Still taking that eight downlink transmit beams corresponding to each dedicated time-frequency resource as an example, the indication information format is as shown in FIG. 31 when the preamble resources are allocated.

A simple example is that if the preamble start index is 8 and the preamble number is 8, then the allocated preamble index is 8, 9, 10, 11, 12, 13, 14, 15, respectively, corresponding to the downlink beams 1-8. It should be noted that the downlink beam index is characterized by a downlink signal index, including a downlink synchronization block index, a CSI-RS index, a beam ID, or a beam RS index.

An allocation manner of time-frequency resources will be described below briefly. For the dedicated time-frequency resource for the beam failure recovery request that is frequency-division multiplexed with a random access channels, the dedicated time-frequency resource may be allocated using the frequency offset and the channel indication index.

Specifically, since the dedicated time-frequency resources and the random access channel coexist in a frequency division multiplexing manner, the dedicated time-frequency resource may use a random access channel configuration to determine a time-frequency resource structure and determine the frequency location of the dedicated time-frequency resource by the frequency offset. Wherein, the frequency offset is characterized by the number of physical resource blocks. At the same time, considering that there are multiple available random access channels in one time unit (such as one radio frame), multiple random access channels may also exist in the frequency domain. The adopted dedicated channel time-frequency resources are notified to the terminal by the channel indication index.

At the same time, the base station configures the downlink transmit beam index set corresponding to the dedicated time-frequency resource. The downlink transmit beam index may be characterized by a downlink synchronization signal block index, a CSI-RS index, a beam ID, or a beam RS index.

For more candidate downlink transmit beams, and multiple dedicated time-frequency resources are needed to complete the associated of all downlink transmit beams, when a dedicated time-frequency resource for beam failure recovery is configured, multiple time-frequency resource indication indexes may be configured and associated downlink transmit beam index sets are configured respectively.

To further increase the number of terminals that can be supported, the period of the dedicated time-frequency resource or the available subframes/radio frames may be further configured. For example, one possible manner is that the configuration information carries the available subframe configuration and is notified by way of an index table. Table 9 shows a possible index table.

TABLE 9

| Available subframe index | |
| --- | --- |
| Index | Available subframe index |
| 0 | all |
| 1 | odd subframe |
| 2 | even subframe |
| 3 | subframe 0 |
| 4 | subframe 1 |
| ... | ... |

In a similar manner, the available radio frame can be configured. Table 10 shows a possible index table.

TABLE 10

| Available radio frame index | |
| --- | --- |
| Index | Available radio frame index |
| 0 | all |
| 1 | odd radio frame |
| 2 | even radio frame |
| ... | ... |

When carrying an available subframe/radio frame index, the dedicated channel time-frequency resource configuration consists of the following parts: a frequency offset, a channel indication index, a downlink beam index, an available subframe index and an available radio frame index.

The time-frequency resource for beam failure recovery request can also configured by a manner of resource allocation. In this case, the above-described frequency offset and channel indication index in the configuration information need to be replaced by the resource configuration information. While the downlink beam index is still used to indicate the downlink beam corresponding to the time-frequency resource. The period of the dedicated channel time-frequency resource can be configured by available subframe indexes and available radio frame indexes.

The behavior of the terminal side is briefly described as follows:

The terminal reads dedicated channel time-frequency resource configuration information and preamble configuration information, to learn a following correspondence between a downlink transmit beam and a time-frequency resource/a preamble.

The terminal acquire an optimum downlink transmit beam according to a downlink measurement result when needing to initiate a beam failure recovery request, and determine the time-frequency resource and the preamble for transmitting the beam failure recovery request according to the correspondence between the downlink transmit beam and the time-frequency resource and/or the preamble.

The selected preamble is transmitted on the selected time-frequency resource.

In another embodiment, a beam failure recovery procedure will be introduced in combination with a specific system. In this embodiment, the beam failure recovery procedure is briefly described as follows:

A terminal reads a dedicated time-frequency resource and a preamble resource for a beam failure recovery procedure.

The terminal determines to select a downlink candidate beam according to a downlink measurement result and select a time-frequency resource and a preamble according to association between the downlink transmit beam and the time-frequency resource/the preamble, if the terminal needs to transmit a beam failure recovery request. The terminal chooses to fall back to a contention-based random access procedure, if the terminal cannot select the associated time-frequency resource/preamble (for example, the downlink transmit beam is not in the correspondence list) according to the downlink candidate beam selected according to the measurement result.

The terminal transmits the preamble on the dedicated channel time-frequency resource.

The request is considered as failed, if no response is detected in the corresponding detection window after the preamble transmitted on the dedicated channel time-frequency resource, and then the transmitting power of the preamble is increased according to a pre-defined power climb interval, and the beam failure recovery request is retransmitted.

The procedure of contention-free beam failure recovery request is considered as failed, and falls back to the contention-based random access procedure, if the times of transmitting the beam fail recovery request exceeds the available maximum transmitting times.

According to the above-described procedure, the beam failure recovery request information is needed to be carried in message 3, if the procedure falls back to the contention-based random access procedure. Specifically, under this triggering condition, the information carried in message 3 includes:

terminal identification (e.g., C-RNTI already allocated by a base station)
beam failure recovery request indication
candidate downlink beam index
other information Wherein, the terminal identification is used by a base station to distinguish the terminal that initiates a beam failure recovery request; the beam failure recovery request indication is used to notify the base station that the random access procedure is used to initiate a beam failure recovery request; and the candidate downlink beam index is used to notify the base station the candidate downlink transmit beam expected by the terminal in the beam failure recovery procedure. The index may be characterized by a variable, such as a downlink synchronization block index, a CSI-RS index, a beam ID or a beam RS index, capable of describing a downlink transmit beam. In addition, it should be noted that the candidate downlink beam index carried in message 3 may indicate one or more downlink transmit beams. For example, the candidate downlink beam index may correspond to a single downlink transmit beam or may correspond to multiple downlink transmit beams (downlink transmit beam group). Another possible manner is to carry multiple candidate beam indexes in message 3, used for notifying the base station the candidate beam index set.

In this case, message 4 carries a response of the beam failure recovery request, that is, message 4 carries the terminal indication and the response of the beam failure recovery request.

In another embodiment, a request manner of on demand system information will be introduced in combination with a specific system. In this embodiment, the procedure of acquiring, by a terminal, on demand system information is as follows:

A terminal selects a preamble needed to be transmitted according to association between on demand system information or a system information group and a random access preamble;

the terminal transmits the associated preamble in a random access channel; and the terminal detects a random access response in a downlink control channel, and acquires the time-frequency location of system information.

In this embodiment, it is assumed that the base station reserves a part of the preambles and establishes association with the corresponding system information or system information group. The correspondence may be indicated by a master information block in broadcast information or a system information block indicated by the master information block. Possible indication manners are notified by a lookup table manner. For example, the correspondence between the preamble index and the on demand system information/system information group is established by a lookup table. Table 11 shows a possible correspondence lookup table.

TABLE 11

Possible association lookup table

| Preamble index | System information/ system information group |
|---|---|
| 57 | 7 |
| 58 | 8 |
| 59 | 9 |
| 60 | 7, 8 |
| 61 | 7, 9 |
| 62 | 8, 9 |
| 63 | 7, 8, 9 |

In Table 11, the system information that needs to be transmitted using the manner of on demand transmission is system information 7, 8, 9 and their combinations. The base station reserves seven preambles (indexes 57 to 63), wherein each preamble corresponds to one system information or a combination of system information thereof.

The table may be determined in a pre-determined manner, or the on demand system information or system information group are notified to the terminal by using a manner of high layer signaling notification. If a manner of high layer signaling notification is adopted, the possible manner includes:

a. the configuration content includes: number of on demand system information needed to be transmitted and the corresponding system information index; and a vector, composed of 0, 1, constructed with the length equivalent to the number of on demand system information according to the number of system information, wherein 1 in the vector indicates that the corresponding system information in the group is needed to be transmitted, and 0 in the vector indicates that the corresponding system information in the group does not need to be transmitted. By this vector, the correspondence between the random access preamble and the on demand system information/system information group are indicated.

As for the preamble, the preamble for transmitting the on demand system information request is configured by configuring the first preamble and the number of the reserved preambles. In addition, it should be noted that the number of the preambles may indicate the number of the on demand system information/system information groups.

Taking the example shown in Table 11 as an example, the related configuration content of the preamble is that the first preamble index 57 and number 7 of the available preambles are configured. By these two parameters, the terminal determines the preamble for requested on demand system information.

At the same time, number of on demand system information required to be transmitted by base station is 3, and the corresponding indexes are system information 7, system information 8, and system information 9, and seven groups of vectors, with a length of 3, consisting of 0 and 1 are configured as follows:

(1,0,0) (0,1,0) (0,0,1) (1,1,0) (1,0,1) (0,1,1) (1,1,1)

In this manner, the configured and notified information includes: number of preambles, start index of the preambles, number of on demand system information, corresponding system information indexes, and multiple groups of vectors consisting of 0 and 1.

In addition, it should be noted that, when configuring the preamble, it is also possible to directly configure indexes of multiple available preambles.

b. the configuration content includes: configuring a tuple when configuring the on demand system information. This tuple includes: number of on demand system information in a group, and the corresponding system information index. That is, the tuple may be expressed as:

$$(NSI, I_{SI_1}, \ldots, I_{SI_{N_{SI}}}).$$

Where NSI is the number of system information in the tuple, and $I_{SI_n}$ is the index of the nth system information.

For example, still taking the example shown in Table 9 as an example, all tuples can be expressed as:

(1,7), (1,8), (1,9), (2, 7, 8), (2, 7, 9), (2, 8, 9), (3, 7, 8, 9)

It should be noted that, in the above example, an index of system information is directly used, and another configuration manner with a lower overhead is to first configure on demand system information that needs to be transmitted, that is, it is indicated in a master information block or Remaining Minimum System Information (RMSI) indicated by the master information block. Actual system information index is replaced by the corresponding relative index in the tuple.

Still taking the above example as an example, when the on demand system information configured in the master information block or the RMSI indicated by the master information block is the system information 7, 8 and 9, the foregoing tuple may be expressed as:

(1,0), (1,1), (1,2), (2, 0, 1), (2, 0, 2), (2, 1, 2), (3, 0, 1, 2)

Wherein, index 0 indicates system information 7, index 1 indicates system information 8, and index 2 indicates system information 9.

The configuration and notification of the preamble can be configured as described above.

In another method, a preamble index is also included in the tuple. In this case, the preamble no longer needs to be separately configured. For example, the tuple can be expressed as ($I_p$, $N_{SI}$, $I_{SI_1}$, ..., $I_{SI_{NSI}}$), where Ip is a preamble index.

The terminal acquires the correspondence between the on demand system information and the preamble by reading the master information block or the RMSI indicated by the master information block. When the terminal needs to obtain on demand system information or system information group, the associated preamble is selected according to the foregoing correspondence and transmitted on the random access channel.

After finishing transmitting of the preamble, the terminal detects the control channel in the random access response window. The random access response is detected and the physical downlink shared channel indicated in the corresponding control channel continues to be detected, if the control channel is scrambled by the RA-RNTI corresponding to the random access channel time-frequency resource for transmitting the preamble. The random access response is considered to be received successfully, if the random access response in the physical downlink shared channel contains the preamble identifier matching the transmitted preamble.

For the random access procedure triggered by the on demand system information request, the random access response at least includes:

random access preamble identifier downlink resource allocation information

Wherein, the random access preamble identifier is used to indicate which preamble is transmitted corresponding to the random access response; and the downlink resource allocation information is used to indicate the terminal to receive the time frequency resource of the requested on demand system information.

After receiving the random access response and detecting that the preamble identifier included in the random access response matches the transmitted preamble, the terminal considers the on demand system information request is transmitted successful. Further, the terminal reads the corresponding system information or system information group according to the downlink resource allocation information in the random access response.

It should be noted that if multiple terminals initiate multiple requests of on demand system information/system information groups, the base station transmits a maximum set of system information according to the maximum set of the system information/system information groups. Corresponding transmitting and detecting manners can be as follows:

a. the maximum set containing multiple system information uses a same random access response for indicating downlink resources. Wherein, the preamble corresponding to the preamble identifier in the random access response corresponds to the maximum set of the system information set. After detecting the transmitting of the random access response, if the preamble corresponding to the preamble identifier does not match the preamble transmitted by the terminal while the system information group corresponding to the preamble includes the system information requested by the terminal, it still considers that the on demand system information is requested successful, and the corresponding system information is read according to the downlink resource allocation information therein.

b. random access responses are respectively generated according to the detected random access preambles, while downlink resources are allocated according to the maximum set of system information, that is, the downlink resource allocation information in multiple random access responses may be the same or different, and the terminal reads the corresponding system information according to the downlink resource allocation information in the random access response.

Another manner of transmitting and detecting a random access response is as follows. The downlink control channel corresponding to the random access response is scrambled by a dedicated RNTI, for example, an on demand system information SI-RNTI (On demand SI-RNTI; OD-SI-RNTI), and different on demand system information may use the same OD-SI-RNTI, that is, adopt a uniform OD-SI-RNTI; or different system information/system information groups adopt different OD-SI-RNTIs, wherein correspondences between these different OD-SI-RNTIs and the corresponding system information/system information groups may be notified to the terminal in a predetermined manner, or corresponding association may be notified by a high layer signaling configuration.

In addition, it should be noted that, if the second case is adopted, the base station may allocate the OD-SI-RNTIs according to the maximum set of system information requested by the terminal and allocate associated downlink time-frequency resources.

If the terminal detects the downlink control channel in the random access response window, if the system information/system information group corresponding to the OD-SI-RNTI used for scrambling the downlink control channel matches the system information request transmitted or includes the transmitted system information, it is considered that a random access response is detected, and the downlink physical shared channel indicated by the downlink control channel is further detected.

In an implementation manner, the base station transmits the system information/system information group requested by the terminal on the downlink physical shared channel, to complete the request and the transmitting of on demand system information. In another implementation manner, the OD-SI-RNTI-scrambled control channel indicates the location of the time-frequency resource for the random access response, wherein the random access response contains the following contents:

random access preamble identifier downlink time-frequency resource allocation information Wherein, the random access preamble identifier is used to indicate which preamble is transmitted corresponding to the random access response; and the downlink resource allocation information is used to indicate the terminal to receive the time frequency resource of the requested on demand system information.

In the above manner, the random access preamble identifier is optional. The terminal reads the corresponding system information according to the downlink time-frequency resource allocation information.

In another embodiment, a request manner of on demand system information will be introduced in combination with a specific system. In this embodiment, the master information block or the system information block indicated in the master information block does not indicate the correspondence between the preamble and the on demand system information, but merely indicates the on demand system information index.

In this case, if the terminal needs to obtain the on demand system information, it needs to be done through a random access procedure. The procedure for the terminal to obtain the on demand system information is as follows:

the terminal transmits a random access preamble on a random access channel;

the terminal detects a random access response in the random access response window. If the control information scrambled by the RA-RNTI corresponding to the random access channel time-frequency resource used in the control channel is detected, it is considered that random access is detected; the terminal continues to detect the downlink time-frequency resource indicated by the control channel, and the random access response is considered to be received successfully, if the random access response transmitted in the associated time-frequency resource contains the preamble identifier matching the transmitted preamble;

the terminal transmits message 3 on a designated time-frequency resource according to the uplink grant carried in the random access response, wherein message 3 includes a request for transmitting the system information; and the terminal receives message 4 and confirms that the on demand system information is requested successful.

Specifically, in this case, message 3 transmitted by the terminal includes a request for transmitting on demand system information, for example, one or more system information indexes, or an index of a system information group. In addition, for the terminal in the connected state, an indication of the beam may be transmitted by the base station in message 3, to assist the base station to adjust the downlink transmit beam of message 4. Wherein, the transmit beam indication may have the following forms:

a. when the terminal carries the allocated C-RNTI in message 3 and carries one bit of indication information Beam_flag in message 3, and the indication information is 1, it indicates that the base station can use the downlink transmit beam used for previously transmitting downlink data for the terminal.

b. the terminal carries the beam indication information in message 3. The information may be a synchronization signal block index, an index of a CSI-RS, or a beam reference signal index. The terminal learns the optimal downlink beam direction through a downlink measurement. For example, according to the measurement of the reference signal receiving power for the synchronization signal block, an optimal synchronization signal block index is learned and transmitted to the base station by message 3. In another case, for measurements of each beam CSI-RS or beam reference signal, the CSI-RS index or the beam reference signal index corresponding to the optimal downlink beam is learned, and the CSI-RS index or the beam reference signal index is transmitted by message 3.

c. the terminal carries the beam offset indication in message 3. This information is used to notify the base station the offset of the optimal transmit beam direction compared with the current transmit beam direction.

After receiving and detecting the beam indication in message 3, the base station may select to adjust the transmit beam direction of message 4 according to the beam indication or determine the transmit beam direction of message 4 according to the scheduling situation.

For this scenario, there are several manners for transmitting and detecting message 4:

a. The downlink control information indicating the location of message 4 is scrambled by using the C-RNTI or the TC-RNTI, and the downlink time-frequency resource scheduling information for transmitting the system information is transmitted in message 4, and the system information index may be additionally transmitted. After receiving and successfully detecting message 4, the terminal acquires the time-frequency resource location of the corresponding system information according to the downlink time-frequency resource scheduling information of message 4 and reads the system information.

b. The corresponding downlink control information is scrambled by using the above OD-SI-RNTI, wherein, the OD-SI-RNTI is the same for each on demand system information. The corresponding control information includes a system information index (which may include multiple system information indexes) and associated downlink time-frequency resource allocation information. Another indication manner is that only the downlink time-frequency resource allocation information is indicated in the associated downlink control information, and the system information index and the corresponding system information are transmitted in the associated downlink time-frequency resource.

c. The associated downlink control information is scrambled by using the above OD-SI-RNTI, wherein the OD-SI-RNTI for each on demand system information/system information group is different. The associated downlink control information includes downlink time-frequency resource allocation information which is used to indicate the terminal to read the location of the system information. When transmitting the system information, the base station considers the maximum set of system information to be transmitted, and scrambles the downlink control information by using the OD-SI-RNTI corresponding to the maximum set. The terminal detects the downlink control information, if it is detected that the OD-SI-RNTI used for scrambling is the same as the requested system information or contains the requested system information, the terminal considers that the system information request is transmitted successfully and further reads system information according to the downlink time-frequency resource allocation information in the downlink control information.

Figure 32:
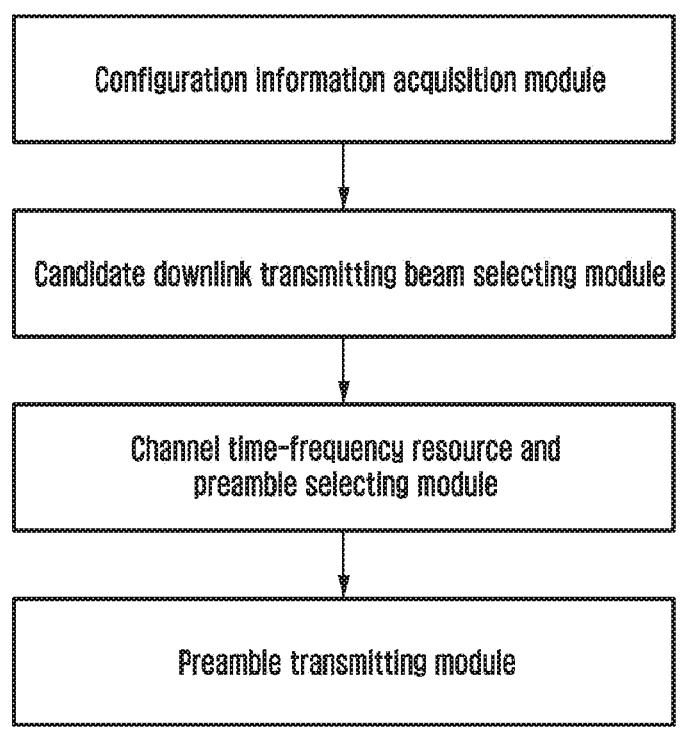
FIG. 32 is an apparatus for a beam failure recovery request according to the present invention.

The present invention provides an apparatus for a beam recovery request, as shown in FIG. 32, comprising the following modules:

a configuration information acquisition module, configured to acquire channel time-frequency resource configuration information and preamble configuration information for transmitting a beam failure recovery request;

a candidate downlink transmit beam selecting module, configured to select a candidate downlink transmit beam according to a measurement result;

a channel time-frequency resource and preamble selecting module, configured to select a channel time-frequency resource and/or a preamble, according to the correspondence between the downlink transmit beam and the channel time-frequency resource and/or the preamble, and the channel time-frequency resource configuration information and the preamble configuration information; and a preamble transmitting module, configured to transmit the selected preamble on the selected channel time-frequency resource.

Figure 33:
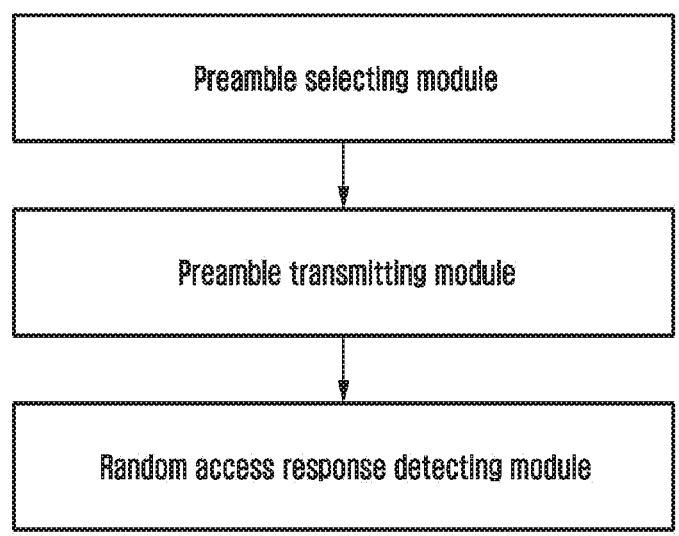
FIG. 33 is an apparatus for requesting on demand system information according to the present invention.
Figure 34:
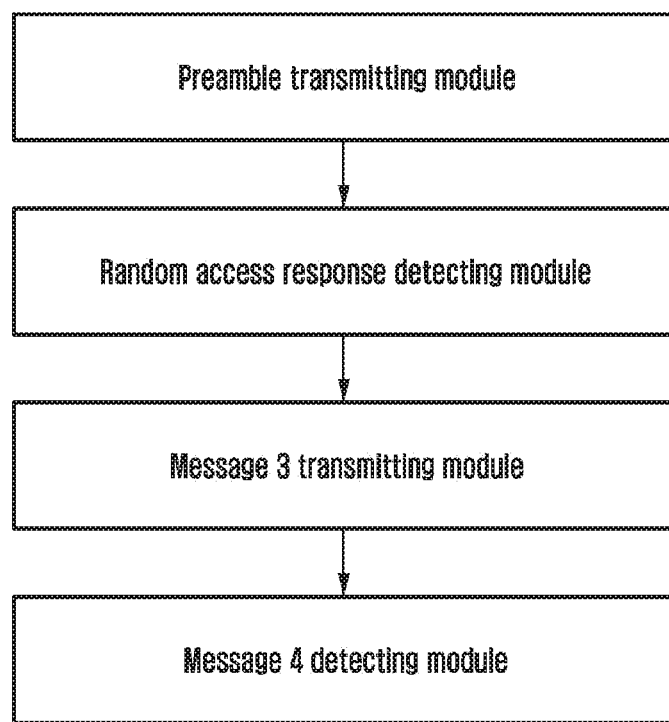
FIG. 34 is another apparatus for requesting on demand system information according to the present invention.

The present invention provides an apparatus for requesting to transmit system information, as shown in FIG. 33, comprising the following modules:

a preamble selecting module, configured to select a preamble according to association between on demand system information or system information group and a random access preamble;

a preamble transmitting module, configured to transmit the preamble on a random access channel; and a random access response detecting module, configured to detect a random access response and acquire a time-frequency resource location of the system information or system information group.

The present invention provides another apparatus for requesting to transmit system information, comprising the following modules:

a preamble transmitting module, configured to transmit a preamble on a random access channel;

a random access response module, configured to detect a random access response;

a message 3 transmitting module, configured to transmit message 3 according to an uplink grant indication in the random access response, wherein message 3 comprises a system information index; and a message 4 detecting module, configured to detect message 4 and acquire the time-frequency resource location of the system information and system information group.

With reference to the above detailed disclosure of the present disclosure, it can be seen that, compared with the prior art, the present disclosure has at least the following beneficial technical effects:

First, the present invention provides a contention-free resource allocation manner for beam failure recovery request, which can effectively reduce the signaling overhead caused by resource allocation.

Second, in the beam failure recovery request method provided by the present invention, it can fall back to the contention-based random access procedure after the request of transmitting contention-free fails, which has a certain degree of flexibility and a certain increase in the possibilities.

Third, the method for requesting to transmit on demand system information provided by the present invention can reduce the signaling overhead caused by the random access response and the transmission of message 4, and reduce the delay of obtaining the system information by the terminal.

In several embodiments provided by the present invention, it should be understand that, the disclosed systems, devices and methods can be realized by other modes. For example, the device embodiment described above is merely illustrative. For example, the classification of the units is merely a logical function classification. Other classification modes can be provided while in the actual implementations. For example, a multiple of units or components can be combined or can be integrated to another system, or some features can be ignored, or are not be executed. On the other point, the displayed or discussed coupling, directly coupling or communication connection between each other can be indirect coupling or communication connection of devices or units through some interfaces, which can be electrical, mechanical or other modes.

The unit as a separator for illustration can be separated physically or cannot be separated physically, the unit as a display component can be a physical unit or cannot be a physical unit, in other word, the display unit can located in one place, or the physical unit can be distributed to a multiple of network units. Part of units or all the units can be selected according to the actual requirement to realize the purpose of the embodiment.

Moreover, each of functional units in each embodiment of the present invention can be integrated into one procedure unit, or can exist in isolation as each unit physically, or can be integrated into one unit by at least two units. The above integrated unit can be realized using hardware, or can be realized using software functional unit.

Those skilled in the art can understand that part of the steps or the whole steps of the method of the embodiments can be completed by the indication of the related hardware according to the program. The program can be stored in a computer readable storage medium. The storage medium can comprises: Read Only Memory (ROM), Random Access Memory (RAM), Disc, CD or other storage mediums.

A mobile terminal provided in the present invention is described in detail. For those skilled in the art, according to the idea of embodiment of the present invention, there are changes on the specific implementations or application scopes. In conclusion, the content of the specification should not be understood as the limitation of the present invention.

The foregoing descriptions are merely some implementations of the present disclosure. It should be pointed out that, to a person of ordinary skill in the art, various improvements and modifications may be made without departing from the principle of the present disclosure, and these improvements and modifications shall be regarded as falling into the protection scope of the present disclosure. It may be understood by a person of ordinary skill in the art that all or part of the steps in various methods of the embodiments may be implemented by instructing related hardware using programs, and the programs may be stored in a computer readable storage medium. The storage medium may include: an ROM (Read Only Memory), an RAM (Random Access Memory), a magnetic disk, an optical disk or the like.

The methods and devices according to the specific implementation have been introduced above in detail. For a person of ordinary skill in the art, the specific implementation and the application range will change according to the idea of the embodiments of the specific implementation. In conclusion, the content of the specification should not be understood as the limitation of the specific implementation.

The invention claimed is:

1. A method performed by a user equipment (UE), the method comprising:
    receiving, from a base station, first configuration information for a random access, the first configuration information including a first root sequence index and a first cyclic shift value;
    receiving, from the base station, second configuration information for a beam failure recovery, the second configuration information including at least one of a second root sequence index and a second cyclic shift value;
    generating a preamble for the beam failure recovery based on the first configuration information and at least one of the second root sequence index and the second cyclic shift value included in the second configuration information, in case that the second configuration information includes at least one of the second root sequence index and the second cyclic shift value; and
    transmitting the preamble for the beam failure recovery.

2. The method of claim 1, wherein the preamble for the beam failure recovery is generated based on the first root sequence index and the second cyclic shift value, in case that the second configuration information includes the second cyclic shift value without the second root sequence index, and
    wherein the preamble for the beam failure recovery is generated based on the second root sequence index and the first cyclic shift value, in case that the second configuration information includes the second root sequence index without the second cyclic shift value.

3. The method of claim 1, wherein the preamble for the beam failure recovery is generated based on the second root sequence index and the second cyclic shift value in case that the second configuration information includes the second root sequence index and the second cyclic shift value.

4. The method of claim 1, wherein the second configuration information further includes a preamble index.

5. The method of claim 1,
wherein each of the first root sequence index and the second root sequence index indicates a basic root sequence used for generating UE-dedicated preamble resources, and
wherein each of the first cyclic shift value and the second cyclic shift value indicates a size of a shift on root sequences.

6. A method performed by a base station, the method comprising:
generating first configuration information for a random access, the first configuration information including a first root sequence index and a first cyclic shift value;
transmitting, to a user equipment (UE), the first configuration information;
generating second configuration information for a beam failure recovery, the second configuration information including at least one of a second root sequence index and a second cyclic shift value;
transmitting, to the UE, the second configuration information to configure a preamble for the beam failure recovery; and
receiving the preamble for the beam failure recovery,
wherein the preamble is generated based on the first configuration information and at least one of the second root sequence index and the second cyclic shift value included in the second configuration information, in case that the second configuration information includes at least one of the second root sequence index and the second cyclic shift value.

7. The method of claim 6, wherein the preamble for the beam failure recovery is generated based on the first root sequence index and the second cyclic shift value, in case that the second configuration information includes the second cyclic shift value without the second root sequence index, and
wherein the preamble for the beam failure recovery is generated based on the second root sequence index and the first cyclic shift value, in case that the second configuration information includes the second root sequence index without the second cyclic shift value.

8. The method of claim 6, wherein the preamble for the beam failure recovery is generated based on the second root sequence index and the second cyclic shift value in case that the second configuration information includes the second root sequence index and the second cyclic shift value.

9. The method of claim 6, wherein the second configuration information further includes a preamble index.

10. The method of claim 6,
wherein each of the first root sequence index and the second root sequence index indicates a basic root sequence used for generating UE-dedicated preamble resources, and
wherein each of the first cyclic shift value and the second cyclic shift value indicates a size of a shift on root sequences.

11. A user equipment (UE), the UE comprising:
a transceiver; and
a controller coupled with the transceiver and configured to control to:

receive, from a base station, first configuration information for a random access, the first configuration information including a first root sequence index and a first cyclic shift value,
receive, from the base station, second configuration information for a beam failure recovery, the second configuration information including at least one of a second root sequence index and a second cyclic shift value,
generate a preamble for the beam failure recovery based on the first configuration information and at least one of the second root sequence index and the second cyclic shift value included in the second configuration information, in case that the second configuration information includes at least one of the second root sequence index and the second cyclic shift value, and
transmit the preamble for the beam failure recovery.

12. The UE of claim 11, wherein the preamble for the beam failure recovery is generated based on the first root sequence index and the second cyclic shift value, in case that the second configuration information includes the second cyclic shift value without the second root sequence index, and
wherein the preamble for the beam failure recovery is generated based on the second root sequence index and the first cyclic shift value, in case that the second configuration information includes the second root sequence index without the second cyclic shift value.

13. The UE of the claim 11, wherein the preamble for the beam failure recovery is generated based on the second root sequence index and the second cyclic shift value in case that the second configuration information includes the second root sequence index and the second cyclic shift value.

14. The UE of claim 11, wherein the second configuration information further includes a preamble index.

15. The UE of claim 11,
wherein each of the first root sequence index and the second root sequence index indicates a basic root sequence used for generating UE-dedicated preamble resources, and
wherein each of the first cyclic shift value and the second cyclic shift value indicates a size of a shift on root sequences.

16. A base station, the base station comprising:
a transceiver; and
a controller coupled with the transceiver and configured to control to:
generate first configuration information for a random access, the first configuration information including a first root sequence index and a first cyclic shift value,
transmit, to a user equipment (UE), the first configuration information,
generate second configuration information for a beam failure recovery, the second configuration information including at least one of a second root sequence index and a second cyclic shift value,
transmit, to the UE, the second configuration information to configure a preamble for the beam failure recovery, and
receive the preamble for the beam failure recovery,
wherein the preamble is generated based on the first configuration information and at least one of the second root sequence index and the second cyclic shift value included in the second configuration information, in case that the second configuration information includes at least one of the second root sequence index and the second cyclic shift value.

17. The base station of claim 16, wherein the preamble for the beam failure recovery is generated based on the first root sequence index and the second cyclic shift value, in case that the second configuration information includes the second cyclic shift value without the second root sequence index, and wherein the preamble for the beam failure recovery is generated based on the second root sequence index and the first cyclic shift value, in case that the second configuration information includes the second root sequence index without the second cyclic shift value.

18. The base station of claim 16, wherein the preamble for the beam failure recovery is generated based on the second root sequence index and the second cyclic shift value in case that the second configuration information includes the second root sequence index and the second cyclic shift value.

19. The base station of claim 16, wherein the second configuration information further includes a preamble index.

20. The base station of claim 16, wherein each of the first root sequence index and the second root sequence index indicates a basic root sequence used for generating UE-dedicated preamble resources, and wherein each of the first cyclic shift value and the second cyclic shift value indicates a size of a shift on root sequences.

\* \* \* \* \*